United States Patent
Cho

(10) Patent No.: US 10,048,915 B2
(45) Date of Patent: Aug. 14, 2018

(54) METHOD OF PROCESSING WORKFLOW IN WHICH A FUNCTION OF AN IMAGE FORMING APPARATUS AND A FUNCTION OF A MOBILE DEVICE ARE COMBINED AND MOBILE DEVICE FOR PERFORMING THE METHOD

(71) Applicant: S-PRINTING SOLUTION CO., LTD., Suwon-si, Gyeonggi-do (KR)

(72) Inventor: Tae-gyun Cho, Hwaseong-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/739,905

(22) Filed: Jun. 15, 2015

(65) Prior Publication Data

US 2016/0179449 A1   Jun. 23, 2016

(30) Foreign Application Priority Data

Dec. 22, 2014   (KR) .................. 10-2014-0186490

(51) Int. Cl.
| | |
|---|---|
| *G06F 3/12* | (2006.01) |
| *H04N 1/00* | (2006.01) |
| *G06K 15/02* | (2006.01) |

(52) U.S. Cl.
CPC .......... *G06F 3/1275* (2013.01); *G06F 3/1208* (2013.01); *G06F 3/1222* (2013.01); *G06F 3/1238* (2013.01); *G06F 3/1292* (2013.01); *G06K 15/1856* (2013.01); *H04N 1/00307* (2013.01); *H04N 1/00411* (2013.01); *H04N 1/00456* (2013.01); *H04N 1/00949* (2013.01); *H04N 1/00* (2013.01); *H04N 2201/0055* (2013.01); *H04N 2201/0075* (2013.01); *H04N 2201/0094* (2013.01)

(58) Field of Classification Search
CPC ............ H04N 1/000949; G06F 3/1275; G06F 3/1208; G06K 15/1856
See application file for complete search history.

(56) References Cited

U.S. PATENT DOCUMENTS

| | | |
|---|---|---|
| 6,886,095 B1 | 4/2005 | Hind et al. |
| 6,980,332 B2 | 12/2005 | Simske |
| 6,980,660 B1 | 12/2005 | Hind et al. |
| 8,797,571 B2 | 8/2014 | Kong |
| 9,013,728 B2 | 4/2015 | Adachi et al. |

(Continued)

FOREIGN PATENT DOCUMENTS

| | | |
|---|---|---|
| EP | 10-2013-0046155 A | 5/2013 |
| EP | 2757464 A2 | 7/2014 |

(Continued)

OTHER PUBLICATIONS

HP ePrint, Wikipedia, downloaded from https://en.wikipedia.org/wiki/HP_ePrint on Nov. 20, 2015.

(Continued)

*Primary Examiner* — Nicholas Pachol
(74) *Attorney, Agent, or Firm* — Staas & Halsey LLP

(57) ABSTRACT

Provided is a method of processing a workflow that cannot be solely processed by an image forming apparatus, by using a resource of a mobile device in which a "bring your own device" (BYOD) application is installed, and a mobile device for performing the method.

20 Claims, 60 Drawing Sheets

(56) References Cited

U.S. PATENT DOCUMENTS

| | | |
|---|---|---|
| 9,258,449 B1 | 2/2016 | Orimoto |
| 2002/0062397 A1* | 5/2002 | Chang .................. G06F 3/1204 709/246 |
| 2006/0221374 A1 | 10/2006 | D'Entrecasteaux |
| 2007/0263872 A1 | 11/2007 | Kirkup |
| 2009/0195817 A1* | 8/2009 | Nakajima .......... H04N 1/00915 358/1.15 |
| 2009/0303532 A1* | 12/2009 | Ito ...................... G06F 11/0733 358/1.15 |
| 2011/0055689 A1 | 3/2011 | Chang et al. |
| 2011/0055832 A1 | 3/2011 | Choi |
| 2011/0063655 A1* | 3/2011 | Tian .................. H04N 1/00209 358/1.15 |
| 2011/0116631 A1 | 5/2011 | Shon et al. |
| 2011/0128564 A1* | 6/2011 | Kayama ............. H04N 1/00204 358/1.13 |
| 2011/0216349 A1* | 9/2011 | McCorkindale ........ G06F 15/00 358/1.15 |
| 2012/0050772 A1* | 3/2012 | Lu ...................... H04N 1/00204 358/1.13 |
| 2012/0054493 A1 | 3/2012 | Bradley |
| 2012/0077432 A1 | 3/2012 | Rose et al. |
| 2012/0079409 A1* | 3/2012 | Luo ............................ G06F 8/36 715/772 |
| 2012/0154842 A1* | 6/2012 | Hori ...................... G06F 3/1205 358/1.13 |
| 2012/0311659 A1 | 12/2012 | Narain et al. |
| 2012/0322461 A1 | 12/2012 | Ito |
| 2013/0063772 A1 | 3/2013 | Bae |
| 2013/0077124 A1 | 3/2013 | Vojak et al. |
| 2013/0117063 A1* | 5/2013 | Kamath ................ G06F 3/1204 705/7.26 |
| 2013/0139218 A1 | 5/2013 | Roulland et al. |
| 2013/0258408 A1 | 10/2013 | Mizutani |
| 2013/0301077 A1 | 11/2013 | Rocas |
| 2013/0326526 A1 | 12/2013 | Sasaki |
| 2013/0329245 A1 | 12/2013 | Nishida |
| 2013/0331027 A1 | 12/2013 | Rose et al. |
| 2014/0006347 A1 | 1/2014 | Qureshi et al. |
| 2014/0007182 A1 | 1/2014 | Qureshi et al. |
| 2014/0007192 A1 | 1/2014 | Qureshi et al. |
| 2014/0007215 A1 | 1/2014 | Romano et al. |
| 2014/0055812 A1 | 2/2014 | DeRoller |
| 2014/0071045 A1 | 3/2014 | Muchnick et al. |
| 2014/0149746 A1 | 5/2014 | Yau |
| 2014/0168687 A1 | 6/2014 | Kim et al. |
| 2014/0173692 A1 | 6/2014 | Srinivasan et al. |
| 2014/0176991 A1 | 6/2014 | Yun |
| 2014/0195585 A1 | 7/2014 | Mihara |
| 2014/0218763 A1 | 8/2014 | Takahashi et al. |
| 2014/0218765 A1 | 8/2014 | Sawayanagi et al. |
| 2014/0226173 A1 | 8/2014 | Tredoux |
| 2014/0280445 A1* | 9/2014 | Hori ...................... G06Q 10/06 709/201 |
| 2014/0333963 A1 | 11/2014 | Nakamura |
| 2014/0355063 A1 | 12/2014 | Jang et al. |
| 2015/0046971 A1 | 2/2015 | Huh et al. |
| 2015/0092213 A1 | 4/2015 | Tohne |
| 2015/0099502 A1 | 4/2015 | Park et al. |
| 2015/0146246 A1* | 5/2015 | Ito ...................... H04N 1/32144 358/1.15 |
| 2015/0153975 A1 | 6/2015 | Mori |
| 2015/0234623 A1 | 8/2015 | Mochizuki |
| 2015/0237231 A1* | 8/2015 | Hirose ...................... H04N 1/21 358/1.15 |
| 2015/0244878 A1 | 8/2015 | Macauley |
| 2015/0249757 A1 | 9/2015 | Han |
| 2015/0271348 A1* | 9/2015 | Kimura ................ H04N 1/0083 358/474 |
| 2016/0014293 A1* | 1/2016 | Iwai .................... H04N 1/00949 358/1.15 |
| 2016/0062553 A1 | 3/2016 | Kang |
| 2016/0065764 A1 | 3/2016 | Kang |
| 2016/0094664 A1 | 3/2016 | Olcese et al. |

FOREIGN PATENT DOCUMENTS

| | | |
|---|---|---|
| JP | 2014-090238 A | 5/2014 |
| KR | 10-2009-0002683 A | 1/2009 |
| WO | 2012-011922 A1 | 1/2012 |
| WO | 2013-165364 A1 | 11/2013 |
| WO | 2014-017118 A1 | 1/2014 |

OTHER PUBLICATIONS https://play.google.com/store/apps/details?id=com.mobilemotion. dubsmash, downloaded Nov. 20, 2015.
https://play.google.com/store/apps/details?id=com.google.android. apps.unveil, downloaded Nov. 20, 2015.
European Search Report for EP 15184577.3-1903 dated Jun. 27, 2016.
Examination Report for EP 15184577.3-1903 dated Jul. 12, 2016.
Korean Office Action for 10-2014-0186365 dated Sep. 7, 2016.
Notification of Transmittal of the International Search Report and the Written Opinion of the International Searching Authority or The Declaration, International Search Report, Written Opinion of the International Searching Authority dated Apr. 1, 2016 corresponding to International Patent Application No. PCT/KR2015/014095.
Communication with European Search Report dated May 4, 2016 corresponding to European Patent Application No. 15201879.2.
Office Action dated May 19, 2016 corresponding to European Patent Application No. 15201879.2.
Notification of Transmittal of the International Search Report and the Written Opinion of the International Searching Authority or The Declaration, International Search Report, Written Opinion of the International Searching Authority, dated May 9, 2016, corresponding to International Patent Application No. PCT/KR2015/014009.
Communication with European Search Report dated May 3, 2016 corresponding to European Patent Application No. 15201856.0.
Office Action dated May 17, 2016 corresponding to European Patent Application No. 15201856.0.
Ernst Haselsteiner et al. "Security in Near Field Communication (NFC) Strengths and Weaknesses", Workshop on RFID security, Jul. 12, 2006, XP055257832.
NFC-SEC NECIP-1 Security Services and Protocol Cryptography Standard using ECDH and AES White paper, Dec. 9, 2008, XP055267898.
Office Action dated Jun. 16, 2016 corresponding to Korean Patent Application No. 10-2014-0186490.
U.S. Office Action dated May 3, 2017 from U.S. Appl. No. 14/757,644.
U.S. Appl. No. 14/757,644, filed Dec. 22, 2015, Myung-han Yoo, S-Printing Solution Co., Ltd.
Korean Office Action dated Mar. 8, 2017 from Korean Patent Application No. 10-2014-0186365, 8 pages.
Korean Office Action dated Feb. 24, 2017 from Korean Patent Application No. 10-2014-0186490, 6 pages.
Korean Office Action dated Jan. 5, 2017 from Korean Patent Application No. 10-2014-0186490, 6 pages.
Korean Office Action dated Apr. 13, 2017 from Korean Patent Application No. 10-2014-0186365, 8 pages.
U.S. Office Action dated Jun. 20, 2016 from U.S. Appl. No. 14/979,281.
U.S. Office Action dated Nov. 10, 2016 from U.S. Appl. No. 14/979,281.
U.S. Office Action dated May 3, 2017 from U.S. Appl. No. 14/979,281.
U.S. Appl. No. 14/979,281, filed Dec. 22, 2015, Ju-ho Eum, S-Printing Solution Co., Ltd.
U.S. Office Action dated Oct. 23, 2017 from U.S. Appl. No. 14/757,644.

* cited by examiner

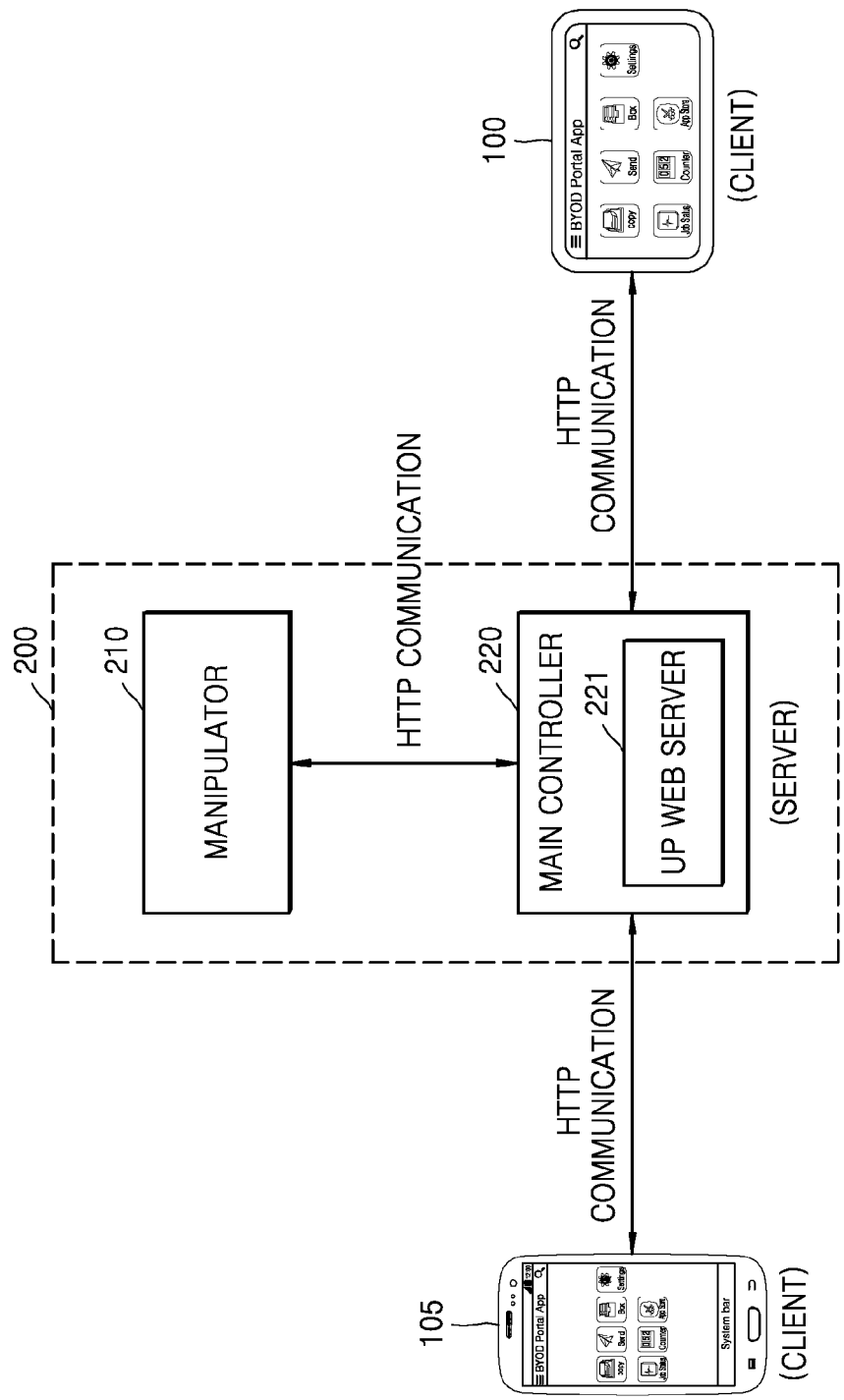

FIG. 13A authoritiesCap:[saaLocalUiAccess, saaJobCreation, saaJobControl,
saaServiceMode, saaUpComplete, saaReadCardReader,
saaManageApplicationInstallation, saaObtainThirdPartySession,
saaObtainSafeCredentials, saaObtainUnsafeCredentials]

FIG. 13B

```
clientinfo:{
    clientToken:{
        token:jjhhmht6kngt545
        secret:aalljnzxy678687jasd
    }
}
```

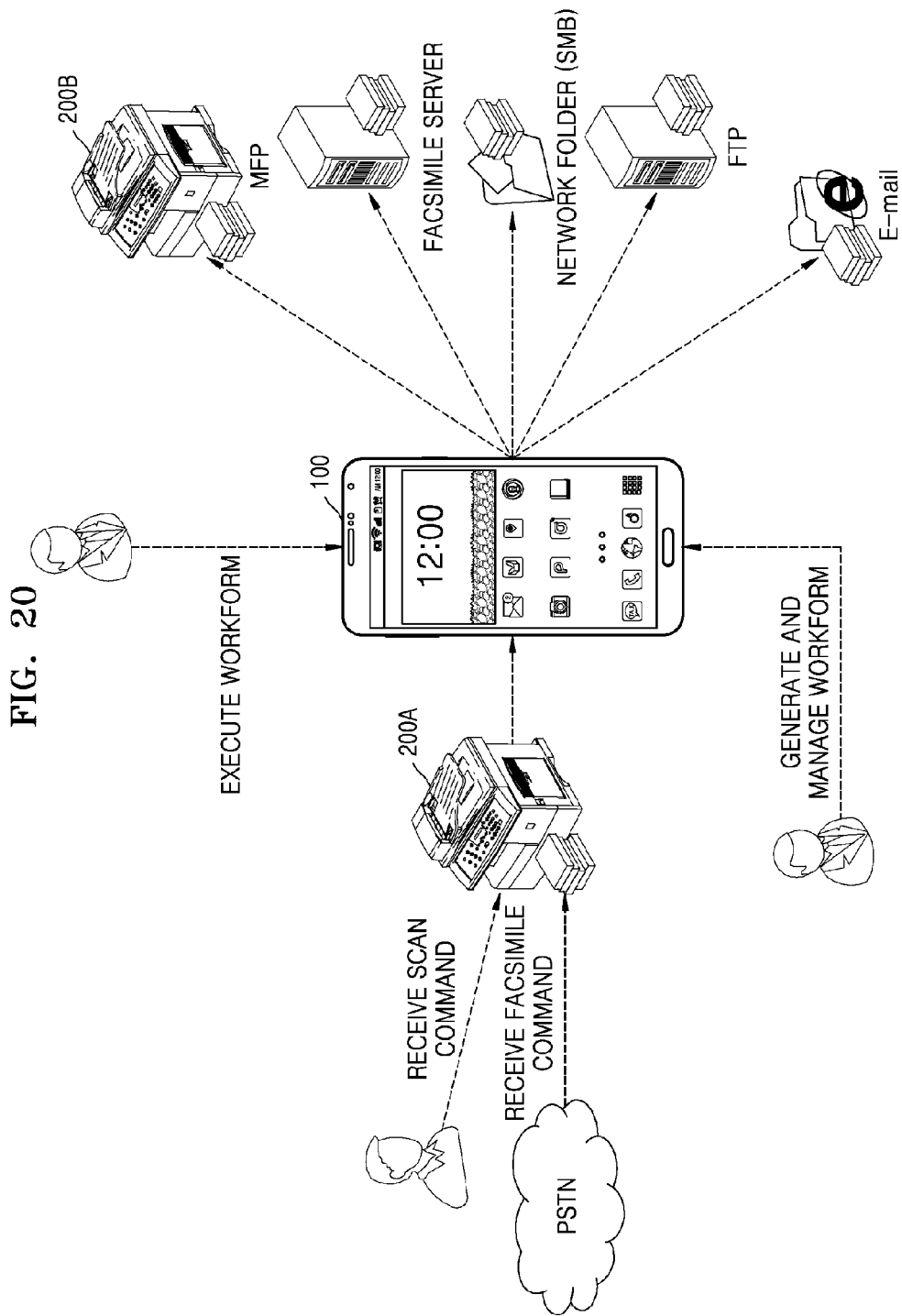

METHOD OF PROCESSING WORKFLOW IN WHICH A FUNCTION OF AN IMAGE FORMING APPARATUS AND A FUNCTION OF A MOBILE DEVICE ARE COMBINED AND MOBILE DEVICE FOR PERFORMING THE METHOD

RELATED APPLICATION

This application claims the benefit of Korean Patent Application No. 10-2014-0186490, filed on Dec. 22, 2014, in the Korean Intellectual Property Office, the disclosure of which is incorporated herein in its entirety by reference.

BACKGROUND

One or more exemplary embodiments relate to a method of processing a workflow and a mobile device for performing the method.

Various image forming apparatuses, such as printers, copy machines, facsimiles, and multifunction printers (MFPs), have user interfaces (UIs) for a user to control operations of the image forming apparatuses or to input data. Since functions provided by the image forming apparatuses vary based on types of the image forming apparatuses, forms of the UIs may vary. According to developments in scientific technology, hardware and software used in the image forming apparatuses have been considerably developed, and the UIs of the image forming apparatuses are also evolving.

Recently, with the widespread use of smart devices, software for controlling operations of an image forming apparatus is mounted on mobile devices, such as smart phones. In other words, a user may control the operations of the image forming apparatus by manipulating a UI provided by his/her mobile device, without having to manipulate a UI provided by the image forming apparatus. Accordingly, the term "bring your own device" (BYOD) has appeared. BYOD commonly denotes technologies for controlling devices, such as image forming apparatuses, by using his/her own mobile device. For example, company's information, apparatuses, and systems are accessed by using a laptop, a smart phone, or a tablet personal computer (PC). For example, an employee may conduct business by accessing a company's system by using a personal laptop instead of a desktop installed in the company for business use.

When a BYOD working environment is created, employees do not need to carry separate devices for business use and personal use, and thus productivity may improve and company expenses for purchasing devices may be reduced.

SUMMARY

One or more exemplary embodiments include a method of processing a workflow that is unable to be solely performed by an image forming apparatus, by using a resource of a mobile device in which a "bring your own device" (BYOD) application is installed, and a mobile device for performing the method.

Additional aspects will be set forth in part in the description which follows and, in part, will be apparent from the description, or may be learned by practice of the presented exemplary embodiments.

According to one or more exemplary embodiments, a method of processing a workflow with a mobile device and a first image forming apparatus, the method includes: selecting, via the mobile device, a workflow in which a first function supported by the first image forming apparatus and a function of the mobile device are combined; connecting the first image forming apparatus and the mobile device, which are used to process the workflow; and executing functions included in the workflow based on an order of processing the first function and the function of the mobile device, the order being defined in the workflow.

The function of the mobile device may be a function that is not supported by the first image forming apparatus.

The executing of the functions included in the workflow may include sequentially executing the functions based on the order.

The executing of the functions included in the workflow may include: receiving a result of executing the first function from the first image forming apparatus in response to a command to execute the first function; and executing the function of the mobile device with respect to the result of executing the first function.

The receiving of the result of executing the first function may include: transmitting the command to execute the first function to the first image forming apparatus based on capability information of the first function, which is provided from the first image forming apparatus; and receiving the result of executing the first function from the first image forming apparatus.

The executing of the function of the mobile device may include executing the function of the mobile device with respect to the result of executing the first function by interlocking with an application executable in the mobile device.

When a second function supported by a second image forming apparatus is further combined with the functions included in the workflow and the connecting further includes connecting the second image forming apparatus to the mobile device, the executing of the functions included in the workflow may further include receiving a result of executing the second function from the second image forming apparatus in response to a command to execute the second function on a result of executing the function of the mobile device.

When the first function is a scanning function for scanning a document, and the function of the mobile device is an editing function for editing a document, the executing of the functions included in the workflow may include: receiving a scanned document from the first image forming apparatus in response to a command to execute the scan function; and executing the editing function with respect to the scanned document.

When a document transmitting function of the mobile device is further combined with the functions included in the workflow, the executing of the functions included in the workflow may further include executing the document transmitting function for transmitting an edited document, which is obtained by editing the scanned document by using the editing function, to an external device.

When a sharing function of the mobile device is further combined with the functions included in the workflow, the executing of the functions included in the workflow may further include executing the sharing function for sharing an edited document, which is obtained by editing the scanned document by using the editing function, with an external device.

When a document transmitting function of the first image forming apparatus is further combined with the functions included in the workflow, the executing of the functions included in the workflow may further include receiving a status of executing the document transmitting function from the first image forming apparatus in response to a command to execute the document transmitting function on an edited document obtained by editing the scanned document by using the editing function.

When a printing function supported by a second image forming apparatus is further combined with the functions included in the workflow and the connecting further includes connecting the second image forming apparatus to the mobile device, the executing of the functions included in the workflow may further include receiving a status of executing the printing function from the second image forming apparatus in response to a command to execute the printing function on an edited document obtained by editing the scanned document by using the editing function.

According to one or more exemplary embodiments, a non-transitory computer-readable recording medium has recorded thereon a program, which when executed by a computer, performs the method above.

According to one or more exemplary embodiments, a mobile device for processing a workflow, the mobile device includes: an input unit configured to receive an input selecting a workflow in which a first function supported by a first image forming apparatus and a function of the mobile device are combined; a display unit configured to display the workflow; a communication unit configured to connect the first image forming apparatus and the mobile device, which are used to process the workflow; and a controller configured to execute functions included in the workflow based on an order of processing the first function and the function of the mobile device, the order being defined in the workflow.

The function of the mobile device may be a function that is not supported by the first image forming apparatus.

The controller may be further configured to sequentially execute the functions included in the workflow based on the order.

The controller may be further configured to receive a result of executing the first function from the first image forming apparatus in response to a command to execute the first function, and to execute the function of the mobile device with respect to the result of executing the first function.

The controller may be further configured to transmit the command to execute the first function to the first image forming apparatus based on capability information about the first function, which is provided from the first image forming apparatus, and to receive the result of executing the first function from the first image forming apparatus.

The controller may be further configured to execute the function of the mobile device with respect to the result of executing the first function by interworking with an application executable in the mobile device.

When a second function supported by a second image forming apparatus is further combined with the functions included in the workflow and the communication unit is further configured to connect the second image forming apparatus to the mobile device, the controller may be further configured to receive a result of executing the second function from the second image forming apparatus in response to a command to execute the second function with respect to a result of executing the function of the mobile device.

BRIEF DESCRIPTION OF THE DRAWINGS

These and/or other aspects will become apparent and more readily appreciated from the following description of the exemplary embodiments, taken in conjunction with the accompanying drawings in which:

FIG. 4 is a diagram for describing communications between mobile devices and an image forming apparatus in a BYOD environment, according to an exemplary embodiment;

FIG. 13A is a diagram for describing authority information provided from an image forming apparatus to a mobile device, according to an exemplary embodiment;

FIG. 13B is a diagram for describing credential information (a token and a secret) provided from an image forming apparatus to a mobile device, according to an exemplary embodiment;

FIG. 20 is a diagram of an environment of a mobile device for generating, managing, and executing a workform by using a BYOD service, according to an exemplary embodiment;

DETAILED DESCRIPTION

Figure 1:
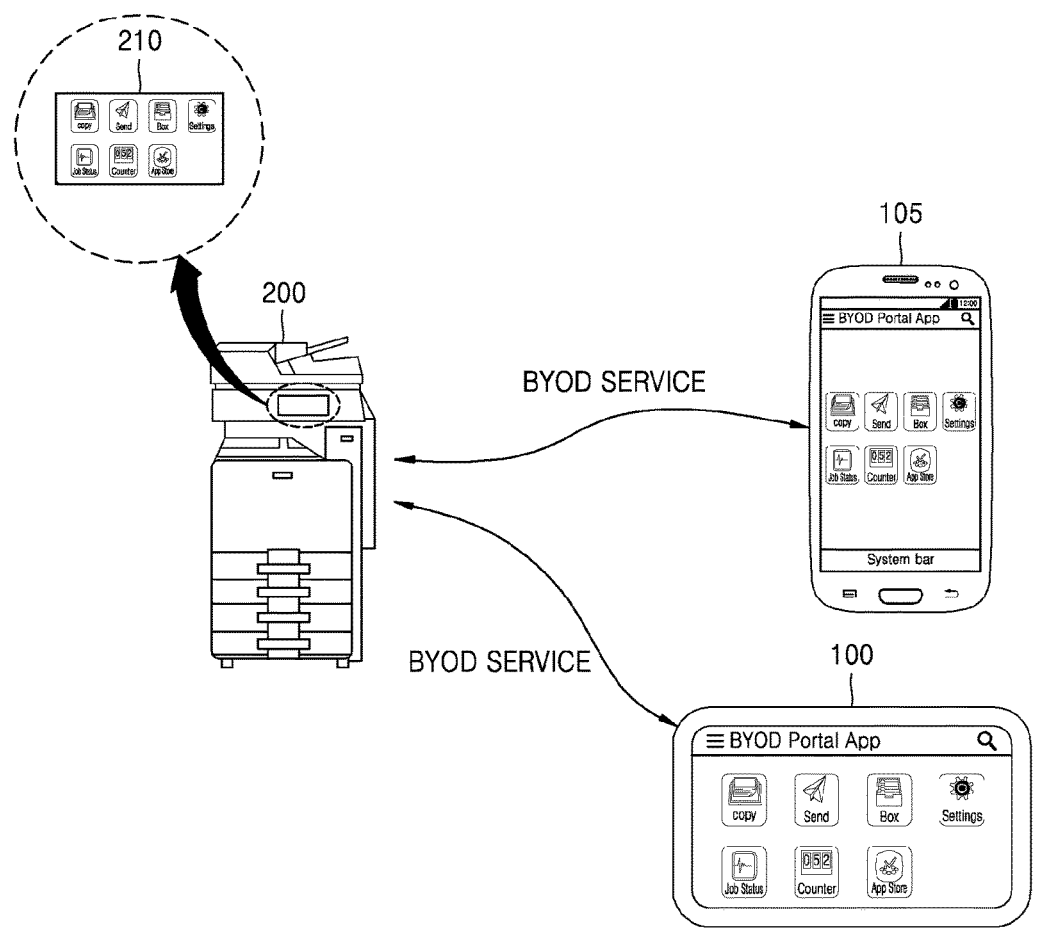
FIG. 1 is a diagram of a "bring your own device" (BYOD) environment according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

It will be further understood that the terms "include" and/or "including" used herein specify the presence of stated features or components, but do not preclude the presence or addition of one or more other features or components.

It will be understood that although the terms "first", "second", etc. may be used herein to describe various components, these components should not be limited by these terms. These components are only used to distinguish one component from another.

Expressions such as "at least one of," when preceding a list of elements, modify the entire list of elements and do not modify the individual elements of the list.

One or more exemplary embodiments will now be described in detail with reference to accompanying drawings.

FIG. 1 is a diagram of a "bring your own device" (BYOD) environment according to an exemplary embodiment. In the BYOD environment according to an exemplary embodiment, a user may manipulate various functions of an image forming apparatus 200 by using a mobile device 100 or 105, via a BYOD service. In other words, at least one BYOD device for controlling the image forming apparatus 200 may be simultaneously connected to the image forming apparatus 200. The BYOD service has a narrower meaning than general BYOD, and may be a service in which a personal device accesses a function of the image forming apparatus 200 such that a resource of the image forming apparatus 200 is shared with the personal device. The BYOD environment may be a network system for using the BYOD service.

In FIG. 1, the mobile device 100 is illustrated as a tablet device and the mobile device 105 is illustrated as a smart phone, but types of the mobile devices 100 and 105 are not limited thereto. In other words, the mobile device 100 or 105 may be any one of various devices including a display screen, such as a tablet device, a smart phone, a laptop, a personal digital assistant (PDA), and a wearable device (a watch or glasses).

A BYOD application needs to be installed in the mobile device 100 or 105 supporting BYOD, in order to use the BYOD service. The BYOD application may also be referred to as a BYOD portal app. When the BYOD application is installed in the mobile device 100 or 105, the mobile device 100 or 105 transmits a control command to the image forming apparatus 200 to control operations of the image forming apparatus 200. Here, the BYOD application may control the image forming apparatus 200 by using an open application programming interface (API). The mobile device 100 or 105 may be wirelessly connected to the image forming apparatus 200 through a same access point (AP) or Wi-Fi direct.

The image forming apparatus 200 includes a manipulator 210, and a user may manipulate the image forming apparatus 200 also by using the manipulator 210. The manipulator 210 may include a display panel for displaying a graphical user interface (GUI) screen, and an input key for receiving a user input.

The manipulator 210 of the image forming apparatus 200, and the mobile device 100 or 105 may have independent UI contents. In other words, the mobile device 100 or 105 may display UI contents displayed on the manipulator 210, or display independent UI contents for manipulating the image forming apparatus 200, which are different from the UI contents displayed on the manipulator 210. In other words, UI contents for performing various functions of the image forming apparatus 200, such as copying, printing, and scanning, may be independently provided to the BYOD application installed in the mobile device 100 or 105.

The user may perform all manipulations available in the manipulator 210 by using the mobile device 100 or 105. As such, according to the current embodiment, the user may manipulate the image forming apparatus 200 by using the mobile device 100 or 105, and may conveniently print a file stored in the mobile device 100 or 105, or perform an imaging job (e.g., scan-to-email or scan-to-cloud) by using an address book stored in the mobile device 100 or 105, and thus user convenience may improve. Also, for example, a process of transforming image data to print data, such as a print command language (PCL), a page description language (PDL), or a post script (PS), may be performed by using a resource of the image forming apparatus 200, which has a relatively high process performance, instead of a resource of the mobile device 100 or 105, which has a relatively low process performance, and thus print data may be processed at a high speed compared to a general mobile printing application.

As such, the mobile device 100 or 105 and the image forming apparatus 200 need to be connected to each other in order to perform the BYOD service for controlling the image forming apparatus 200. In the current embodiment, this connecting to perform a BYOD service may also be referred to as pairing. A connection method for a BYOD service will now be described in detail with reference to relevant drawings.

Figure 2A:
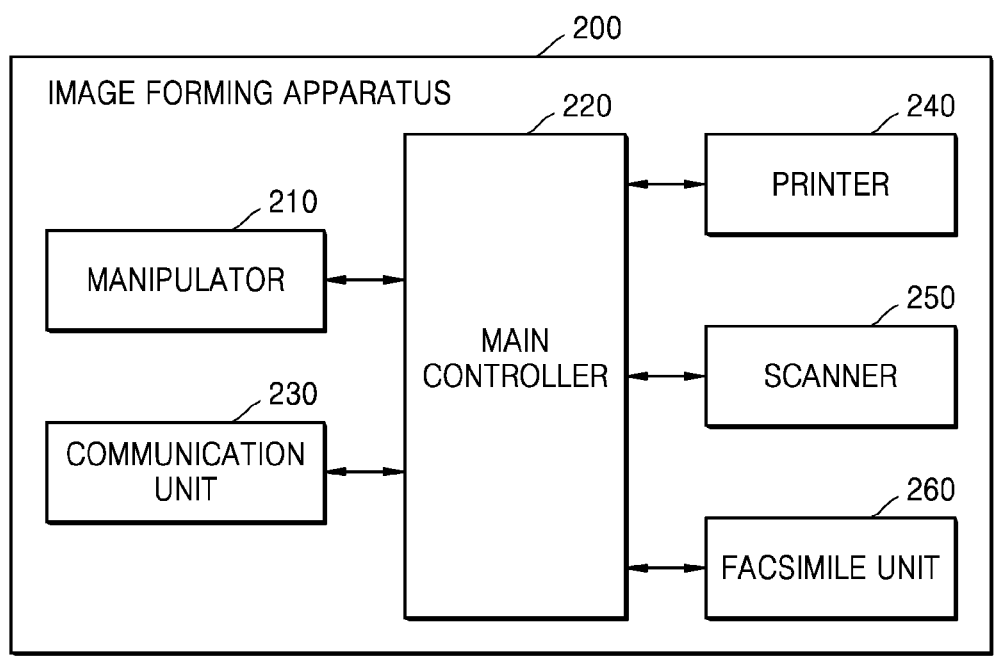
FIG. 2A is a block diagram of hardware components of an image forming apparatus, according to an exemplary embodiment.

FIG. 2A is a block diagram of hardware components of the image forming apparatus 200 of FIG. 1, according to an exemplary embodiment. Referring to FIG. 2A, the image forming apparatus 200 may include the manipulator 210 of FIG. 1, a main controller 220, a communication unit 230, a printer 240, a scanner 250, and a facsimile unit 260. However, it would be obvious to one of ordinary skill in the art that the image forming apparatus 200 may further include general-purpose hardware components other than those shown in FIG. 2A.

The manipulator 210 is a hardware component used by the user to manipulate the image forming apparatus 200. The manipulator 210 may include a display panel for displaying a GUI screen, and an input key for receiving a user input. The manipulator 210 provides the GUI screen to the user, and transmits a manipulation command received from the user through the GUI screen to the main controller 220.

The main controller 220 is a hardware component that controls operations of all components included in the image forming apparatus 200, and may be realized as a processor. The main controller 220 may communicate with the manipulator 210 to transmit and receive commands required to manipulate and control the image forming apparatus 200 to and from the manipulator 210. Also, the main controller 220 may communicate with the mobile device 100 or 105 connected to the image forming apparatus 200 for the BYOD service to transmit and receive commands required to manipulate and control the image forming apparatus to and from the mobile device 100 or 105 of FIG. 1.

The communication unit 230 is a hardware component for communicating with the mobile device 100 or 105 (of FIG. 1) that provides the BYOD service as discussed above with respect to FIG. 1. The communication unit 230 may be connected to the mobile device 100 or 105 via an AP or directly by using Wi-Fi direct.

The printer 240 performs a print operation according to control of the main controller 220, the scanner 250 performs a scan operation according to control of the main controller 220, and the facsimile unit 260 performs a facsimile operation according to control of the main controller 220.

Figure 2B:
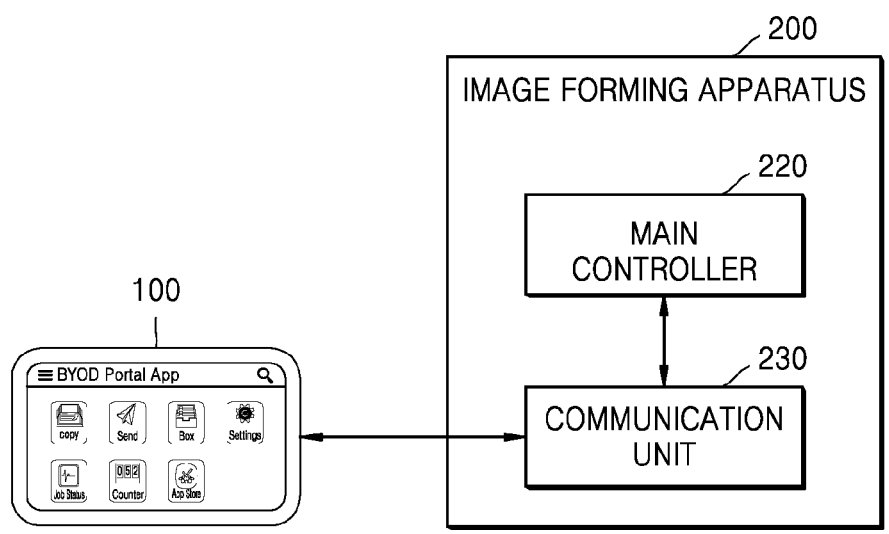
FIG. 2B is a block diagram of hardware components of an image forming apparatus, according to another exemplary embodiment.

FIG. 2B is a block diagram of hardware components of the image forming apparatus 200 of FIG. 1, according to another exemplary embodiment. Referring to FIG. 2B, the image forming apparatus 200 may include the main controller 220 (of FIGS. 1 and 2A) and the communication unit 230 (of FIG. 2A). In other words, the image forming apparatus 200 of FIG. 2B includes only some of the components of the image forming apparatus 200 of FIG. 2A for convenience of description, but the components of the image forming apparatus 200 of FIG. 2B are not limited thereto.

The communication unit 230 transmits temporary credential information that is issued upon receiving a pairing request from the mobile device 100 to the mobile device 100, and receives a personal identification number (PIN) code that is encrypted by the mobile device 100.

The main controller 220 decrypts the PIN code by using the temporary credential information so as to determine whether the PIN code is valid.

When it is determined that the PIN code is valid, the main controller 220 issues permanent credential information, and controls the communication unit 230 such that the permanent credential information is returned to the mobile device 100.

Figure 3A:
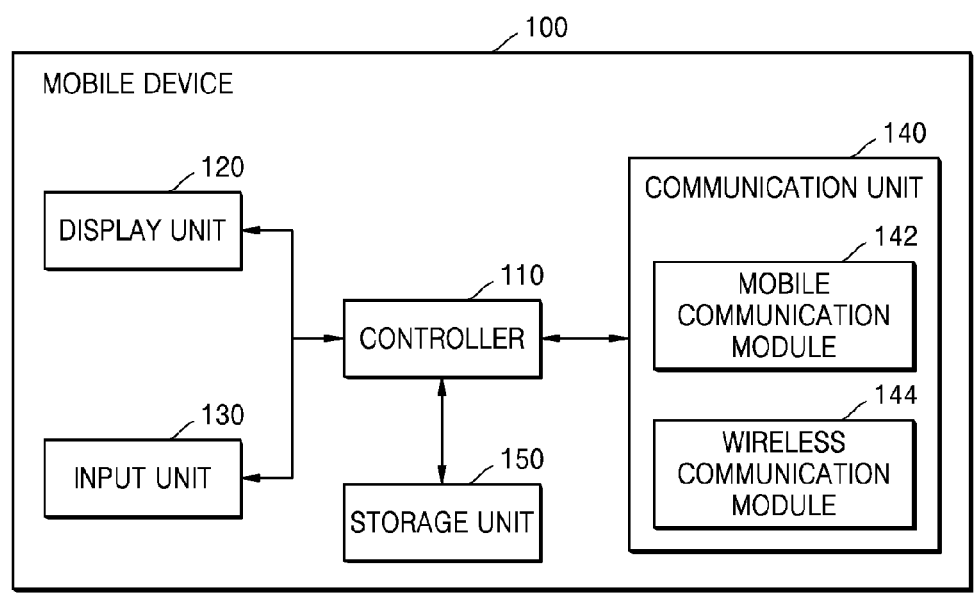
FIG. 3A is a block diagram of hardware components of a mobile device, according to an exemplary embodiment.

FIG. 3A is a block diagram of hardware components of the mobile device 100 of FIG. 1, according to an exemplary embodiment. Referring to FIG. 3A, the mobile device 100 may include a controller 110, a display unit 120, an input unit 130, a communication unit 140, and a storage unit 150. Also, the communication unit 140 may include a mobile communication module 142 and a wireless communication module 144. However, it would be obvious to one of ordinary skill in the art that the mobile device 100 may include general-purpose hardware components other than those shown in FIG. 3A. Meanwhile, in FIG. 3A, components of the mobile device 100 of FIG. 1 will be described, but details of FIG. 3A may also be applied to the mobile device 105 of FIG. 1. In other words, the mobile device 105 of FIG. 1 may include the components of the mobile device 100 shown in FIG. 3A and other additional not shown. In the embodiment shown, the storage unit 150 may store a BYOD application (not shown). In some embodiments, the BYOD application may be stored in other components external to the controller 110, or, alternatively, internally as a part of the controller 110. Further, although the storage unit 150 is shown as external to the controller 110, the storage unit 150 may also be a storage unit embedded in the controller 110.

The controller 110 is a hardware component realized in at least one processor, and may control overall operations of the components in the mobile device 100. For example, the controller 110 may execute the BYOD application stored in the storage unit 150 to control the BYOD service regarding the image forming apparatus 200. Also, the controller 110 may control the mobile device 100 such that a connection to the image forming apparatus 200 for the BYOD service is established. In addition, the controller 110 may control functions and operations of the mobile device 100 described hereinafter according to one or more exemplary embodiments. The controller 110 may be realized as a processor module, such as a central processing unit (CPU), an application processor, or a graphic processing unit (GPU).

The display unit 120 displays and outputs information processed by the mobile device 100. For example, the display unit 120 may display a GUI screen for controlling the image forming apparatus 200 according to the BYOD service, or display information about an event (e.g., a print completion event or a power low event) generated in the image forming apparatus 200. Also, the display unit 120 may display information (e.g., a discovery result or a PIN code input screen) required for the mobile device 100 to be connected to the image forming apparatus 200 for the BYOD service. The display unit 120 may be of any type, for example, may be a liquid crystal display (LCD), a thin-film transistor-liquid crystal display (TFT-LCD), an organic light-emitting diode (OLED), a flexible display, a 3-dimensional (3D) display, or an electrophoretic display.

The input unit 130 allows a user to input information or instructions to control the mobile device 100. For example, the input unit 130 may include a keypad, a dome switch, a touch pad (a contact capacitance type, a pressure resistance film type, an infrared ray detection type, or a piezoelectric effect type), a jog wheel, or a jog switch, but is not limited thereto. The input unit 130 may receive a user input for selecting any one of various contents or options displayed on the display unit 120. For example, the input unit 130 may receive information about a PIN code for authenticating the mobile device 100 to the image forming apparatus 200 to be connected for the BYOD service, from the user.

In the mobile device 100, the display unit 120 and the input unit 130 may be integrated in a form of a touch screens widely used in smart phones or tablet devices.

The communication unit 140 performs communication between the mobile device 100 and the image forming apparatus 200, and may include the mobile communication module 142 and the wireless communication module 144.

The mobile communication module 142 transmits and receives a mobile communication signal to and from a base station (not shown), an external device (not shown), or a server (not shown) on a mobile communication network (not shown). Here, examples of the mobile communication signal include various types of wireless data, such as a voice call signal, an image call signal, a text/multimedia message signal, and a content data signal received through a mobile communication network, such as third generation (3G) or 4G.

The wireless communication module 144 may include a Bluetooth module (not shown), a Bluetooth low energy (BLE) module (not shown), a near field communication (NFC) module (not shown), a wireless local area network (WLAN) (Wi-Fi) module (not shown), a Zigbee module (not shown), an infrared data association (IrDA) module (not shown), a Wi-Fi direct (WFD) module (not shown), or an ultra wideband (UWB) module (not shown), but is not limited thereto. The wireless communication module 144 also enables communication with the image forming apparatus 200 via a local area wireless connection or a wireless network connection.

The storage unit 150 may store programs for processes and control of the controller 110, or may store various types of data (e.g., applications, such as, the BYOD application) and various types of contents (e.g., documents, pictures, and images). The storage unit 150 may include any one of various types of storage media, such as a flash memory, a hard disk drive (HDD), a card memory (e.g., a secure digital (SD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the storage unit 150 may operate as a web storage unit.

Figure 3B:
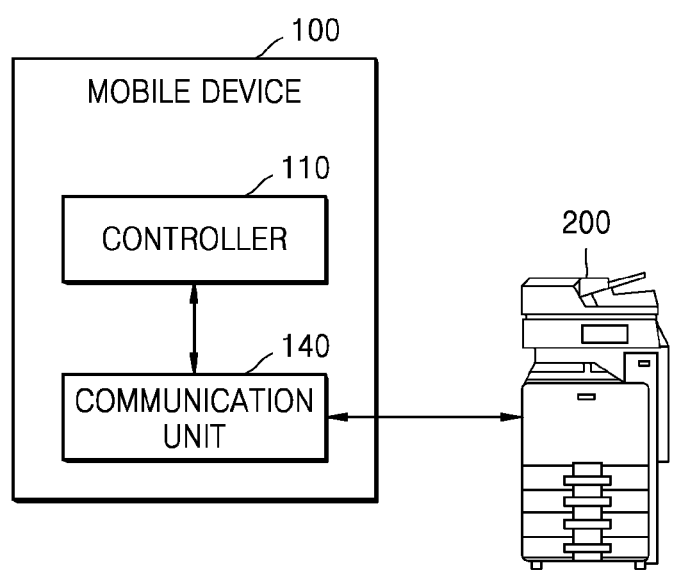
FIG. 3B is a block diagram of hardware components of a mobile device, according to another exemplary embodiment.

FIG. 3B is a block diagram of hardware components of the mobile device 100 of FIG. 1, according to another exemplary embodiment. Referring to FIG. 3B, the mobile device 100 may include the controller 110 of FIG. 3A and the communication unit 140 of FIG. 3A. In other words, the mobile device 100 of FIG. 3B includes some of the components of the mobile device 100 of FIG. 3A for convenience of description, but the components of the mobile device 100 of FIG. 3B are not limited thereto.

The communication unit 140 receives temporary credential information issued by the image forming apparatus 200 upon transmitting a pairing request to the image forming apparatus 200.

The controller 110 encrypts a PIN code input by the user by using the temporary credential information.

The communication unit 140 transmits the PIN code to the image forming apparatus 200, and when the image forming apparatus 200 determines that the PIN code is valid, receives permanent credential information from the image forming apparatus 200.

Detailed functions and operations of the components of the image forming apparatus and the mobile device 100 will now be described in detail in connection to FIGS. 2A through 3B.

FIG. 4 is a diagram for describing communications between the mobile devices 100 and 105 and the image forming apparatus 200 in a BYOD environment, according to an exemplary embodiment.

Referring to FIG. 4, the image forming apparatus 200 is connected to the mobile devices 100 and 105, but the number of mobile devices is not limited to two. As shown in FIG. 4, the mobile devices 100 and 105 for the BYOD service may be simultaneously connected to the image forming apparatus 200. In some embodiments, the number of BYOD devices simultaneously connectable to the image forming apparatus 200 may be limited. For example, a maximum number of BYOD devices simultaneously connectable to the image forming apparatus 200 may be pre-set based on product specifications, for example, a memory size, of the image forming apparatus, and a BYOD device that tries to connect to the image forming apparatus 200 may not be allowed when the maximum number has already been reached.

In the BYOD environment, the mobile devices 100 and 105, and the image forming apparatus 200 may perform communications using a unified protocol (UP). In detail, the main controller 220 of the image forming apparatus 200 may perform UP communications with the mobile devices 100 and 105. Also, the main controller 220 may perform UP communication with the manipulator 210. A UP is a web service API, and is a protocol for accessing, generating, deleting, and updating a resource by using a hypertext transfer protocol (HTTP) based on a uniform resource locator (URL).

The mobile devices 100 and 105 may control operations of the image forming apparatus 200 by transmitting UP commands to the main controller 220. The main controller 220 controls the printer 240, the scanner 250, and the facsimile 260 to perform operations corresponding to UP commands received from the manipulator 210 or the mobile devices 100 and 105.

Meanwhile, when an event is generated, the main controller 220 broadcasts the event to the manipulator 210 and the mobile devices 100 and 105. The manipulator 210 and the mobile devices 100 and 105 may each determine whether the event needs to be processed, and perform an operation when the event needs to be processed and ignore the event when the event does not need to be processed.

In order to perform UP communication, the main controller 220 may operate as a server. In other words, the main controller 220 may include a UP web server 221. Here, it may be assumed that the manipulator 210 and the mobile devices 100 and 105 are clients. The clients may request the UP web server 221 for resources, and the UP web server 221 responds to the requests. The UP web server 221 and the clients may use HTTP as a communication protocol. Thus, any device may be connected to the UP web server 221 as long as the device uses HTTP, and may communicate with the UP web server 221 as long as the device uses a determined protocol despite a different platform.

Figure 5:
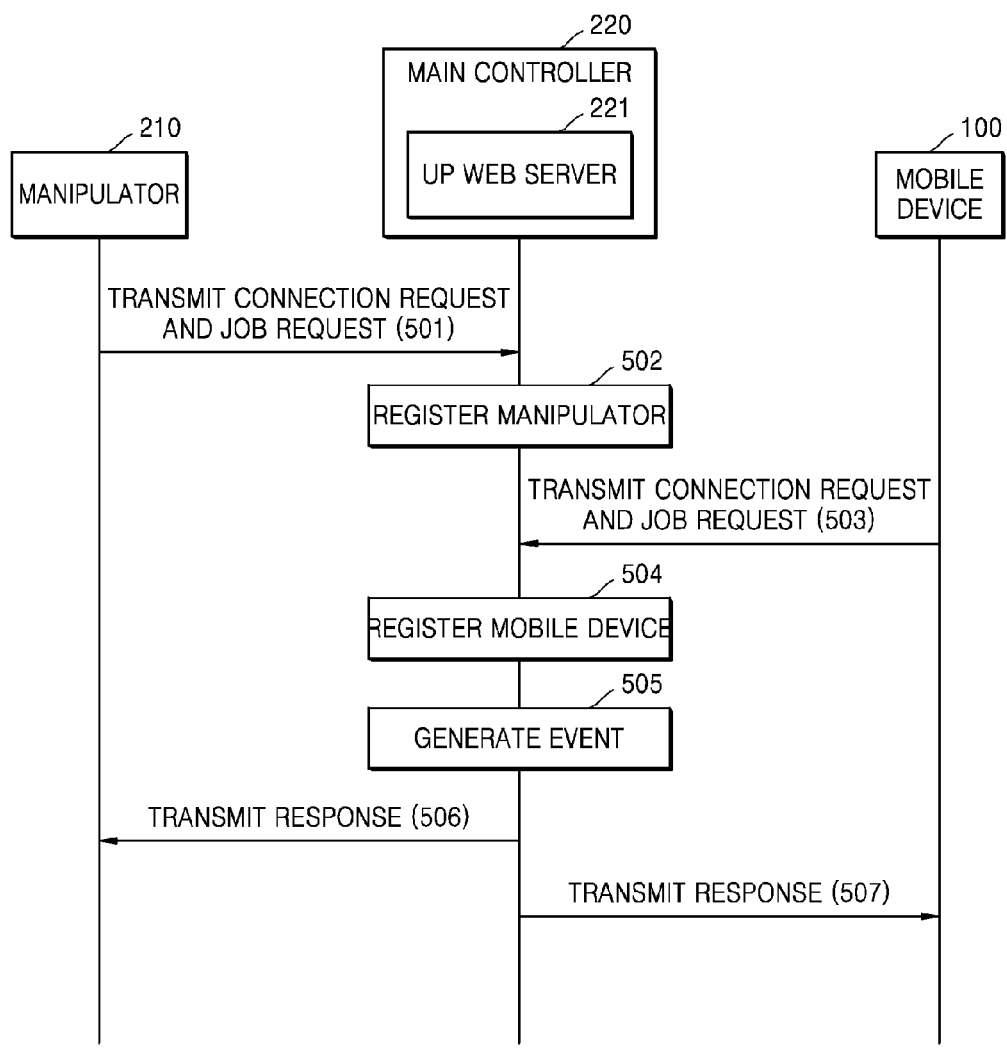
FIG. 5 is a diagram for describing operations of performing unified protocol (UP) communication, according to an exemplary embodiment.

FIG. 5 is a diagram for describing operations of performing UP communication, according to an exemplary embodiment. The manipulator 210 and the main controller 220 of FIG. 5 may be components included in the image forming apparatus 200 of FIG. 2A or 2B.

Referring to FIG. 5, when the manipulator 210 transmits a connection request and a job request to the UP web server 221 of the main controller 220 by using HTTP in operation 501, the UP web server 221 registers the manipulator 210 in operation 502. In other words, the UP web server 221 generates a session by using access information included in a HTTP request received from the manipulator 210.

Similarly, when the mobile device 100 transmits a connection request and a job request to the UP web server 221 by using HTTP in operation 503, the UP web server 221 registers the mobile device 100 in operation 504. In other words, the UP web server 221 generates a session by using access information included in a HTTP request received from the mobile device 100.

When an event is generated in the image forming apparatus 200 in operation 505, the UP web server 221 transmits a response to the manipulator 210 and the mobile device 100 respectively in operations 506 and 507. According to an exemplary embodiment, the UP web server 221 may not immediately transmit a response upon receiving a request from the manipulator 210 or the mobile device 100, but may transmit the response after an event is generated, and such a method may be referred to as a long polling method.

Figure 6:
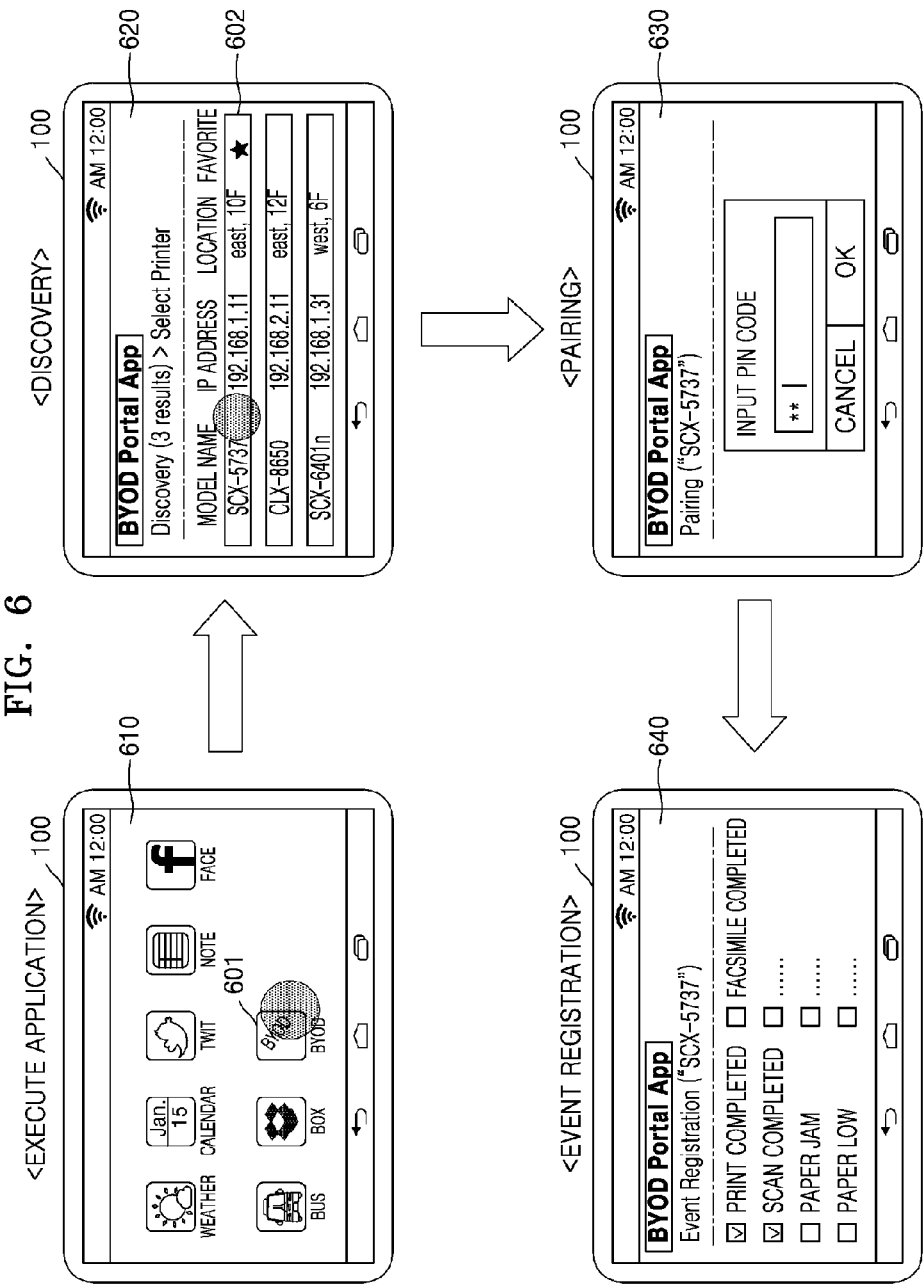
FIG. 6 illustrates user interface (UI) screens of a mobile device, which are displayed while the mobile device is connected to an image forming apparatus to perform a BYOD service, according to an exemplary embodiment.

FIG. 6 illustrates UI screens of the mobile device 100, which are displayed while the mobile device 100 is connected to the image forming apparatus 200 to perform a BYOD service, according to an exemplary embodiment. The UI screens of FIG. 6 are arbitrarily illustrated for convenience of description, and thus arrangements and composition of the UI screens may vary.

The mobile device 100 may be a BYOD device, and processes of the mobile device 100 connecting to the image forming apparatus 200 may be largely classified into three processes, i.e., a discovery process 650, a pairing process 660, and an event registration process 670. Here, a communication between the mobile device 100 of FIG. 1 and the image forming apparatus 200 of FIG. 1 may be performed based on open standard for authorization (OAuth).

First, the mobile device 100 executes or launches a BYOD application 601 in an execution process 680 on a wallpaper UI 610. The BYOD application 601 is stored in the storage unit 150 of FIG. 3A, and may be downloaded and installed in the mobile device 100 from a generally well-known online application market, such as Samsung Apps of Samsung, Google Play of Google, or AppStore of Apple. Alternatively, the BYOD application 601 may be a basic application installed in the mobile device 100 during manufacture. The BYOD application 601 may provide various functions for the BYOD service, such as connecting to the image forming apparatus 200, displaying a GUI screen for controlling the image forming apparatus 200 of FIG. 1, and generating a command for controlling the image forming apparatus 200 of FIG. 1.

When the BYOD application 601 is executed in the execution process 680, the display unit 120 of FIG. 3A displays a UI 620 to enable the discovery process 650 to be performed. The discovery process 650 searches for image forming apparatuses, such as, for example, the image forming apparatus of FIG. 1, that may be connectable to the mobile device 100. In the embodiment shown, the UI 620 discovers three image forming apparatuses, i.e., "SCX-5737" 602, "CLX-8650", and "SCX-6401n", are discovered. Information about model names, internet protocol (IP) addresses, and locations of the discovered image forming apparatuses may also be displayed on the UI 620. The user may select the image forming apparatus "SCX-5738" 602 to be controlled (or connected) through the BYOD service from among the discovered image forming apparatuses. Meanwhile, a list of the image forming apparatuses displayed on the UI 620 may all support the BYOD service, or, alternatively, the image forming apparatuses may be discovered regardless of whether the BYOD service is supported.

When the image forming apparatus "SCX-5738" 602 to be controlled (or connected) is selected through the BYOD service, the pairing process 660 is performed between the image forming apparatus "SCX-5738" 602 and the mobile device 100. The pairing process 660 is a series of operations performed by the image forming apparatus "SCX-5738" 602 to determine whether the mobile device 100 is reliable as a BYOD device and to initiate a connection session of the BYOD device.

The mobile device 100 prompts for and receives a user input regarding a PIN code through prompt 625 of a UI 630 for the pairing process 660. The PIN code may be used to authenticate the mobile device 100 to the image forming apparatus "SCX-5738" 602. In other words, in order for the mobile device 100 to be paired up with the image forming apparatus "SCX-5738" 602 as a BYOD device, the PIN code may be authenticated. After the image forming apparatus "SCX-5738" 602 authenticates the PIN code, the image forming apparatus "SCX-5738" 602 may issue authentication information, such as credential information including a token and a secret (a secret key or a secret code) and transmit the credential information to the mobile device 100. The mobile device 100 may store the credential information (the token and the secret) in the storage unit 150, and transmit the credential information while transmitting a BYOD command to the image forming apparatus "SCX-5738" 602 to notify the image forming apparatus "SCX-5738" 602 that the BYOD command is a valid command. In other words, the image forming apparatus "SCX-5738" 602 may allow access to the BYOD service only to the mobile device 100 having the credential information so as to prevent another mobile device having an unauthenticated PIN code from using the BYOD service. The pairing process using the credential information will be described in detail later with reference to FIGS. 10 through 16B.

After the image forming apparatus "SCX-5738" 602 authenticates the PIN code and the image forming apparatus "SCX-5738" 602 and the mobile device 100 are paired up, the event registration process 670 begins.

The event registration process 670 selects an event to be received from the mobile device 100 from among various events generable by the image forming apparatus "SCX-5738" 602 after a BYOD connection is established, such as a print completion event, a paper low event, a paper jam event, and a scan completion event. Referring to a UI 640 for the event registration process 670, the mobile device 100 may receive event generation notifications regarding a "print completed" event and a "scan completed" event, which are selected from among various events, from the image forming apparatus "SCX-5738" 602, and may not receive event generation notifications regarding other events that are not selected.

In FIG. 6, in order for the mobile device 100 to connect to the image forming apparatus 200 as a BYOD device, the BYOD application 601 is executed, and the discovery process 650, the pairing process 660, and the event registration process 670 are performed. The discovery process 650, the pairing process 660, and the event registration process 670 will now be described in more detail.

Figure 7:
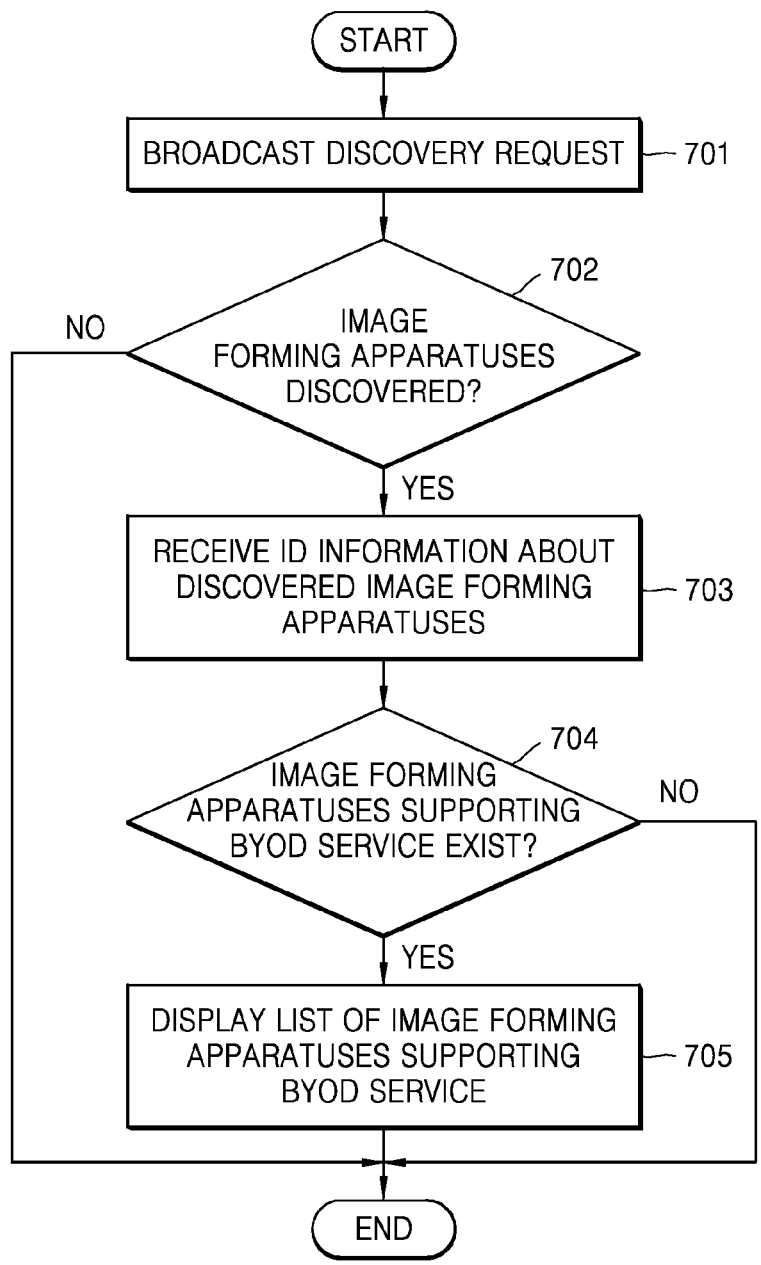
FIG. 7 is a flowchart of a discovery process of discovering an image forming apparatus to which a mobile device is to be connected to perform a BYOD service, according to an exemplary embodiment.

FIG. 7 is a flowchart of a discovery process 700 (similar to the discovery process 650 of FIG. 6) of discovering the image forming apparatus 200 of FIG. 1 to which the mobile device 100 of FIG. 1 is to be connected to perform a BYOD service, according to an exemplary embodiment. Referring to FIG. 7, the method may be performed by the components of the mobile device 100 of FIG. 3A or 3B.

In operation 701, the controller 110 of the mobile device 100 generates a discovery request for searching for image forming apparatuses connectable via the BYOD service, and the communication unit 140 (e.g., of FIGS. 3A and 3B) of the mobile device 100 broadcasts the discovery request. Here, the communication unit 140 may broadcast the discovery request through the mobile communication module 142 (e.g., of FIG. 3A) (e.g., 3G or 4G) or the wireless communication module 144 (e.g., of FIG. 3A) (e.g., Wi-Fi, WFD, Bluetooth, or NFC).

In operation 702, the controller 110 of the mobile device 100 determines whether image forming apparatuses are discovered based on a result of the broadcasting. If no image forming apparatus is discovered, the discovery process 700 is ended. If image forming apparatuses are discovered, operation 703 is performed.

In operation 703, the communication unit 140 of the mobile device 100 receives identification (ID) information about the discovered image forming apparatuses from the discovered image forming apparatuses. Here, the ID information may include information about a model name of an image forming apparatus, whether a BYOD service is supported, a connection method of the image forming apparatus, an IP address of the image forming apparatus, a location of the image forming apparatus, a description of the image forming apparatus, or whether the image forming apparatus is registered as a favorite.

In operation 704, the controller 110 of the mobile device 100 determines whether there are image forming apparatuses supporting the BYOD service from among the discovered image forming apparatuses, based on the received ID information. If no image forming apparatus supports the BYOD service, the discovery process is ended. If there are image forming apparatuses supporting the BYOD service, operation 705 is performed.

In operation 705, the display unit 120 (e.g., of FIG. 3A) of the mobile device 100 displays a list of the image forming apparatuses supporting the BYOD service.

After receiving the ID information, the mobile device 100 may transmit a pairing request to the image forming apparatus 200 in order to perform a pairing process following the discovery process 700.

Figure 8:
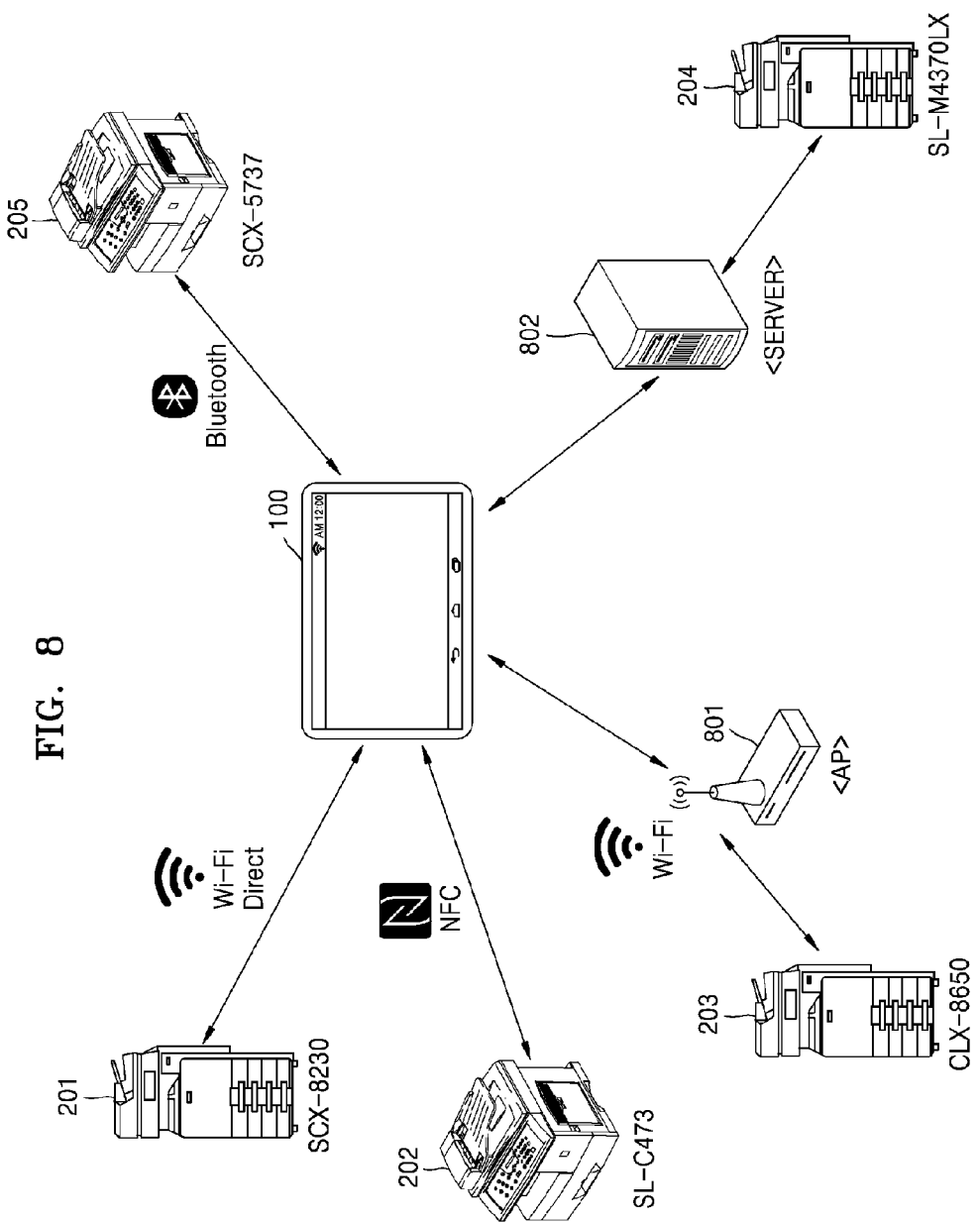
FIG. 8 is a diagram of a BYOD connection environment in which a mobile device discovers image forming apparatuses to perform a BYOD service, according to an exemplary embodiment.

FIG. 8 is a diagram of a BYOD connection environment 800 in which the mobile device 100 of FIG. 1 discovers image forming apparatuses to perform a BYOD service, according to an exemplary embodiment.

Referring to FIG. 8, the communication unit 140 (e.g., of FIG. 3A) of the mobile device 100 may discover image forming apparatuses via WFD, NFC, Wi-Fi, Bluetooth, and 3G or 4G mobile communications. In detail, the mobile device 100 may discover "SCX-8230" 201 that is an adjacent image forming apparatus connectable via WFD 804 by activating a WFD module (not shown), discover "SL-C473" 202 that is an adjacent image forming apparatus connectable via NFC 808 by activating an NFC module (not shown), and discover "SCX-5737" 205 that is an adjacent image forming apparatus connectable via Bluetooth 812 by activating a Bluetooth module (not shown).

Also, the mobile device 100 may discover "CLX-8650" 203 that is an image forming apparatus connected to an AP 801 via a network by being wirelessly connected to the AP 801 via Wi-Fi 816. When the mobile device 100 exists in the same network environment as an image forming apparatus, for example, "CLX-8650" 203, i.e., when the mobile device 100 is connected to "CLX-8650" 203 through the AP 801, the mobile device 100 may discover "CLX-8650" 203 by using a method, such as universal plug and play (UPnP), Bonjour, simple network management protocol (SNMP), or multicast domain name system (mDNS). However, even if the mobile device 100 and "CLX-8650" 203 are not in the same network environment, "CLX-8650" may be discovered in the same manner.

In addition, the mobile device 100 may discover "SL-M4370LX" 204 that is a remote image forming apparatus (e.g., in another region or in a foreign country) connected to an external server (e.g., a web server, a cloud server, or a mobile carrier server) 802 via a network, by connecting to the external server 802 through 3G or 4G mobile communications. In other words, the mobile device 100 may discover image forming apparatuses at close or far distances by using various types of communication methods.

Figure 9:
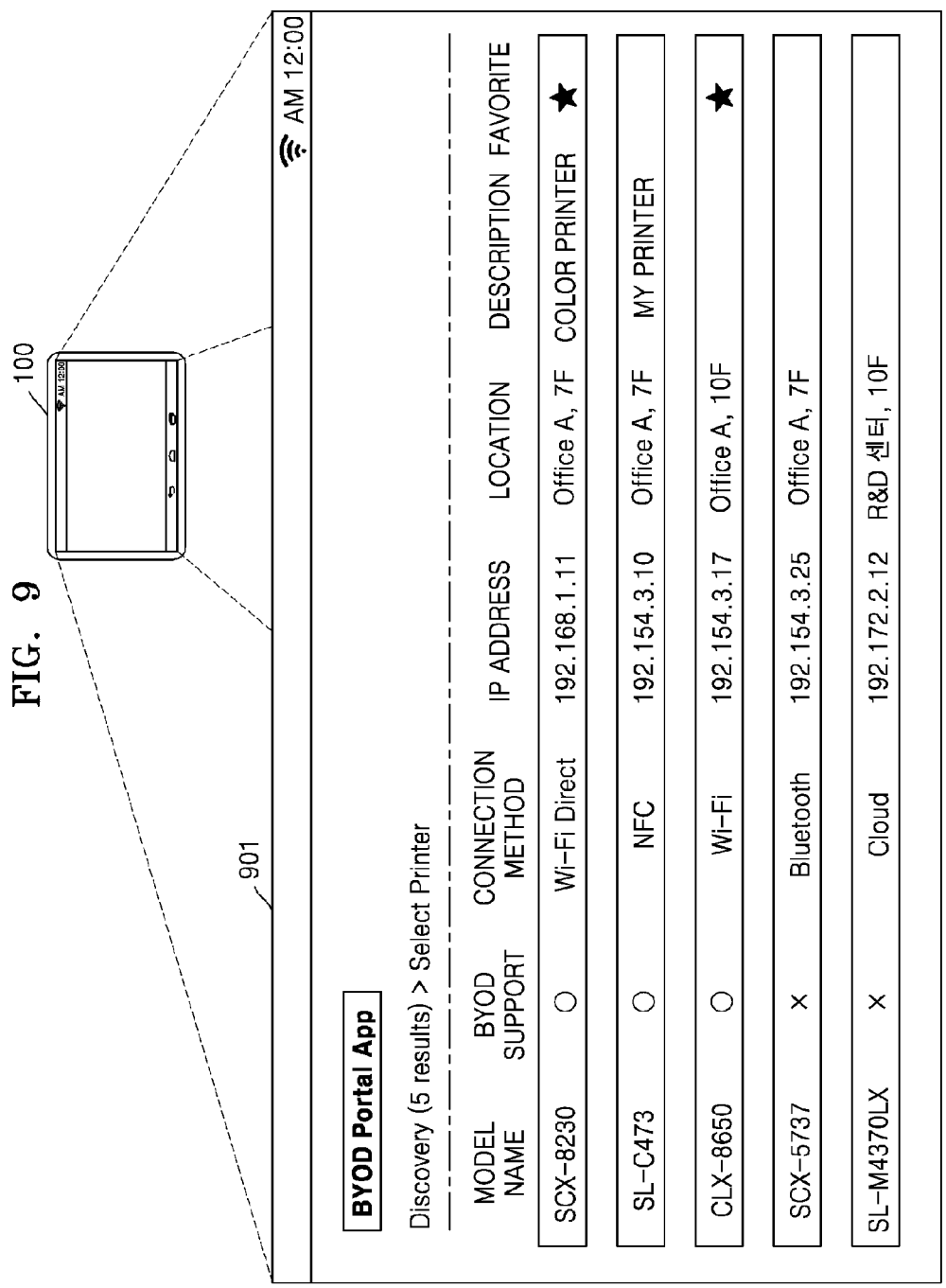
FIG. 9 illustrates a UI of a mobile device, which shows a result of discovering image forming apparatuses to perform a BYOD service, according to an exemplary embodiment.

FIG. 9 illustrates a UI 901 of the mobile device 100 of FIG. 1, which shows a result of discovering image forming apparatuses to perform a BYOD service, according to an exemplary embodiment.

In FIG. 9, it is assumed that five image forming apparatuses, i.e., "SCX-8230" 201, "SL-C473" 202, "CLX-8650" 203, "SL-M4370LX" 204, and "SCX-5737" 205 of FIG. 8, are discovered by the mobile device 100.

In the UI 901, ID information of the image forming apparatuses, which includes information about model names, whether the BYOD service is supported, connection methods, IP addresses, locations, descriptions, and whether the image forming apparatuses are registered as a favorite, may also be displayed. A user may select one of the image forming apparatuses displayed on the UI 901, for example, "SCX-8230", so as to connect the mobile device 100 to "SCX-8230", as a BYOD device.

Meanwhile in FIG. 9, the image forming apparatuses ("SCX-5737" and "SL-M4370LX") that do not support the BYOD service are also displayed on the UI 901. However, in operations 704 and 705 of FIG. 7, only the image forming apparatuses ("SCX-8230", "SL-C473", and "CLX-8650") supporting the BYOD service are displayed. An exemplary embodiment is not limited, and the result of discovering image forming apparatuses may also include a list of the image forming apparatuses ("SCX-5737" and "SL-M4370LX") that do not support the BYOD service, or may only include a list of image forming apparatuses ("SCX-8230", "SL-C473" and "CLX-8650") that support the BYOD service.

Figure 10:
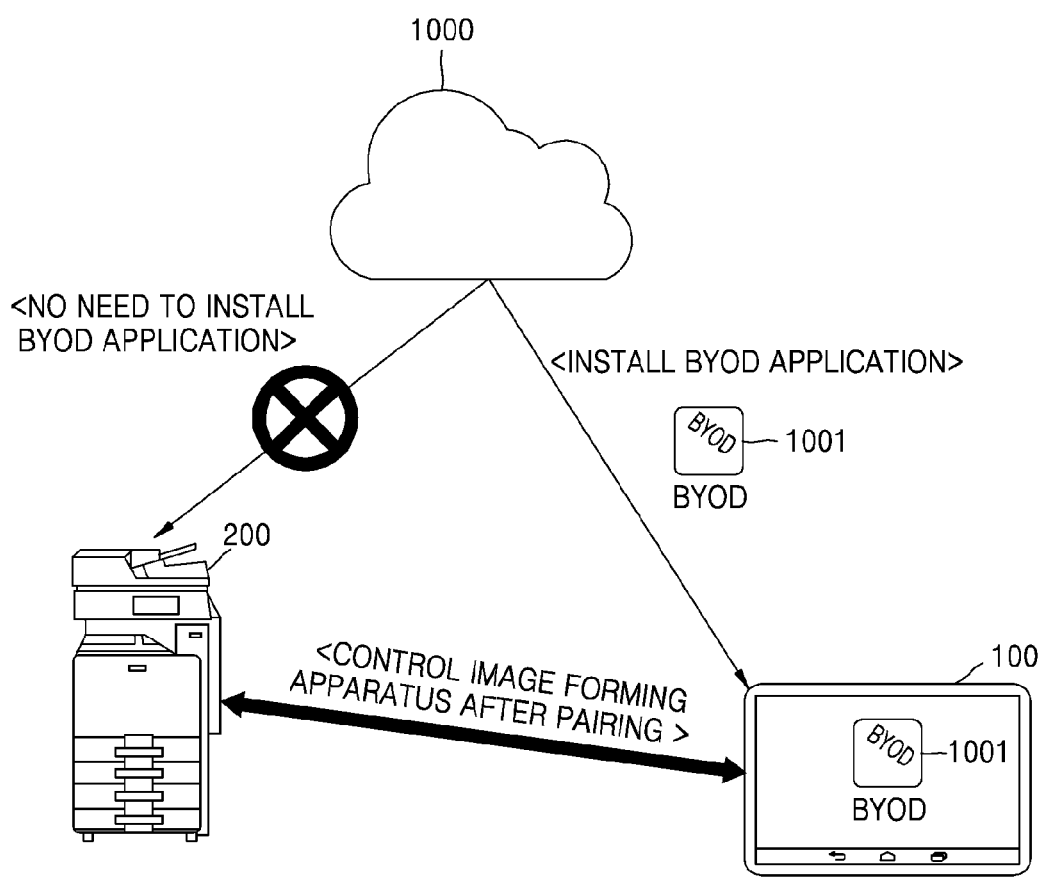
FIG. 10 is a diagram for describing installation of a BYOD application, according to an exemplary embodiment.

FIG. 10 is a diagram for describing installation process of a BYOD application, according to an exemplary embodiment.

In a general pairing technology, a certain application needs to be installed in both devices to be paired, and the devices are paired by the certain application. In other words, when the certain application is installed in a device, the certain application provides permission to control the device and stores application information in a system of the device such that the certain application is driven even after the device is turned on or off. In other words, when the certain application is installed, the certain application has authority to control the device.

However, according to a BYOD environment described in one or more exemplary embodiments, a BYOD application 1001 downloaded from an external server 1000 may not be installed on the image forming apparatus 200, while the BYOD application 1001 is installed in the mobile device 100 without depending from the image forming apparatus 200. Thus, pairing for a BYOD service described in one or more exemplary embodiments may be established only by using the BYOD application 1001 installed only in the mobile device 100. In other words, in the BYOD environment described in one or more exemplary embodiment, the image forming apparatus 200 may be controlled under authority of the BYOD application 1001 installed only in the mobile device 100.

In order to control the image forming apparatus 200 to be paired by using the BYOD application 1001 installed only in the mobile device 100, the BYOD application 1001 needs to be identified and an authority of the BYOD application 1001 needs to be set. Here, credential information (a token and a secret) issued by the image forming apparatus 200 may be used to identify the BYOD application 1001, and an event registering process similar to the event registration process 670 of FIG. 6 may be required to set the authority of the BYOD application 1001.

After the pairing is completed, the image forming apparatus 200 may determine that various types of commands (e.g., an API invocation) transmitted from the BYOD application 1001 installed in the mobile device 100 are reliable until the pairing is disconnected.

Figure 11:
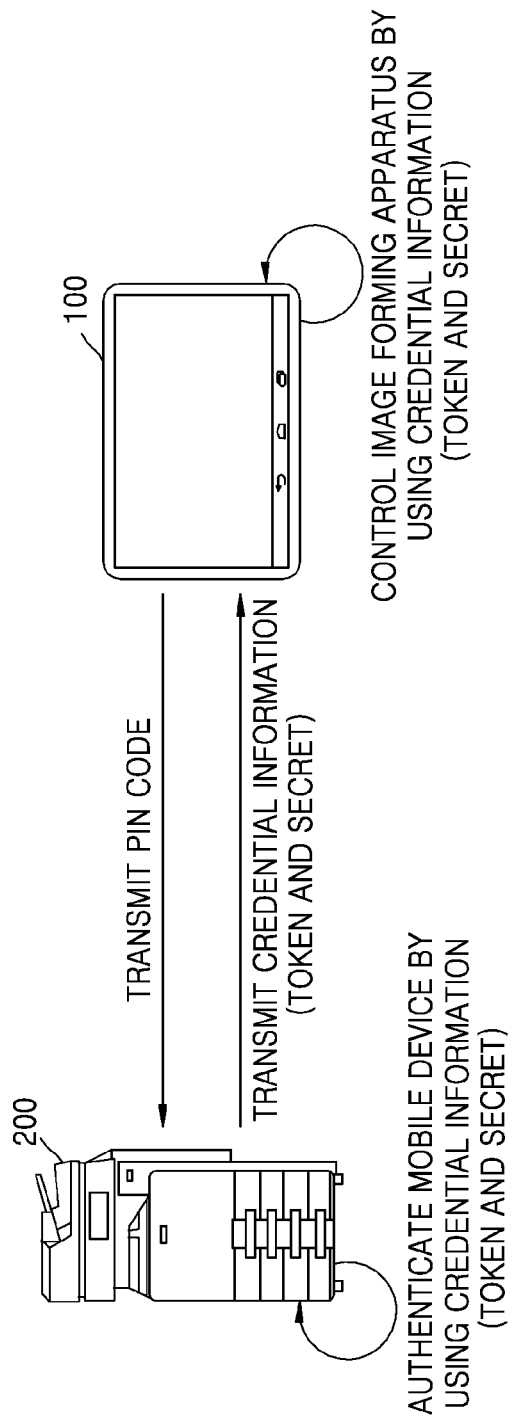
FIG. 11 is a diagram for describing information exchange performed during a pairing process between a mobile device and an image forming apparatus to perform a BYOD service, according to an exemplary embodiment.

FIG. 11 is a diagram for describing information exchange performed during a pairing process between the mobile device 100 and the image forming apparatus 200 to perform a BYOD service, according to an exemplary embodiment.

Referring to FIG. 11, the input unit 130 (e.g., of FIG. 3A) of the mobile device 100 receives information about a PIN code from a user as described above with reference to FIG. 6. When the mobile device 100 transmits the PIN code to the image forming apparatus 200, the image forming apparatus 200 issues and returns (or transmits) credential information (a token and a secret) to the mobile device 100 in response to the PIN code.

The credential information issued by the image forming apparatus 200 is used to identify the mobile device 100 (a BYOD application installed in the mobile device 100). The mobile device 100 may transmit a command for controlling the image forming apparatus 200 together with the credential information to the image forming apparatus 200 to notify the image forming apparatus 200 that the command is valid, and the image forming apparatus 200 may authenticate the mobile device 100 by using the credential information to determine that the command is valid.

Meanwhile, in one or more exemplary embodiments, terms such as a token and a secret are used, but it would be obvious to one of ordinary skill in the art that the terms may be changed to other terms, such as key, as long as the terms are used to identify the mobile device 100 (the BYOD application installed in the mobile device 100).

Figure 12:
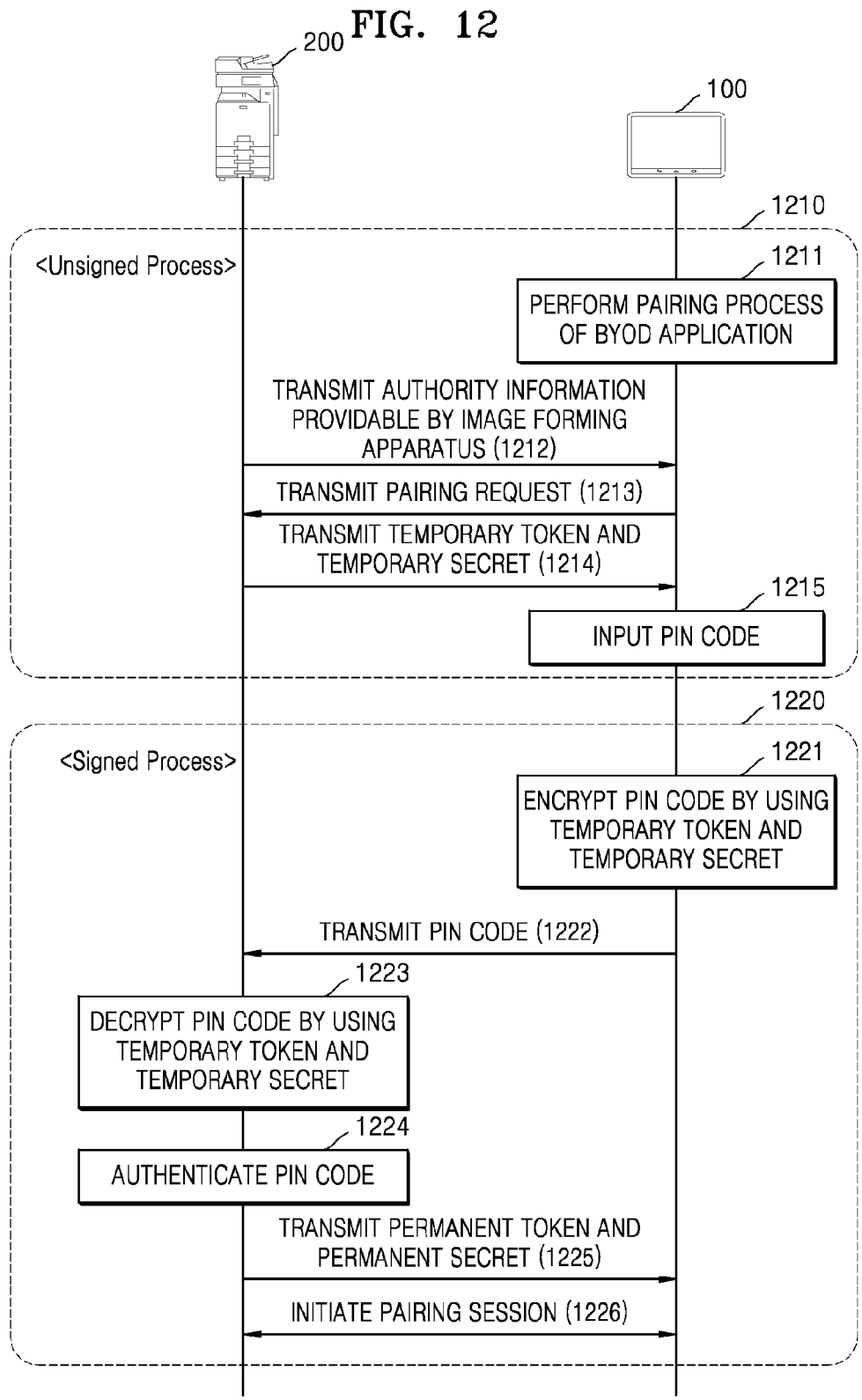
FIG. 12 is a detailed flowchart of a pairing process between a mobile device and an image forming apparatus to perform a BYOD service, according to an exemplary embodiment.

FIG. 12 is a detailed flowchart of a pairing process between the mobile device 100 and the image forming apparatus 200 to perform a BYOD service, according to an exemplary embodiment.

Referring to FIG. 12, operations 1211 through 1215 are an unsigned process 1210 in which information in an unencrypted (unsigned) state is exchanged, and operations 1221 through 1226 are a signed process 1220 in which information in an encrypted (signed) state is exchanged. The pairing process of FIG. 12 may be performed by the components of the image forming apparatus 200 and the mobile device 100 described above with reference to FIGS. 2A through 3B. The unsigned process 1210 may be performed as a BYOD application of the mobile device 100 requests the image forming apparatus 200 for an unsigned API for pairing by using a secure sockets layer (SSL)/transport layer security (TLS), and the image forming apparatus 200 allows the request.

In operation 1211, the mobile device 100 (the controller 110) performs the pairing process of the BYOD application. Here, it is assumed that the BYOD application being executed in the mobile device 100 has already performed a discovery process similar to the discovery process 650 and selected the image forming apparatus 200 as described above with reference to FIGS. 6 through 9.

In operation 1212, the image forming apparatus 200 through the communication unit 230 (of FIG. 2A) transmits authority information providable by the image forming apparatus 200 to the mobile device 100. Here, the authority information includes information and/or functions of the image forming apparatus 200, which allow the mobile device 100 to access, and may contain information about options related to a printing function, options related to a scanning function, options related to a facsimile function, options related to a copy function, notifications related to state change events, notifications related to error events, and notifications related to job process events.

In operation 1213, the mobile device 100 through the communication unit 140 (e.g., of FIG. 3A) transmits a pairing request to the image forming apparatus 200 via the communication unit 230.

The image forming apparatus 200 via the main controller 220 of FIG. 4 issues temporary credential information (a temporary token and a temporary secret), and the image forming apparatus 200 through the communication unit 230 returns (or transmits) the temporary credential information to the mobile device 100 via the communication unit 140, in operation 1214.

In operation 1215, the mobile device 100 via the input unit 130 (e.g., of FIG. 3A) receives information about a PIN code from a user. In other words, the user inputs the PIN code through the input unit 130. The PIN code may be used to determine that the mobile device 100 is valid as a BYOD device with respect to the image forming apparatus 200. The PIN code may be issued by a manager who manages a BYOD environment or by the image forming apparatus 200, for example, via the main controller 220.

In operation 1221, the mobile device 100 through the controller 110 (e.g., of FIG. 3A) encrypts the PIN code by using the temporary credential information. Here, the mobile device 100 (the controller 110) may encrypt the PIN code with the temporary credential information according to any one of well-known encryption methods, such as a hash algorithm and a secret-key encryption algorithm.

In operation 1222, the mobile device 100 through the communication unit 140 transmits the encrypted PIN code to the image forming apparatus 200 via the communication unit 230 (e.g., of FIG. 2A).

If the main controller 220 or the communication unit 230 of the image forming apparatus 200 does not receive the encrypted PIN code within a certain period time after the temporary credential information is returned (or transmitted) in operation 1214, the main controller 220 of the image forming apparatus 200 may cancel the pairing process and discard the temporary credential information.

In operation 1223, the image forming apparatus 200 through the main controller 220 (e.g., of FIG. 2A) decrypts the encrypted PIN code by using the temporary credential information.

In operation 1224, the image forming apparatus 200 through the main controller 220 (e.g., of FIG. 2A) authenticates the decrypted PIN code. In other words, the image forming apparatus 200 through the main controller 220 (e.g., of FIG. 2A) determines whether the decrypted PIN code is a valid PIN code assigned to the mobile device 100 such that the mobile device 100 operates as a BYOD device with respect to the image forming apparatus 200.

When it is determined that the decrypted PIN code is valid, the image forming apparatus 200 through the main controller 220 (e.g., of FIG. 2A) issues permanent credential information (a permanent token and a permanent secret), and the image forming apparatus 200 through the communication unit 230 (e.g., of FIG. 2A) transmits the permanent credential information to the mobile device 100 via the communication unit 140 (e.g., of FIG. 3A) in operation 1225. The permanent credential information may be information for assigning authority to the mobile device 100 to control functions of the image forming apparatus 200. In other words, the permanent credential information may be information for assigning authority to the mobile device 100 to control the functions of the image forming apparatus 200.

The term "permanent" may be interpreted that the permanent credential information is valid until the image forming apparatus 200 or the mobile device 100 discards the permanent credential information. Meanwhile, since the decrypting of the encrypted PIN code is completed, the image forming apparatus 200 through the main controller 220 (e.g., of FIG. 2A) discards the temporary credential information. In other words, the temporary credential information is used only during an encrypting or decrypting process of a PIN code, which is a part of the pairing process.

The temporary token and the permanent token may have different values, and the temporary secret and the permanent secret may also have different values.

Figure 15:
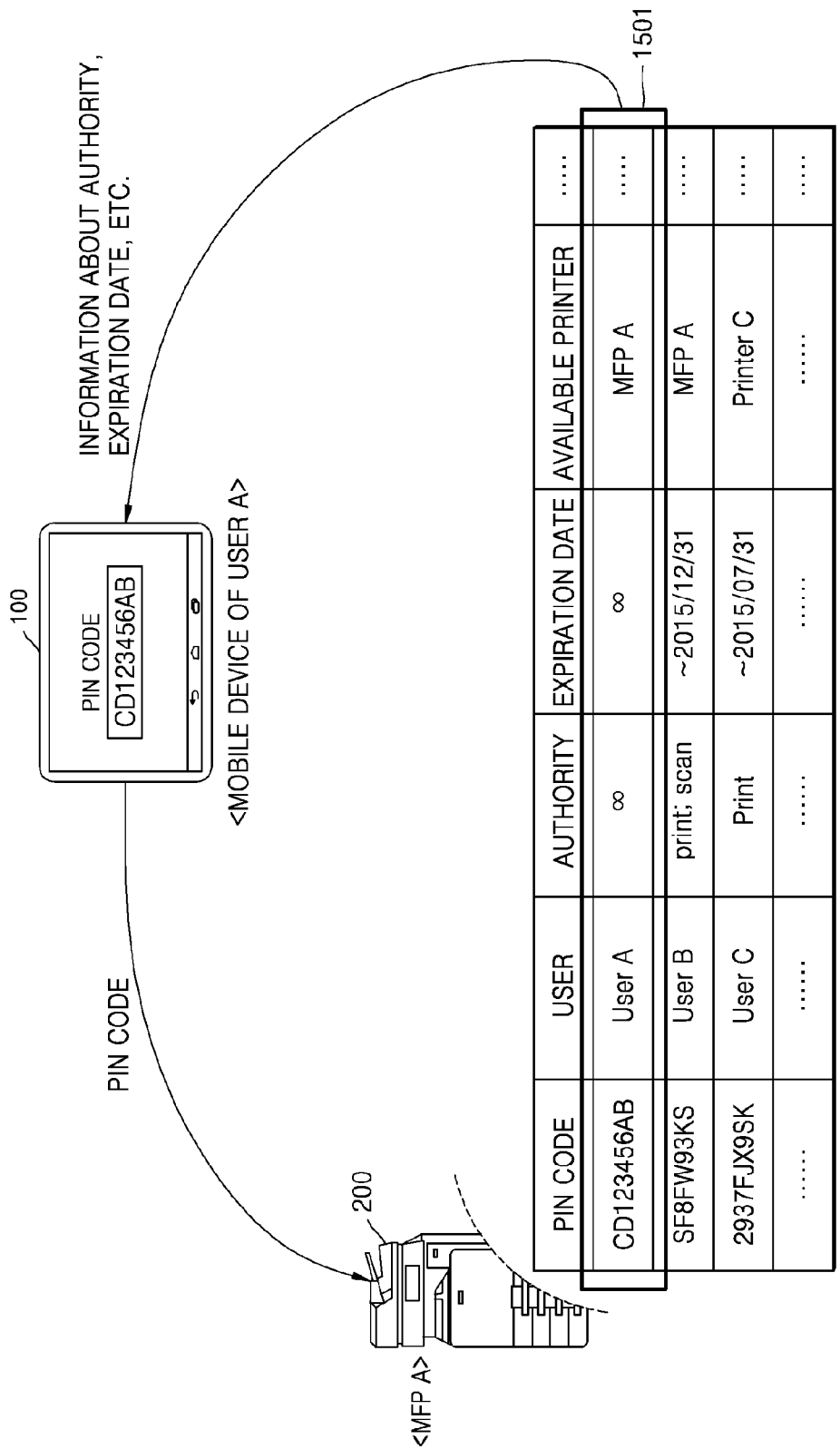
FIG. 15 is a diagram for describing an image forming apparatus transmitting authority assigned to a personal identification number (PIN) code to a mobile device, after authenticating the PIN code, according to an exemplary embodiment.

Although not shown in operation 1225, the image forming apparatus 200 through the main controller 220 (e.g., of FIG. 2A) may determine authority assigned to the PIN code as shown in FIG. 15, in operation 1225. Then, the image forming apparatus 200 through the communication unit 230 (e.g., of FIG. 2A) may transmit information about the authority assigned to the PIN code (e.g., information 1501 of FIG. 15) to the mobile device 100 via the communication unit 140 (e.g., of FIG. 3A) in operation 1225.

In operation 1226, the image forming apparatus 200 through the main controller 220 and the communication unit 230 (e.g., of FIG. 2A) and the mobile device 100 via the controller 110 and the communication unit 140 (e.g., of FIG. 3A) initiate a pairing session, thereby completing the pairing process. In other words, the mobile device 100 may be a reliable as a BYOD device for controlling the image forming apparatus 200.

FIG. 13A is a diagram for describing authority information provided from the image forming apparatus 200 to the mobile device 100, according to an exemplary embodiment.

Referring to FIG. 13A, the authority information may be provided from the image forming apparatus 200 to the mobile device 100 in operation 1212 of FIG. 12. The authority information includes information about functions of the image forming apparatus 200, which the mobile device 100 is allowed to access, and may include list of authorities providable by the image forming apparatus 200, such as "saaLocalUiAccess", "saaJobCreation", "saaJobControl", "saaServiceMode", "saaUpComplete", "saaReadCardReader", "saaManageApplicationInstallation", "saaObtainThirdPartySession", "saaObtainSafeCredentials", and "saaObtainUnsafeCredentials".

FIG. 13B is a diagram for describing credential information (a token and a secret) provided from the image forming apparatus 200 (e.g., of FIG. 1) to the mobile device 100 (e.g., of FIG. 1), according to an exemplary embodiment.

A token ("jjhhmht6kngt545") and a secret ("aalljnzxy678687jasd") shown in FIG. 13B may respectively be a temporary token and a temporary secret, or a permanent token and a permanent secret.

Figure 14:
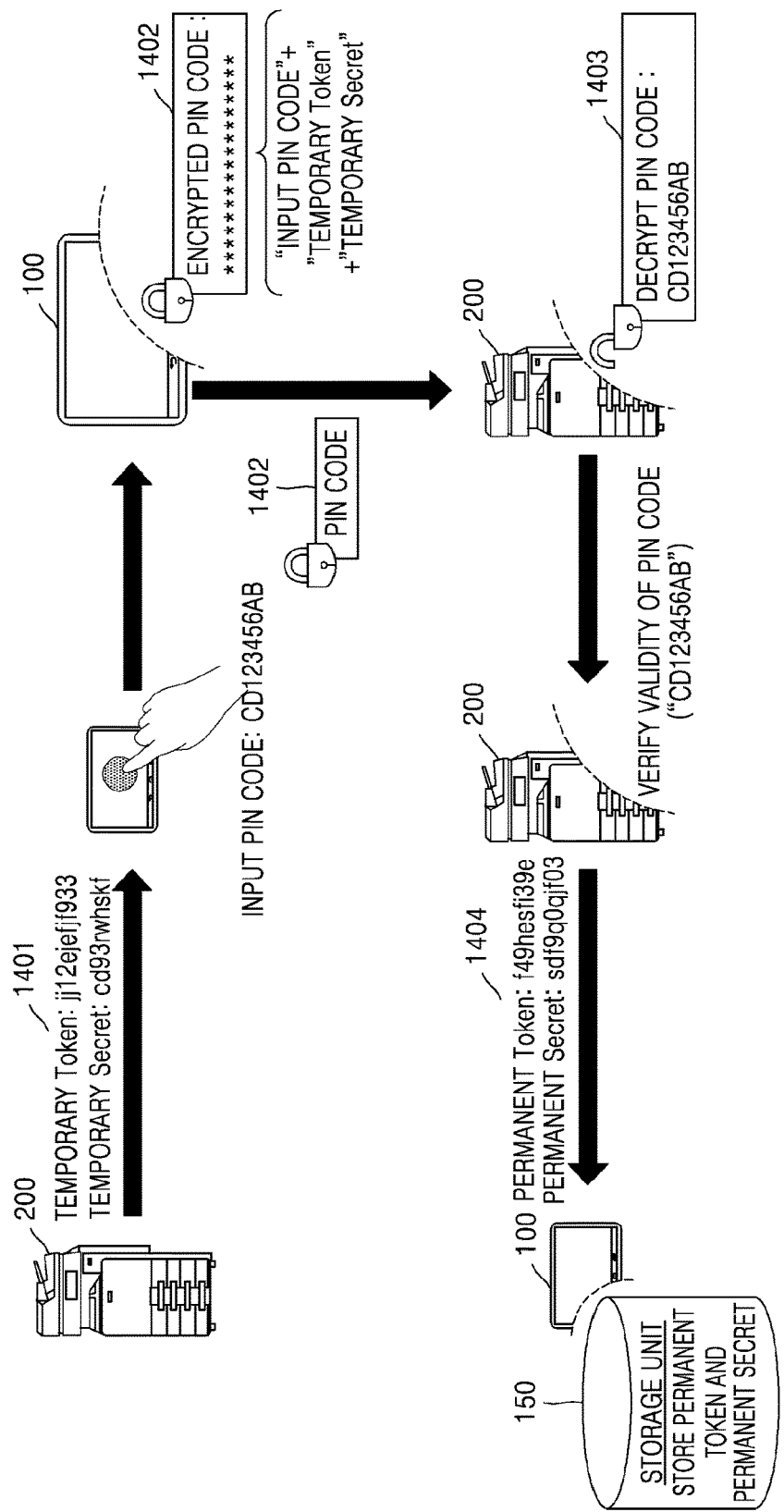
FIG. 14 is a diagram of a pairing process between a mobile device and an image forming apparatus to perform a BYOD service, according to an exemplary embodiment.

FIG. 14 is a diagram of a pairing process (similar the pairing process 660 discussed above, e.g., with respect to FIG. 6) between a mobile device 100 (similar to the mobile device 100 of FIG. 1) and an image forming apparatus 200 (similar to the mobile device 100 of FIG. 1) to perform a BYOD service, according to an exemplary embodiment.

Referring to FIG. 14, during the pairing process, the image forming apparatus 200 transmits temporary credential information (a temporary token ("jj12ejefjf933") and a temporary secret (cd93rwhskf)) 1401 to the mobile device 100.

Upon receiving a PIN code ("CD123456AB") from a user, the mobile device 100 encrypts the PIN code by using the temporary credential information 1401 to obtain an encrypted PIN code 1402. Then, the encrypted PIN code 1402 is transmitted to the image forming apparatus 200.

The image forming apparatus 200 decrypts the encrypted PIN code 1402 by using the temporary credential information 1401 to obtain a decrypted PIN code 1403. The image forming apparatus 200 verifies validity of the decrypted PIN code 1403 to determine whether the mobile device 100 transmitted a valid PIN code to operate as a BYOD device.

When the decrypted PIN code 1403 is valid, the image forming apparatus 200 transmits permanent credential information (a permanent token ("f49hesfi39e") and a permanent secret ("sdf9q0qjf03")) 1404 to the mobile device 100. The mobile device 100 stores the permanent credential information 1404 in the storage unit 150. As such, the pairing process is completed, and the mobile device 100 may be deemed or considered reliable as a BYOD device for controlling the image forming apparatus 200. The permanent credential information 1404 stored in the storage unit 150 may continuously exist in the mobile device 100 for the BYOD service until the user erases the permanent credential information 1404. In some embodiments, the user may intentionally erase the permanent credential information 1404 with an erasion process (not shown).

After the pairing process, when the mobile device 100 is to transmit a certain command to the image forming apparatus 200, as a BYOD device, the mobile device 100 may transmit the permanent credential information 1404 together with the certain command so as to notify the image forming apparatus 200 that the certain command is a valid command transmitted by the BYOD device. In other words, when a device transmits a command without permanent credential information (a permanent token and a permanent secret) to the image forming apparatus 200, the image forming apparatus 200 may determine that the command is not valid. In other words, when a mobile device that does not include permanent credential information (a permanent token and a permanent secret) transmits a control command, the image forming apparatus 200 may ignore or discard the control command.

FIG. 15 is a diagram for describing the image forming apparatus 200 transmitting authority assigned to a PIN code to the mobile device 100, after authenticating the PIN code, according to an exemplary embodiment.

FIG. 15 illustrates a management table 1500 in which usable authority and an expiration date are assigned according to types of a PIN code. It is assumed that a PIN code input through the mobile device 100 of a user A during a pairing process (similar to the pairing process 660 of FIG. 6, and the pairing processes discussed above) is "CD123456AB". When a PIN code obtained by decrypting an encrypted PIN code received from the mobile device 100 is "CD123456AB", the image forming apparatus 200 ("MFP A") may transmit the information 1501 about authority ("∞") and an expiration date ("∞") assigned to the PIN code "CD123456AB" to the mobile device 100. As such, the mobile device 100 that is a BYOD device to which the PIN code "CD123456AB" is assigned may use the image forming apparatus 200 without limitations related to the authority and the expiration date. In other words, when it is determined that a PIN code is valid, the image forming apparatus 200 may transmit authority information for accessing the image forming apparatus 200, which is assigned to the PIN code, to the mobile device 100.

However, when a PIN code is "SF8FW93KS" and a user of the mobile device 100 is not the user A, the mobile device 100 may not operate as a BYOD device. Also, even if the user of the mobile device 100 is a user B, when the PIN code input through the mobile device 100 is "SF8FW93KS", the mobile device 100 is able to use only print and scanning functions of the image forming apparatus 200 only until 31 Dec. 2015.

The management table 1500 may be a table in which authority information, such as separate (different) authorities and expiration dates, is assigned according to values of PIN codes, as a BYOD device setting information assigned by a manager of a BYOD environment or an image forming apparatus. Accordingly, the image forming apparatus 200 or a manager of a BYOD environment may set the management table 1500 to adjust authority of a BYOD device.

Figure 16A:
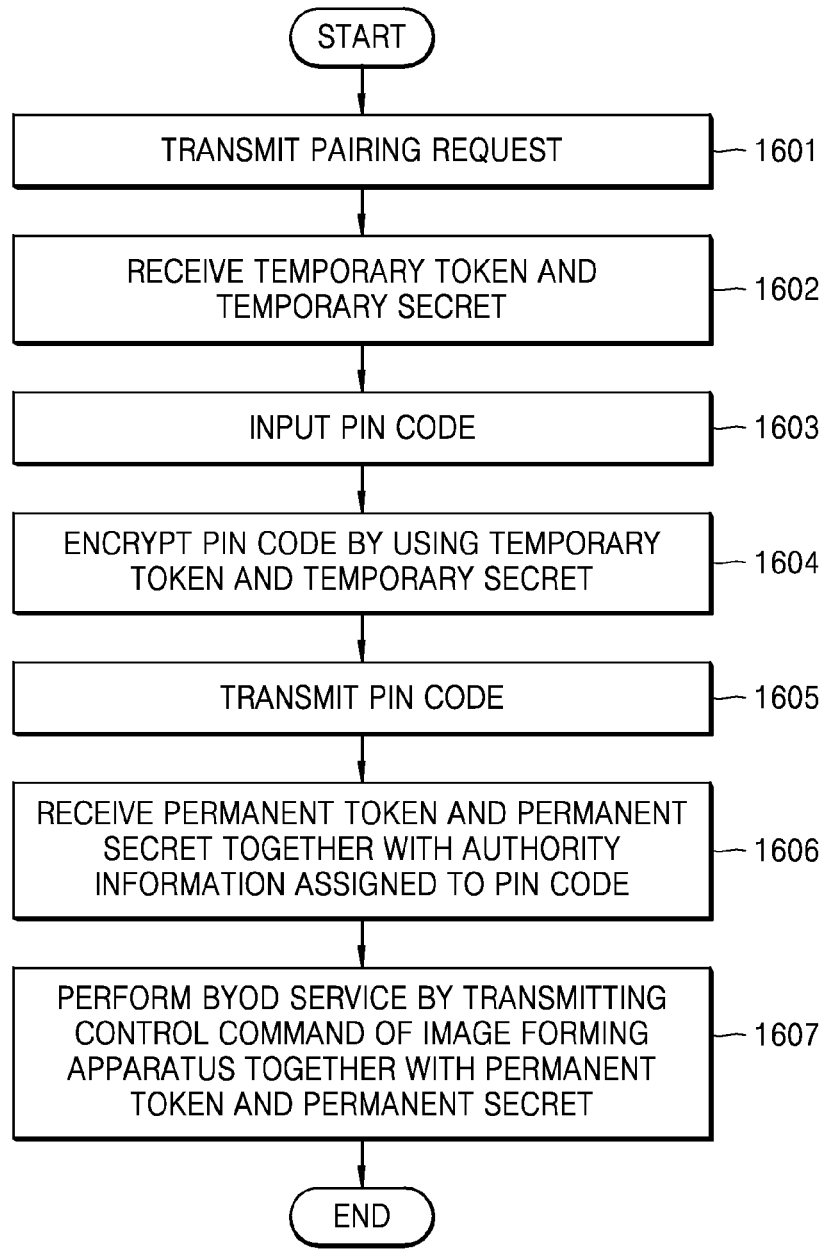
FIG. 16A is a flowchart of a pairing process performed by a mobile device, according to an exemplary embodiment.

FIG. 16A is a flowchart of a pairing process (similar to the pairing process 660 of FIG. 6, and the pairing processes discussed above) performed by the mobile device 100, according to an exemplary embodiment.

In operation 1601, the communication unit 140 of the mobile device 100 (e.g., of FIG. 1) transmits a pairing request to the communication unit 230 (e.g., of FIG. 2A) of the image forming apparatus 200 (e.g., of FIG. 1).

In operation 1602, the communication unit 140 of the mobile device 100 receives temporary credential information (a temporary token and a temporary secret) issued by the main controller 220 (e.g., of FIG. 2A) of the image forming apparatus 200.

In operation 1603, the input unit 130 (e.g., of FIG. 3A) of the mobile device 100 receives information about a PIN code from a user. In other words, the user inputs the PIN code through the input unit 130 of the mobile device 100.

In operation 1604, the controller 110 of the mobile device 100 encrypts the PIN code by using the temporary credential information.

In operation 1605, the communication unit 140 of the mobile device 100 transmits the PIN code to the communication unit 230 (e.g., of FIG. 2A) of the image forming apparatus 200.

After the main controller 220 (e.g., of FIG. 2A) of the image forming apparatus 200 authenticates the PIN code, the communication unit 140 (e.g., of FIG. 3A) of the mobile device 100 receives permanent credential information (a permanent token and a permanent secret) together with authority information assigned to the PIN code (the information 1501 assigned by the management table 1500 of FIG. 15), in operation 1606.

In operation 1607, the controller 110 of the mobile device 100 generates a control command of the image forming apparatus 200, and the communication unit 140 of the mobile device 100 transmits the control command together with the permanent credential information to the communication unit 230 of the image forming apparatus 200. As such, the controller 110 (e.g., of FIG. 3A) of the mobile device 100 may perform a BYOD service with respect to the image forming apparatus 200.

Figure 16B:
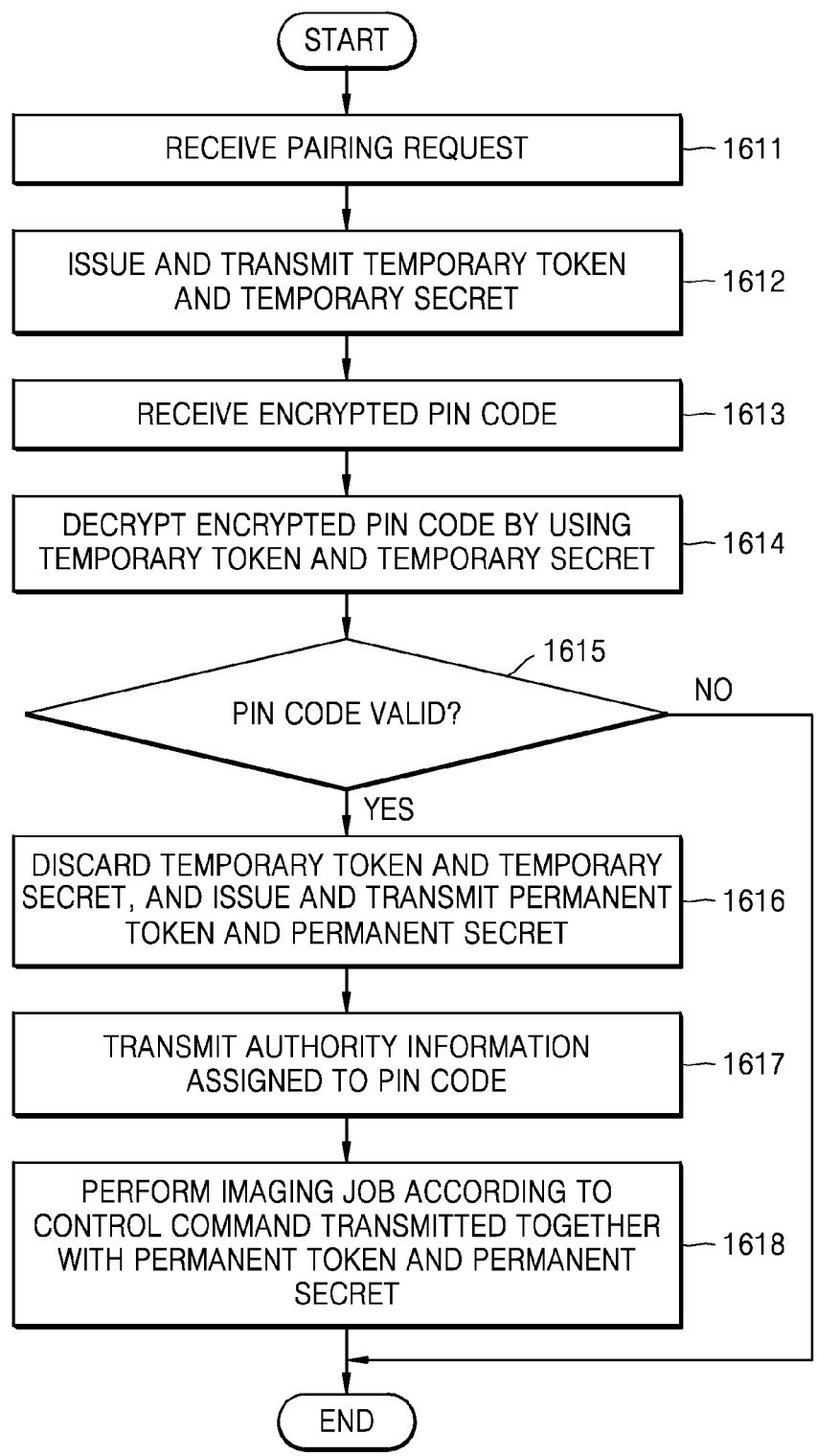
FIG. 16B is a flowchart of a pairing process performed by an image forming apparatus, according to an exemplary embodiment.

FIG. 16B is a flowchart of a pairing process performed by the image forming apparatus 200, according to an exemplary embodiment.

In operation 1611, the communication unit 230 (e.g., of FIG. 2A) of the image forming apparatus 200 receives a pairing request from the communication unit 140 of the mobile device 100.

In operation 1612, the main controller 220 (e.g., of FIG. 2A) of the image forming apparatus 200 issues temporary credential information (a temporary token and a temporary secret), and the communication unit 230 (e.g., of FIG. 2A) of the image forming apparatus 200 transmits the temporary credential information to the communication unit 140 of the mobile device 100.

In operation 1613, the communication unit 230 (e.g., of FIG. 2A) of the image forming apparatus 200 receives a PIN code encrypted by the controller 110 (e.g., of FIG. 3A) of the mobile device 100, from the communication unit 140 (e.g., of FIG. 3A) of the mobile device 100.

In operation 1614, the main controller 220 (e.g., of FIG. 2A) of the image forming apparatus 200 decrypts the encrypted PIN code by using the temporary credential information.

In operation 1615, the main controller 220 (e.g., of FIG. 2A) of the image forming apparatus 200 determines whether the decrypted PIN code is valid. When it is determined that the decrypted PIN code is not valid, the pairing process is ended. When it is determined that the decrypted PIN code is valid, operation 1616 is performed.

In operation 1616, the main controller 220 (e.g., of FIG. 2A) of the image forming apparatus 200 discards the temporary credential information and issues permanent credential information (a permanent token and a permanent secret) for the mobile device 100. The communication unit 230 (e.g., of FIG. 2A) of the image forming apparatus 200 transmits the permanent credential information to the communication unit 140 of the mobile device 100.

In operation 1617, the communication unit 230 of the image forming apparatus 200 transmits authority information assigned to the PIN code (the information 1501 assigned by the management table 1500 of FIG. 15) to the communication unit 140 of the mobile device 100.

In operation 1618, when the communication unit 230 of the image forming apparatus 200 receives a control command and the permanent credential information from the communication unit 140 (e.g., of FIG. 3A) of the mobile device 100, the main controller 220 (e.g., of FIG. 2A) of the image forming apparatus 200 controls the image forming apparatus 200 to perform an imaging job according to the control command. As such, the main controller 220 (e.g., of FIG. 2A) of the main forming apparatus 200 may perform a BYOD service by the mobile device 100.

Figure 17:
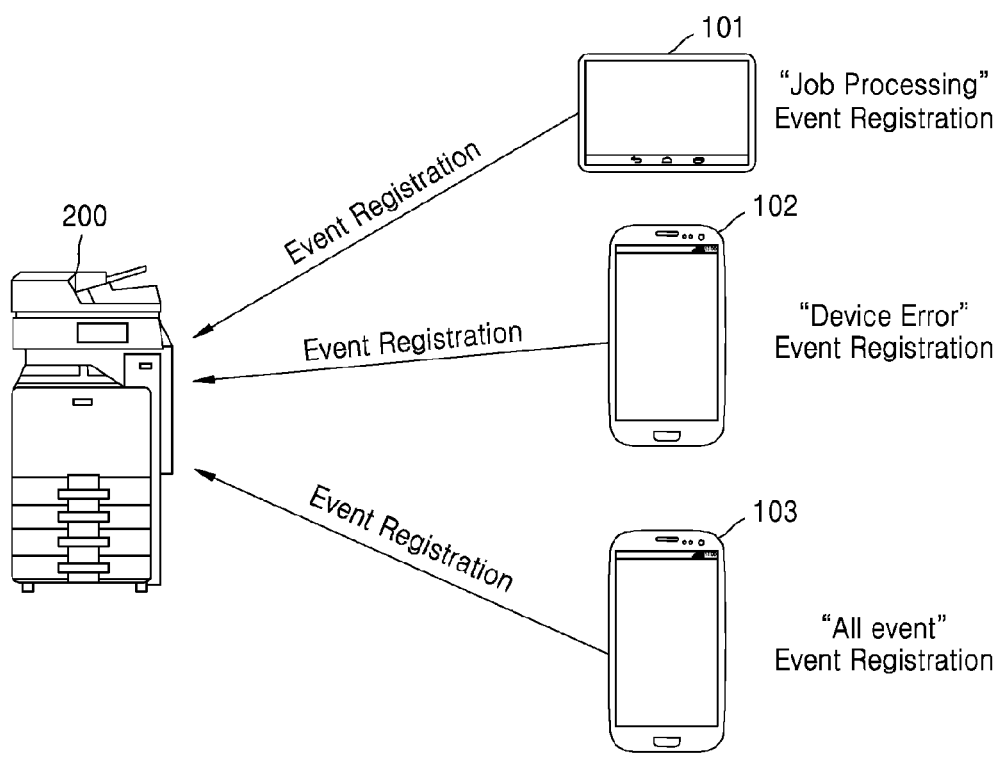
FIG. 17 is a diagram for describing an event registering process between mobile devices and an image forming apparatus to perform a BYOD service, according to an exemplary embodiment.

FIG. 17 is a diagram for describing an event registering process (similar to the event registering process 670 of FIG. 6, and the event registering processes discussed above) between mobile devices 101 through 103 (similar to the mobile device 100 of FIG. 1) and an image forming apparatus 200 (similar to the image forming apparatus 200 of FIG. 1) to perform a BYOD service, according to an exemplary embodiment.

Referring to FIG. 17, various types of the mobile devices 101 through 103 may each be connected to (paired up with) the image forming apparatus 200, as a BYOD device. Here, the mobile devices 101 through 103 may each correspond to the mobile device 101 or 105 described above.

When the mobile device 101 is paired up with the image forming apparatus 200, as a BYOD device, the mobile device 101 may register a desired event type so as to receive only a notification about generation of a certain event ("job processing").

The mobile device 101 may transmit a registration request of a list of events the mobile device 101 is to receive, from among events generatable in the image forming apparatus 200.

When an event about an imaging job process, such as print completion or scan completion, is generated in the image forming apparatus 200, the communication unit 140 of the mobile device 101 may receive a notification about a registered event from the communication unit 230 of the image forming apparatus 200. In other words, when an event included in the list of events is generated in the image forming apparatus 200, the image forming apparatus 200 may transmit a notification about the event to the mobile device 101. If the mobile device 101 did not register an event type and an event about an error is generated in the image forming apparatus 200, a notification about the event about the error may not be provided to the mobile device 101.

Similarly, when the mobile device 102 registers an event about an error ("device error"), the communication unit 140 (e.g., of FIG. 3A) of the mobile device 101 may receive only an event about an error (e.g., a paper low event, a paper jam event, or a toner low event) generated in the image forming apparatus 200 from the communication unit 230 (e.g., of FIG. 2A) of the image forming apparatus 200.

Meanwhile, the mobile device 103 may register all events ("all event") generable in the image forming apparatus 200, and thus a notification about an event may be provided through the display unit 120 of the mobile device 103 like the manipulator 210 (e.g., of FIG. 2A) of the image forming apparatus 200.

Figure 18:
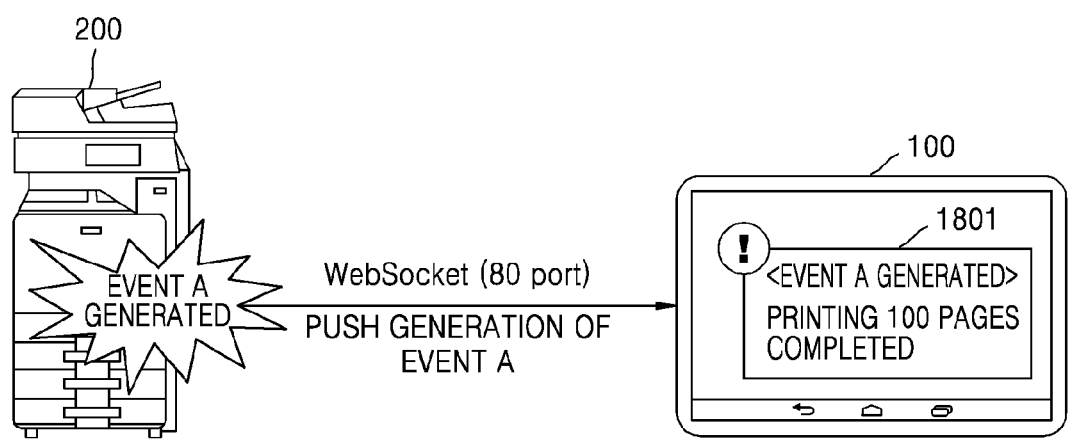
FIG. 18 is a diagram for describing a method of transmitting an event generated by an image forming apparatus to a mobile device, according to an exemplary embodiment.

FIG. 18 is a diagram for describing a method of transmitting an event generated by the image forming apparatus 200 to the mobile device 100, according to an exemplary embodiment.

Referring to FIG. 18, when an event, for example, an event A, registered by the mobile device 100 is generated in the image forming apparatus 200, the communication unit 230 of the image forming apparatus 200 may use an event transmission method of pushing generation of the event A to the communication unit 140 of the mobile device 100. In other words, whenever the event A registered by the mobile device 100 is generated in the image forming apparatus 200, the image forming apparatus 200 notifies the mobile device 100 about event generation by using a data push method. According to the data push method, an event notification message 1801 ("printing 100 pages completed!") is immediately provided through the display unit 120 of the mobile device 100, and thus a user using the image forming apparatus 200 through the mobile device 100 may immediately determine whether an event directed by him/herself is processed or whether an error is generated in the image forming apparatus 200. Moreover, a notification about the generation of the event A may be pushed to other mobile devices that registered the event A, as well as to the mobile device 100.

The communication unit 230 of the image forming apparatus 200 may use a WebSocket protocol as a protocol for transmitting event information. The WebSocket protocol is a protocol capable of real-time bidirectional communication, and may be realized in any one of various protocols, such as transfer control protocol/internet protocol (TCP/IP), HTTP, and user datagram protocol (UDP). Here, in order to communicate via the WebSocket protocol, a socket port needs to be set between the communication unit 230 (e.g., of FIG. 2A) of the image forming apparatus 200 and the communication unit 140 (e.g., of FIG. 3A) of the mobile device 100. In the current embodiment, an open 80 port may be used as the socket port for the WebSocket protocol, but the socket port is not limited thereto.

In FIG. 18, an event is transferred between the communication unit 230 of the image forming apparatus 200 and the communication unit 140 of the mobile device 100 via the data push method, but a method of transferring an event is not limited thereto, and any one of various methods, such as a data polling method and a data long polling method, may be used.

Figure 19A:
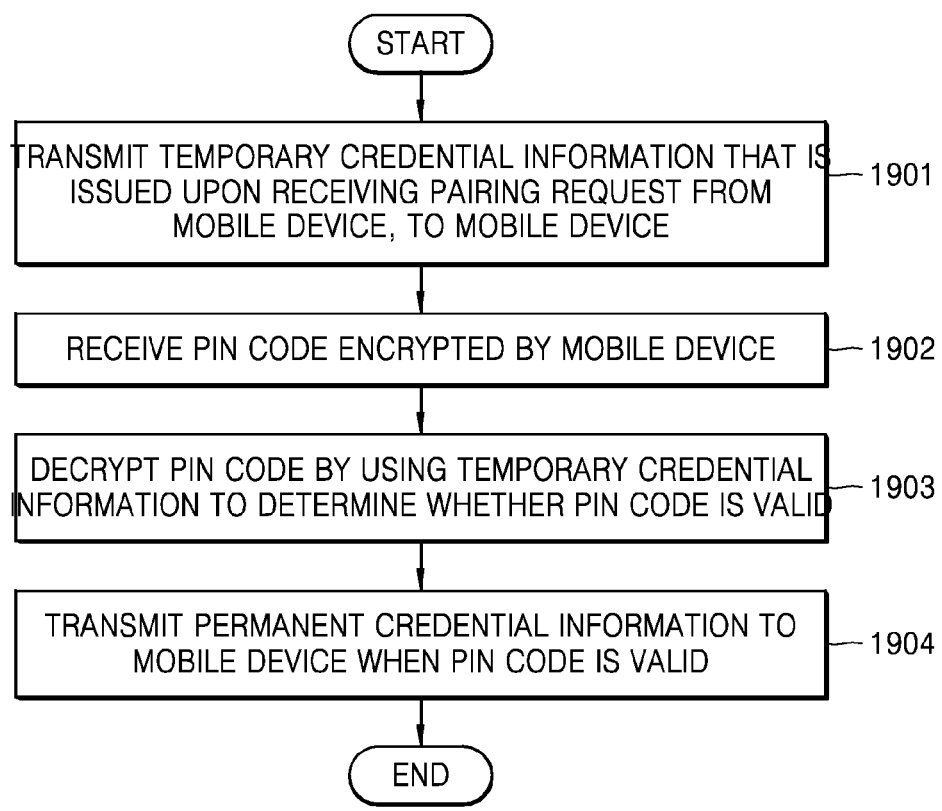
FIG. 19A is a flowchart of a method of establishing, by a mobile device, a connection with an image forming apparatus, according to an exemplary embodiment.

FIG. 19A is a flowchart of a method of establishing, by the mobile device 100 (e.g., of FIG. 1), a connection with the image forming apparatus 200 (e.g., of FIG. 1), according to an exemplary embodiment. Referring to FIG. 19A, the method includes operations that are performed by the image forming apparatus 200 in time-series, and thus details about the image forming apparatus 200 described above may be applied to the method of FIG. 19A even if not explicitly mentioned.

In operation 1901, the communication unit 230 (e.g., of FIG. 2A) of the image forming apparatus 200 transmits temporary credential information that is issued upon receiving a pairing request from the mobile device 100, to the mobile device 100.

In operation 1902, the communication unit 230 (e.g., of FIG. 2A) of the image forming apparatus 200 receives a PIN code encrypted by the mobile device 100.

In operation 1903, the main controller 220 (e.g., of FIG. 2A) of the image forming apparatus 200 decrypts the encrypted PIN code by using the temporary credential information to determine whether the decrypted PIN code is valid.

When it is determined that the PIN code is valid by the main controller 220 (e.g., of FIG. 2A), the communication unit 230 (e.g., of FIG. 2A) of the image forming apparatus 200 returns (or transmits) permanent credential information to the mobile device 100 in operation 1904.

Figure 19B:
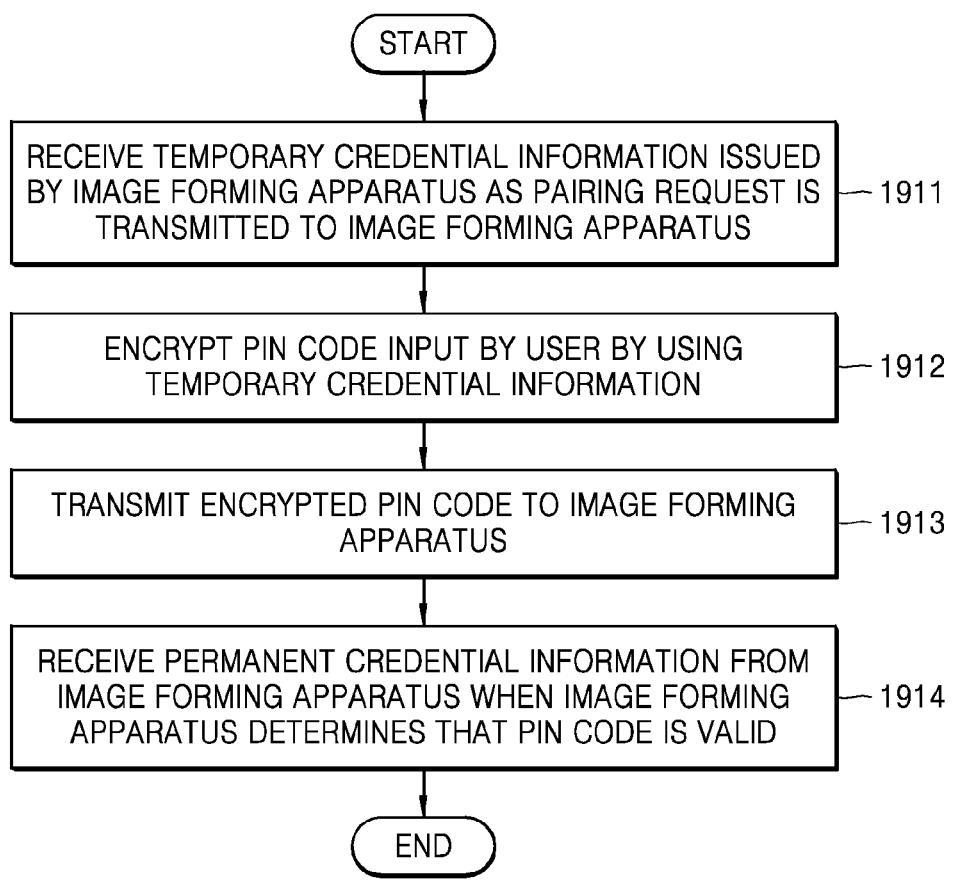
FIG. 19B is a flowchart of a method of establishing, by an image forming apparatus, a connection with a mobile device, according to an exemplary embodiment.

FIG. 19B is a flowchart of a method of establishing, by the image forming apparatus 200 (e.g., of FIG. 1), a connection with the mobile device 100 (e.g., of FIG. 1), according to an exemplary embodiment. Referring to FIG. 19B, the method includes operations that are performed by the mobile device 100 in time-series, and thus details about the mobile device 100 described above may be applied to the method of FIG. 19B even if not explicitly mentioned.

In operation 1911, the communication unit 140 of the mobile device 100 receives temporary credential information issued by the image forming apparatus 200 as the communication unit 140 transmits a pairing request to the image forming apparatus 200.

In operation 1912, the controller 110 (e.g., of FIG. 3A) of the mobile device 100 encrypts a PIN code input by a user, by using the temporary credential information.

In operation 1913, the communication unit 140 (e.g., of FIG. 3A) of the mobile device 100 transmits the encrypted PIN code to the image forming apparatus 200.

When it is determined that the PIN code is valid by the image forming apparatus 200, the communication unit 140 (e.g., of FIG. 3A) of the mobile device 100 receives permanent credential information from the image forming apparatus 200 in operation 1914.

Hereinafter, a method of setting, by a mobile device, a workform that defines an order of performing jobs by using functions of an image forming apparatus and the mobile device via a BYOD service, and performing a job by using the set workform will now be described.

FIG. 20 is a diagram of an environment of a mobile device 100 (similar to the mobile device 100 of FIG. 1) for generating, managing, and executing a workform by using a BYOD service, according to an exemplary embodiment.

Referring to FIG. 20, a user may generate and manage a workform by using the mobile device 100, in a BYOD environment according to an exemplary embodiment. Here, the workform defines an order of performing jobs by using functions of image forming apparatuses 200A and 200B (similar to the image forming apparatus 200 of FIG. 1) and the mobile device 100 (similar to the mobile device 100 of FIG. 1).

Here, the mobile device 100 is a portable electronic device that supports a wireless communication, such as a smart phone or a tablet PC, and the image forming apparatuses 200A and 200B is each an apparatus that supports an image forming job, such as scanning, printing, and faxing, such as a scanner, a printer, a facsimile, or a multifunction printer (MFP).

The user may execute an application that is installed in the mobile device 100 and supports a workform using a BYOD service, and generate a workform by combining jobs using the functions of the image forming apparatuses 200A and 200B and the mobile device 100 in a desired order. A method of generating a workform will be described in detail later.

A workform using a BYOD service, according to an exemplary embodiment, is generated and managed by the mobile device 100, and when the workform is executed, the mobile device 100 manages performing of jobs according to an order defined in the workform. In other words, according to the executed workform, the mobile device 100 transmits a command to perform a job to the image forming apparatuses 200A and 200B when it is a turn, according to a defined order, for a job to be performed by using the functions of the image forming apparatuses 200A and 200B, and performs a job by using an application installed in the mobile device 100 or a hardware component of the mobile device 100 when it is the turn, according to the defined order, for a job to be performed by using the functions of the mobile device 100.

As shown in FIG. 20, the workform may be generated by variously combining the functions of the image forming apparatuses 200A and 200B and the mobile device 100. For example, the workform may be set such that an image obtained as the image forming apparatus 200A performs scanning is transmitted to the mobile device 100, and the mobile device 100 transmits the received image via an email, to a network server, such as a file transfer protocol (FTP) server or a server message block (SMB) server, or to the image forming apparatus 200B.

Alternatively, the workform may be initiated upon receiving a fax document of the image forming apparatus 200A, and the mobile device 100 may provide an editing function for a received document or image in the middle stage. Alternatively, the workform may have any one of various forms, and various exemplary embodiments of the workform will be described in detail later.

Three elements that form a workform using a BYOD service, according to an exemplary embodiment, are input, transformation, and transmission. In other words, a job is performed via a workform as a job target is "input", the job target is "transformed" according to a pre-set method, and the transformed target is "transmitted" to a transmission destination.

Accordingly, processes of setting a workform using a BYOD service, according to an exemplary embodiment, largely include three operations. First, an input source is set, a transforming method is set, and then a transmission destination is set.

Various exemplary embodiments of setting and executing a workform using a BYOD service will now be described with reference to FIGS. 21 through 32.

Figure 21:
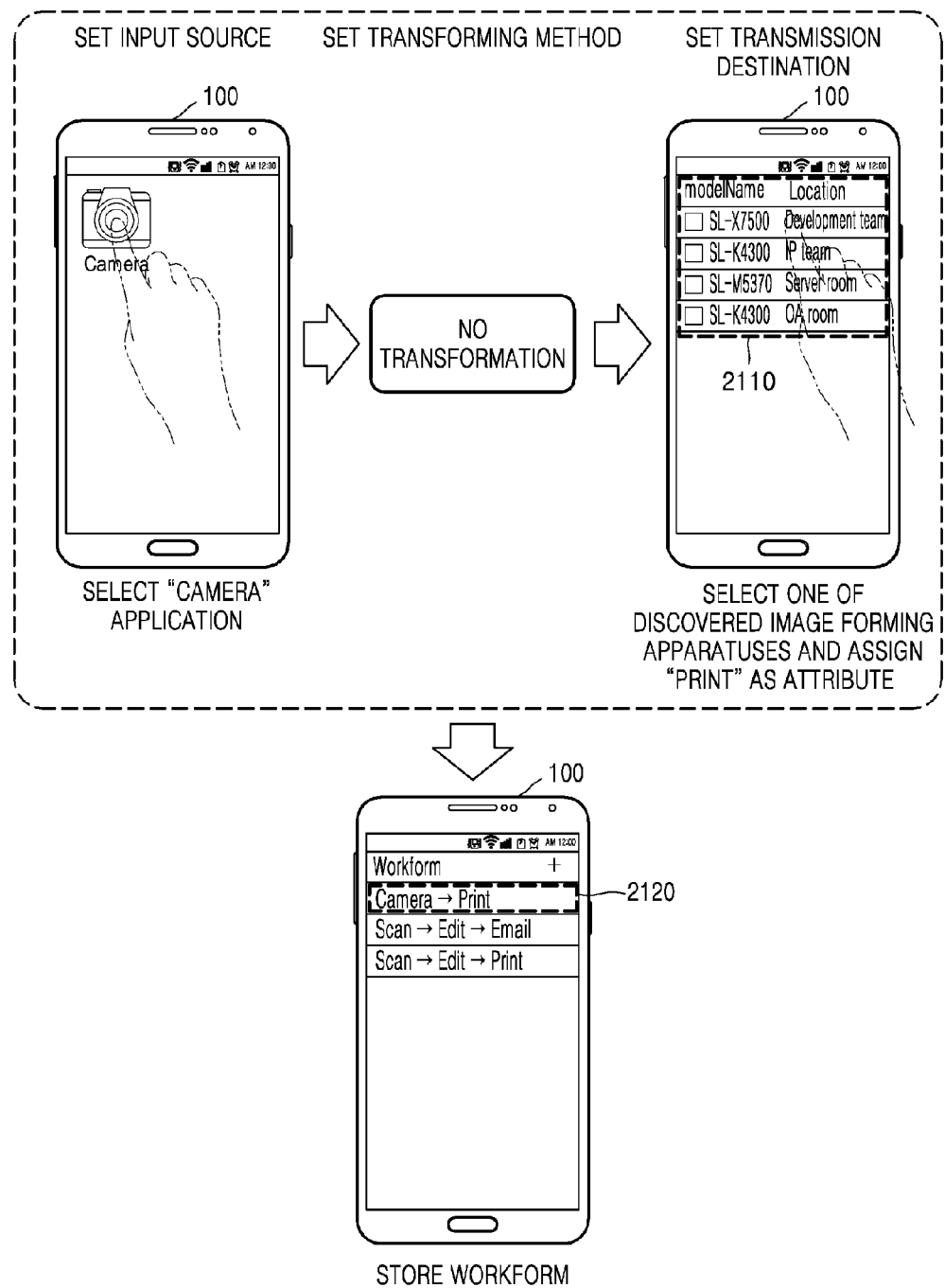
FIG. 21 is a diagram of a process of generating a workform in which a photo captured by a mobile device is printed by a multifunction printer (MFP), according to an exemplary embodiment.

FIG. 21 is a diagram of a process of generating a workform in which a photo captured by the mobile device 100 (e.g., of FIG. 1) is printed by an MFP, according to an exemplary embodiment.

Referring to FIG. 21, first, a camera application installed in the mobile device 100 is selected as an input source for receiving a job target. In other words, a photo captured by a camera included in the mobile device 100 is received as a job target.

Then, a method of transforming the job target is set, but in the current embodiment, it is set not to transform the job target. In other words, the mobile device 100 transmits the photo to a transmission destination without transformation.

Lastly, a transmission destination to which the job target is to be transmitted is set. In the current embodiment, the photo captured by the mobile device 100 is to be printed, and thus the transmission destination may be an image forming apparatus for performing printing, such as a printer or an MFP. In order to set the transmission destination, the mobile device 100 discovers image forming apparatuses, and display a list 2110 of the discovered image forming apparatuses as shown in FIG. 21. The list 2110 may show model names and locations of the discovered image forming apparatuses. A user may select a desired apparatus from the list 2110 displayed on a screen of the mobile device 100, and set the transmission destination by assigning an attribute of the selected apparatus as "print".

Here, the user may set and store print options in a workform. The mobile device 100 may obtain capability of an image forming apparatus during a discovery process, and display settable options on the screen based on the obtained capability. The user may set the options displayed on the screen of the mobile device 100 to desired values.

When an image forming apparatus is selected, the mobile device 100 attempts to pair up with the selected image forming apparatus. The mobile device 100 pairs up with an image forming apparatus that is set as a transmission destination when a workform is generated so as to communicate with the image forming apparatus, and when an event is generated, i.e., when the workform is executed and a photo is captured by the mobile device 100, the mobile device 100 transmits the photo to the image forming apparatus and requests the image forming apparatus to print the photo.

Alternatively, the mobile device 100 may not pair up with the image forming apparatus that is selected as the transmission destination when the workform is generated, but may pair up with the image forming apparatus when the workform is executed and a job is performed. Such an example may be applied when an image forming apparatus is selected as an input source.

Discovering and pairing up of an image forming apparatus have been described above. Also, a process of pairing up while setting a workform will be described again later with reference to FIG. 33.

As such, when an input source, a transforming method, and a transmission destination are set, a workform 2120 is generated and stored. A name of the workform 2120 may be determined such that details and orders of jobs defined in the workform 2120 are distinguishable, such as "Camera=>Print". The user may later select and execute the workform 2120 such that jobs defined in the workform 2120 are performed in an order.

Figure 22:
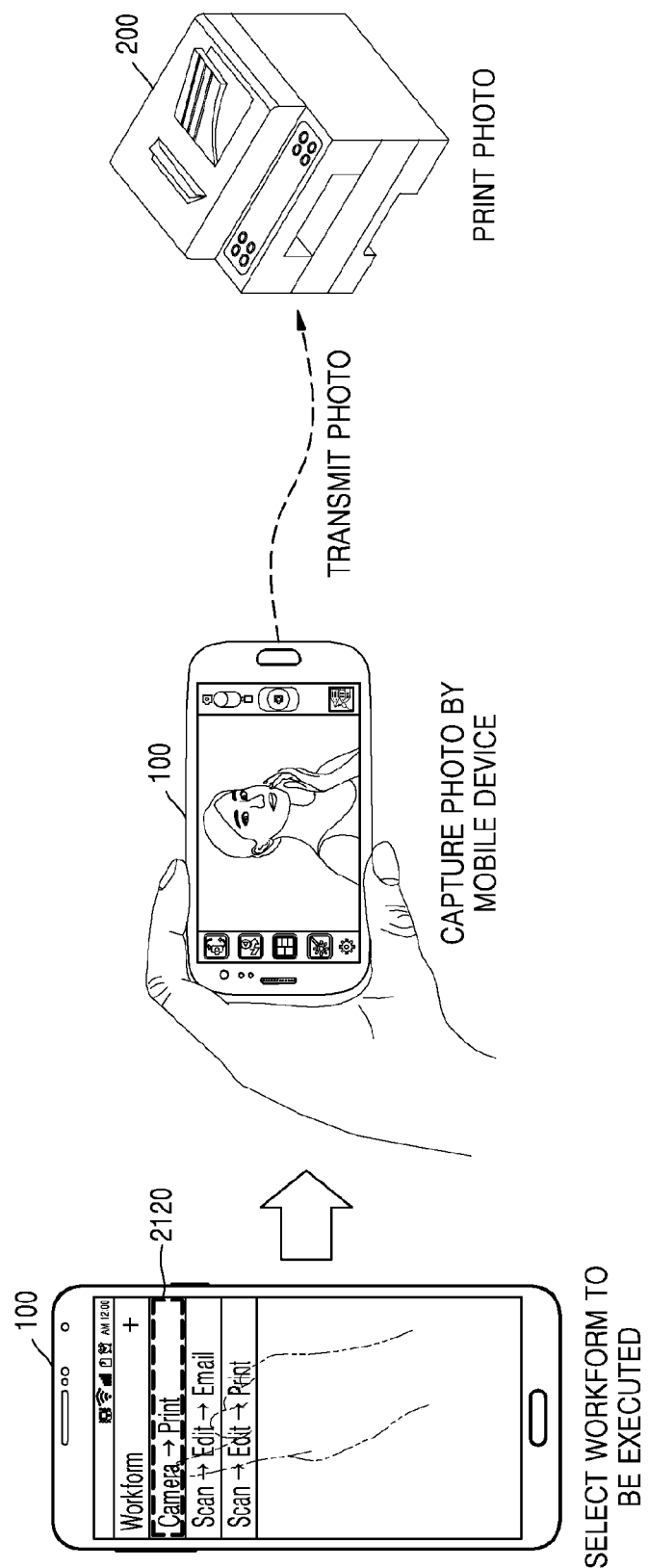
FIG. 22 is a diagram of a process of executing a workform in which a photo captured by a mobile device is printed by an image forming apparatus, according to an exemplary embodiment.

FIG. 22 is a diagram of a process of executing a workform in which a photo captured by a mobile device 100 (similar to the mobile device 100 of FIG. 1) is printed by an image forming apparatus 200 (similar to the image forming apparatus 200 of FIG. 1), according to an exemplary embodiment.

Referring to FIG. 22, when a user selects and executes the workform 2120 of "Camera=>Print" from a workform list displayed on a screen of the mobile device 100, the mobile device 100 may automatically execute a camera function or may display a message guiding the user to execute the camera function.

When the camera function is executed, the user may capture a photo by using the mobile device 100. When the photo is captured, the mobile device 100 transmits the photo to the image forming apparatus 200 that is set as a transmission destination in the workform 2120 and requests the image forming apparatus 200 to print the photo. Here, the mobile device 100 may also transmit print options pre-set and stored in the workform 2120 to the image forming apparatus 200, and the print options may be pre-set by the user while generating the workform 2120, as described above with reference to FIG. 21.

The image forming apparatus 200 prints the photo according to the print options, thereby completing the execution of the workform 2120.

Figure 23:
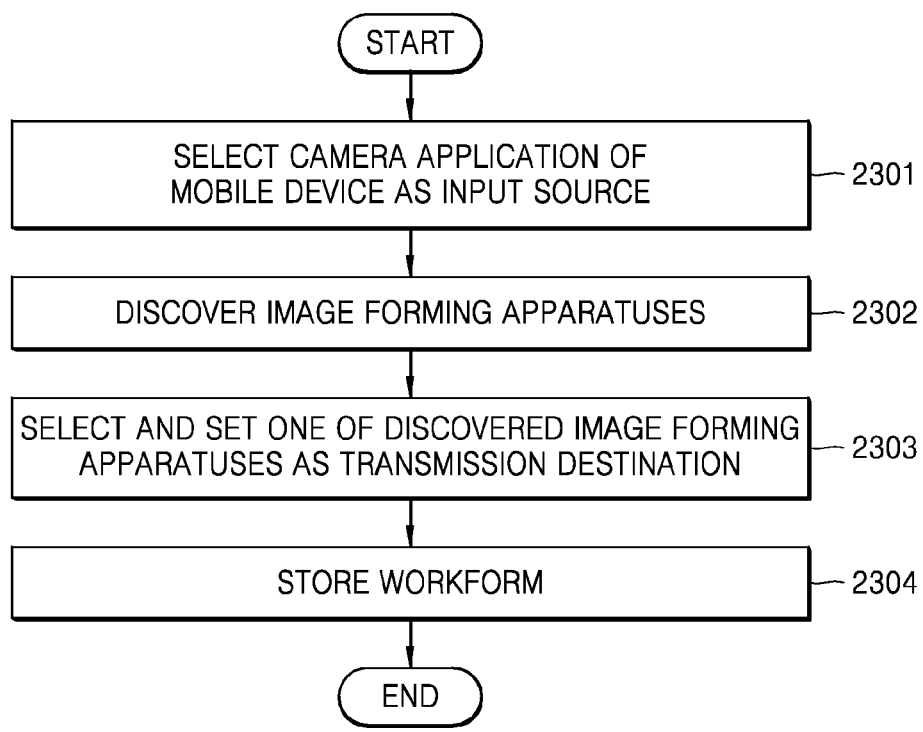
FIG. 23 is a flowchart of a process of generating a workform in which a photo captured by a mobile device is printed by an image forming apparatus, according to an exemplary embodiment.

FIG. 23 is a flowchart of a process of generating a workform in which a photo captured by a mobile device is printed by an image forming apparatus, according to an exemplary embodiment.

Referring to FIG. 23, in operation 2301, a user selects a camera application of a mobile device (similar to the mobile device 100 of FIG. 1) as an input source. In other words, a photo captured by using a camera included in the mobile device 100 is received as a job target.

In operation 2302, when the user wants to set an image forming apparatus as a transmission destination, the mobile device 100 discovers image forming apparatuses (similar to the image forming apparatus 200 of FIG. 1) and displays a list of the discovered image forming apparatuses on a screen.

In operation 2303, the user selects one of the discovered image forming apparatuses as a transmission destination, and assigns "print" as an attribute. Here, the user may set and store print options in a workform. When the user selects the transmission destination, the mobile device 100 attempts to pair up with the image forming apparatus (e.g., the image forming apparatus 200 of FIG. 1) selected as the transmission destination. A pairing process has been described in detail above.

In operation 2304, the mobile device 100 generates and stores a workform according to the set input source and the set transmission destination. Here, a name of the workform may be determined such that details and orders of jobs defined in the workform are distinguishable.

Figure 24:
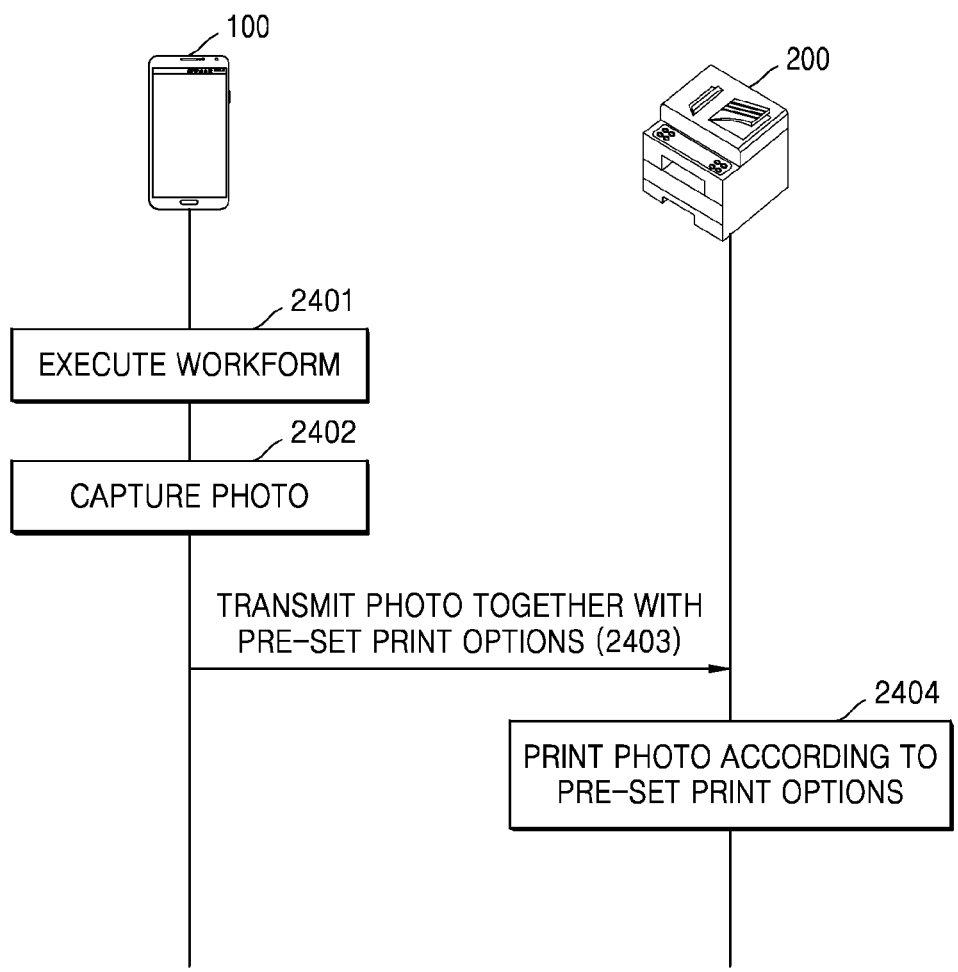
FIG. 24 is a flowchart of a process of executing a workform in which a photo captured by a mobile device is printed by an image forming apparatus, according to an exemplary embodiment.

FIG. 24 is a flowchart of a process of executing a workform in which a photo captured by a mobile device 100 (similar to the mobile device 100 of FIG. 1) is printed by an image forming apparatus 200 (similar to the image forming apparatus 200 of FIG. 1), according to an exemplary embodiment.

Referring to FIG. 24, in operation 2401, a workform stored in the mobile device 100 is executed. Here, the workform defines an order of jobs such that a photo captured by the mobile device 100 is printed by the image forming apparatus 200. When the workform is executed, the mobile device 100 may automatically execute a camera function or display a message guiding a user to execute the camera function.

In operation 2402, the user may capture the photo by using the mobile device 100.

In operation 2403, the mobile device 100 transmits the photo together with pre-set print options to the image forming apparatus 200. Here, the image forming apparatus 200 is an apparatus set as a transmission destination by the workform executed in operation 2401. As described above with reference to FIG. 21, print options may be pre-set by the user while setting the image forming apparatus 200 as the transmission destination. The image forming apparatus 200 and the mobile device 100 may be connected to each other via a pairing process while the workform is generated, or may be paired up after the workform is executed in operation 2401.

In operation 2404, the image forming apparatus 200 prints the photo according to the pre-set print options, thereby completing the workform.

Figure 25:
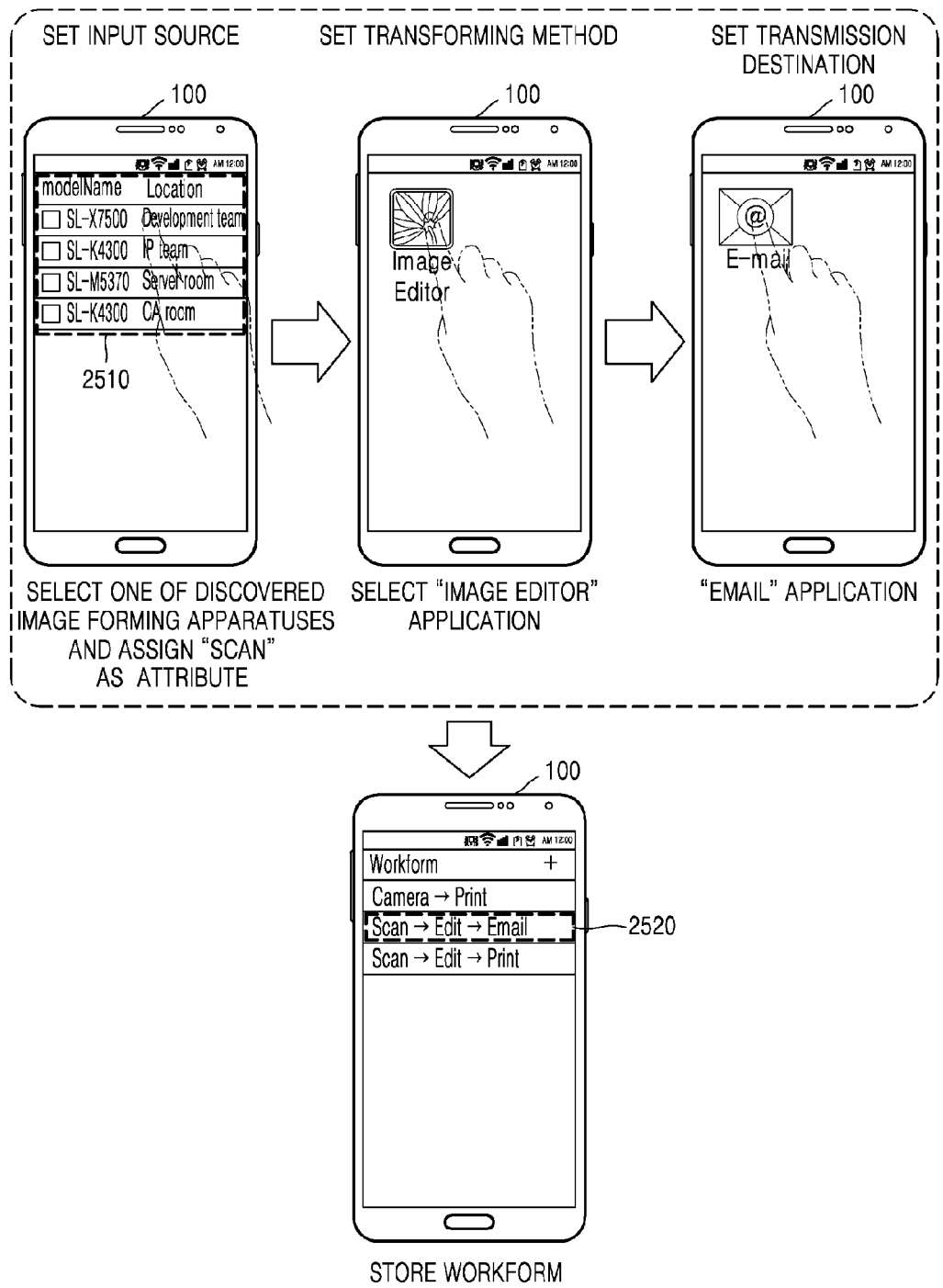
FIG. 25 is a diagram of a process of generating a workform in which an image scanned by an image forming apparatus is edited by a mobile device, and the edited image is transmitted via an email, according to an exemplary embodiment.

FIG. 25 is a diagram of a process of generating a workform 2520 in which an image scanned by an image forming apparatus (similar to the image forming apparatus 200 of FIG. 1) is edited by a mobile device 100 (similar to the mobile device 100 of FIG. 1), and the edited image is transmitted via an email, according to an exemplary embodiment.

Referring to FIG. 25, first, a user selects the image forming apparatus as an input source for receiving a job target, i.e., a scan image. In detail, the mobile device 100 discovers image forming apparatuses, and displays a list 2510 of the discovered image forming apparatuses on a screen as shown in FIG. 25. The user selects the image forming apparatus from the list 2510 displayed on the screen of the mobile device 100, and assign an attribute of the image forming apparatus to "scan" to set the image forming apparatus as an input source.

At this time, the user may set scan options and store the scan options in the workform 2520. The mobile device 100 may obtain capability of an image forming apparatus during a discovery process, and display settable scan options on the screen based on the obtained capability. The user may set the settable scan options to desired values.

When the image forming apparatus is selected, the mobile device 100 attempts to pair up with the image forming apparatus. The mobile device 100 pairs up with the image forming apparatus that is set as the input source when the workform 2520 is generated so as to communicate with the image forming apparatus, and when an event is generated, i.e., when the workform 2520 is executed and the image forming apparatus performs scanning, the mobile device 100 receives a scan image from the image forming apparatus set as the input source.

Alternatively, the mobile device 100 may not pair up with the image forming apparatus that is selected as the input source when the workform 2520 is generated, but may pair up with the image forming apparatus when the workform 2520 is executed and a job is performed.

Discovering and pairing up of an image forming apparatus have been described above. Also, a process of pairing up while setting a workform will be described again later with reference to FIG. 33.

Then, the user sets a transforming method of the scan image. In the current embodiment, the user sets an image editor application providing an editing function as the transforming method. In other words, the user may edit the scan image received from the image forming apparatus by using the image editor application installed in the mobile device 100, while executing the workform 2520.

Lastly, a transmission destination to which the edited scan image is to be transmitted is set. In the current embodiment, the user sets an email application installed in the mobile device 100 as the transmission destination. In other words, the edited scan image is transmitted to an email via the email application of the mobile device 100. Here, the user may pre-set and store an email address to which the edited scan image is to be transmitted.

As such, when the input source, the transforming method, and the transmission destination are set, the workform 2520 is generated and stored. A name of the workform 2520 may be determined such that details and orders of jobs defined by the workform 2520 are distinguishable, such as "Scan=>Edit=>Email". The user may later select and execute the workform 2520 such that jobs defined by the workform 2520 are performed according to an order.

Figure 26:
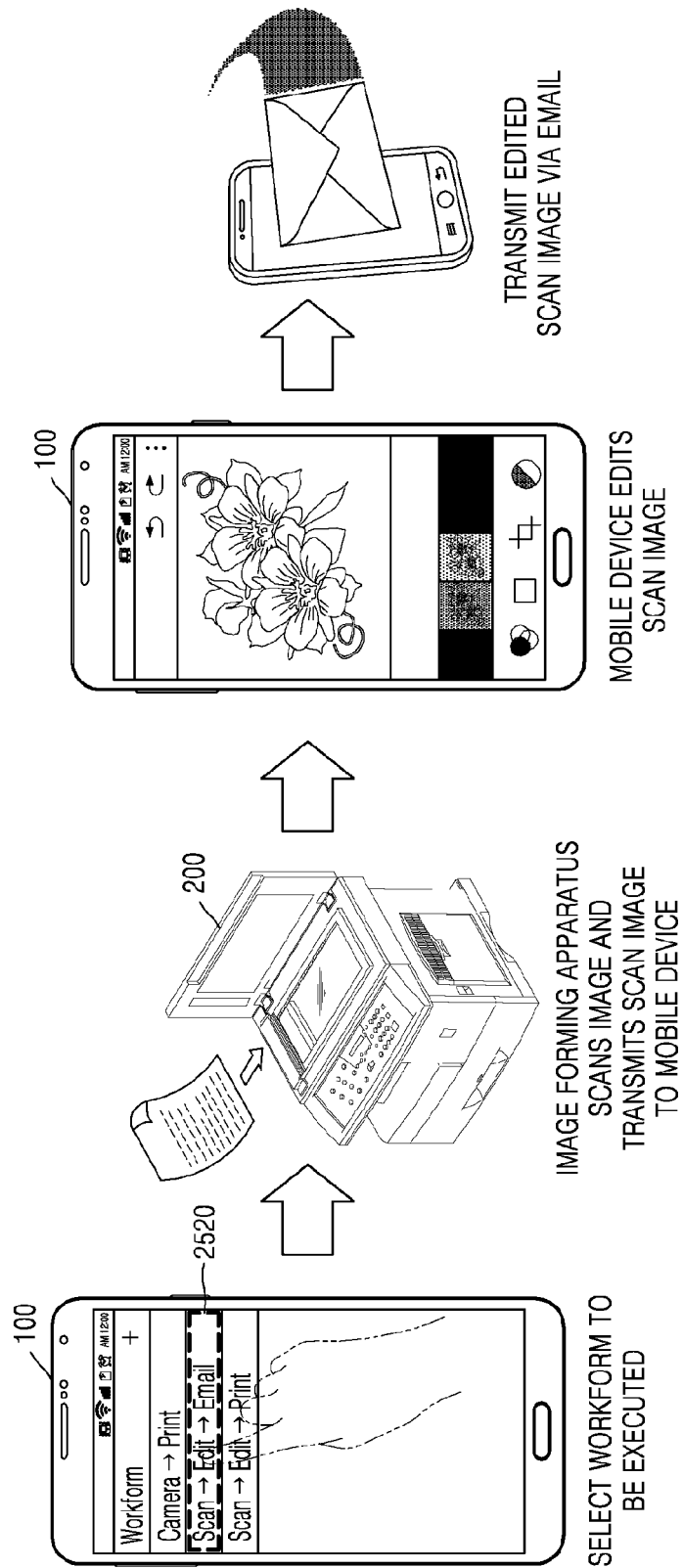
FIG. 26 is a diagram of a process of executing a workform in which an image scanned by an image forming apparatus is edited by a mobile device, and the edited image is transmitted via an email, according to an exemplary embodiment.

FIG. 26 is a diagram of a process of executing the workform 2520 in which an image scanned by an image forming apparatus 200 (similar to the image forming apparatus 200 of FIG. 1) is edited by a mobile device 100 (similar to the mobile device 100 of FIG. 1), and the edited image is transmitted via an email, according to an exemplary embodiment.

Referring to FIG. 26, when a user selects and executes the workform 2520 of "Scan=>Edit=>Email" from a workform list displayed on a screen of the mobile device 100, the mobile device 100 may notify the user about the image forming apparatus 200 set as an input source, and display a message guiding scanning.

When the user performs the scanning in the image forming apparatus 200 set as the input source based on the message, the image forming apparatus 200 transmits a scan image to the mobile device 100. Here, the mobile device 100 may pre-transmit a command requesting the image forming apparatus 200 to transmit the scan image to the mobile device 100, and accordingly, the image forming apparatus 200 may transmit the scan image to the mobile device 100.

Upon receiving the scan image from the image forming apparatus 200, the mobile device 100 automatically executes an "image editor" application according to the workform 2520. When the "image editor" application is executed, the user may edit the scan image in the mobile device 100.

After the user edits the scan image, the mobile device 100 executes an "email" application, and transmits the edited scan image to an email address stored in the workform 2520. Here, the email address may be pre-set by the user while generating the workform 2520, as described above with reference to FIG. 25.

Figure 27:
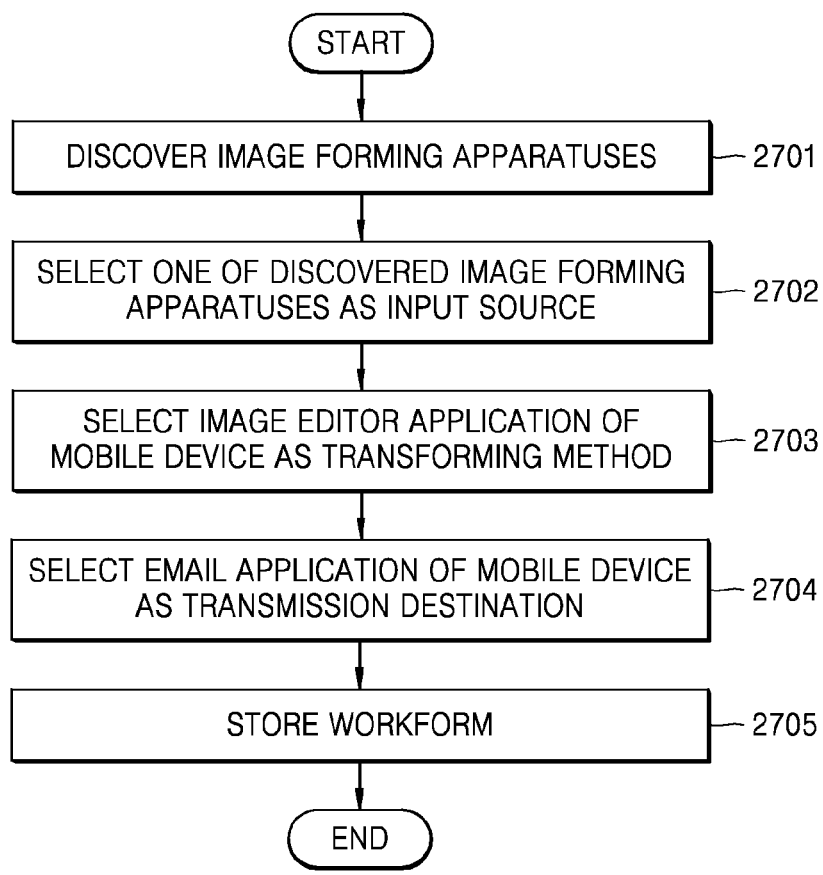
FIG. 27 is a flowchart of a process of generating a workform in which an image scanned by an image forming apparatus is edited by a mobile device, and the edited image is transmitted via an email, according to an exemplary embodiment.

FIG. 27 is a flowchart of a process of generating a workform in which an image scanned by an image forming apparatus (similar to the image forming apparatus 200 of FIG. 1) is edited by a mobile device (similar to the mobile device 100 of FIG. 1), and the edited image is transmitted via an email, according to an exemplary embodiment.

Referring to FIG. 27, when a user is to select an image forming apparatus (similar to the image forming apparatus 200 of FIG. 1) as an input source, the mobile device (similar to the mobile device 100 of FIG. 1) discovers image forming apparatuses and displays a list of discovered image forming apparatuses on a screen, in operation 2701.

In operation 2702, the user selects one of the discovered image forming apparatuses as the input source, and assigns an attribute of the selected image forming apparatus as "scan". At this time, the user may set and store scan options in a workform. When the user selects the image forming apparatus, the mobile device 100 attempts to pair up with the selected image forming apparatus (similar to the image forming apparatus 200 of FIG. 1). A pairing process (similar to the pairing process 660 of FIG. 6) has been described above in detail.

In operation 2703, the user selects an image editor application installed in the mobile device (similar to the mobile device 100 of FIG. 1) as a transforming method. In other words, the user may edit a scan image through the image editor application while executing the workform.

In operation 2704, the user selects an email application installed in the mobile device as a transmission destination. In other words, the edited scan image is transmitted to an email via the email application. Here, an email address to which the edited scan image is to be transmitted may be pre-set and stored by the user.

In operation 2705, the mobile device generates and stores the workform according to the input source, the transforming method, and the transmission destination. Here, a name of the workform may be determined such that details and orders of jobs defined in the workform are distinguishable.

Figure 28:
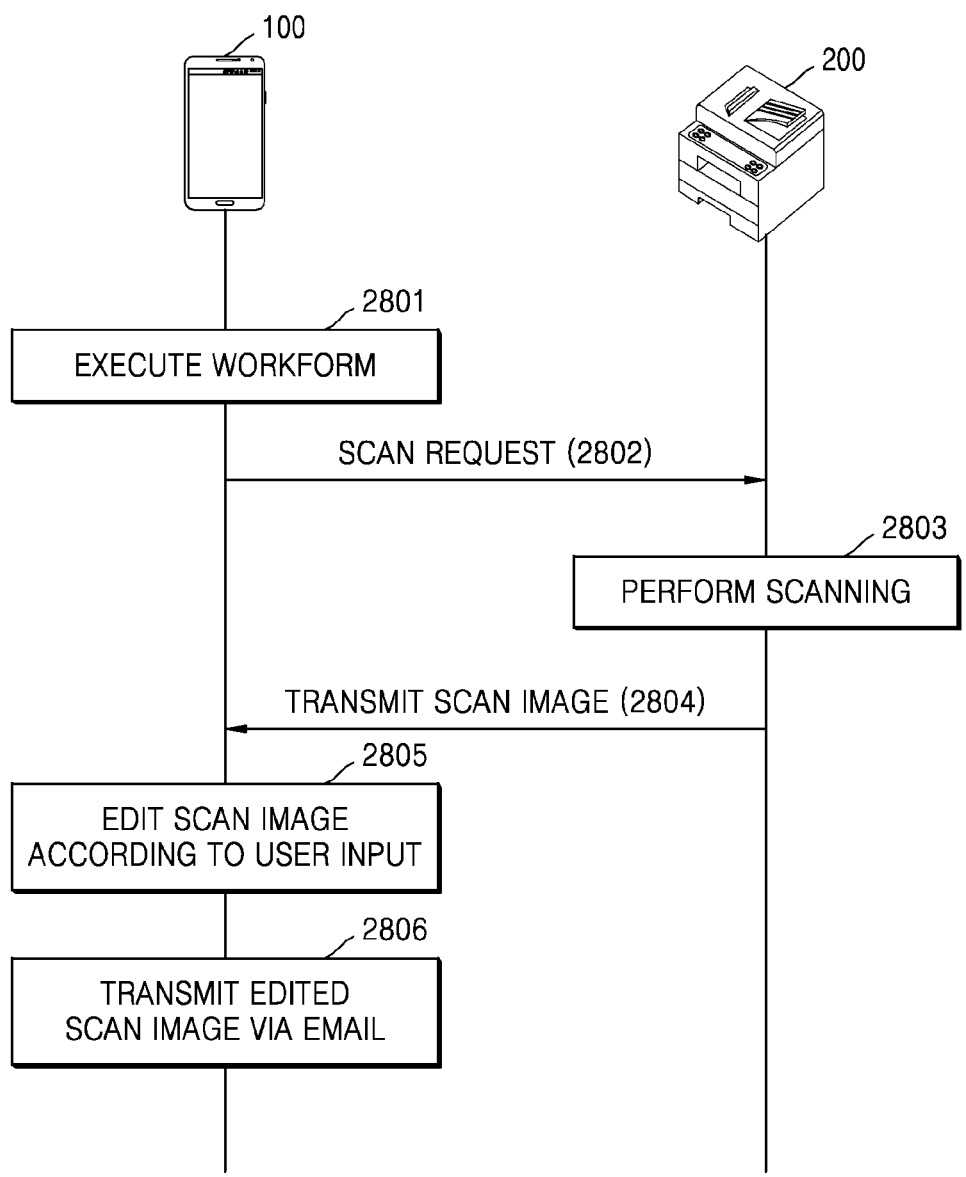
FIG. 28 is a diagram of a process of executing a workform in which an image scanned by an image forming apparatus is edited by a mobile device, and the edited image is transmitted via an email, according to an exemplary embodiment.

FIG. 28 is a diagram of a process of executing a workform in which an image scanned by an image forming apparatus 200 (similar to the image forming apparatus 200 of FIG. 1) is edited by a mobile device 100 (similar to the mobile device 100 of FIG. 1), and the edited image is transmitted via an email, according to an exemplary embodiment.

Referring to FIG. 28, a workform stored in the mobile device 100 is executed in operation 2801. Here, the workform defines an order of jobs such that an image scanned by the image forming apparatus 200 is edited by the mobile device 100 and the edited image is transmitted via an email.

In operation 2802, the mobile device 100 transmits a scan request to the image forming apparatus 200 set as an input source. Here, the mobile device 100 may display, on a screen, a guide message for a user to perform scanning via the image forming apparatus 200. Also, the mobile device 100 may transmit scan options stored in the workform, together with the scan request. As described above with reference to FIG. 25, the scan options may be pre-set by the user while setting the image forming apparatus 200 as the input source, while generating the workform.

In operation 2803, the image forming apparatus 200 performs scanning to obtain a scan image. Here, the image forming apparatus 200 may perform the scanning according to the scan options received together with the scan request in operation 2802.

In operation 2804, the image forming apparatus 200 transmits the scan image to the mobile device 100. Here, the image forming apparatus 200 and the mobile device 100 may be connected to each other via a pairing process (similar to the pairing process 660 of FIG. 6, and the pairing processes discussed above) while generating the workform, or may be paired up after the workform is executed in operation 2801.

Upon receiving the scan image from the image forming apparatus 200, the mobile device 100 executes an image editor application as defined in the workform, and edits the scan image according to a user input in operation 2805.

After the scan image is edited, the mobile device 100 executes an email application and transmits the edited scan image via an email in operation 2806, thereby completing the workform. Here, as described above with reference to FIG. 25, an email address to which the edited scan image is to be transmitted may be pre-set by the user while generating the workform.

Figure 29:
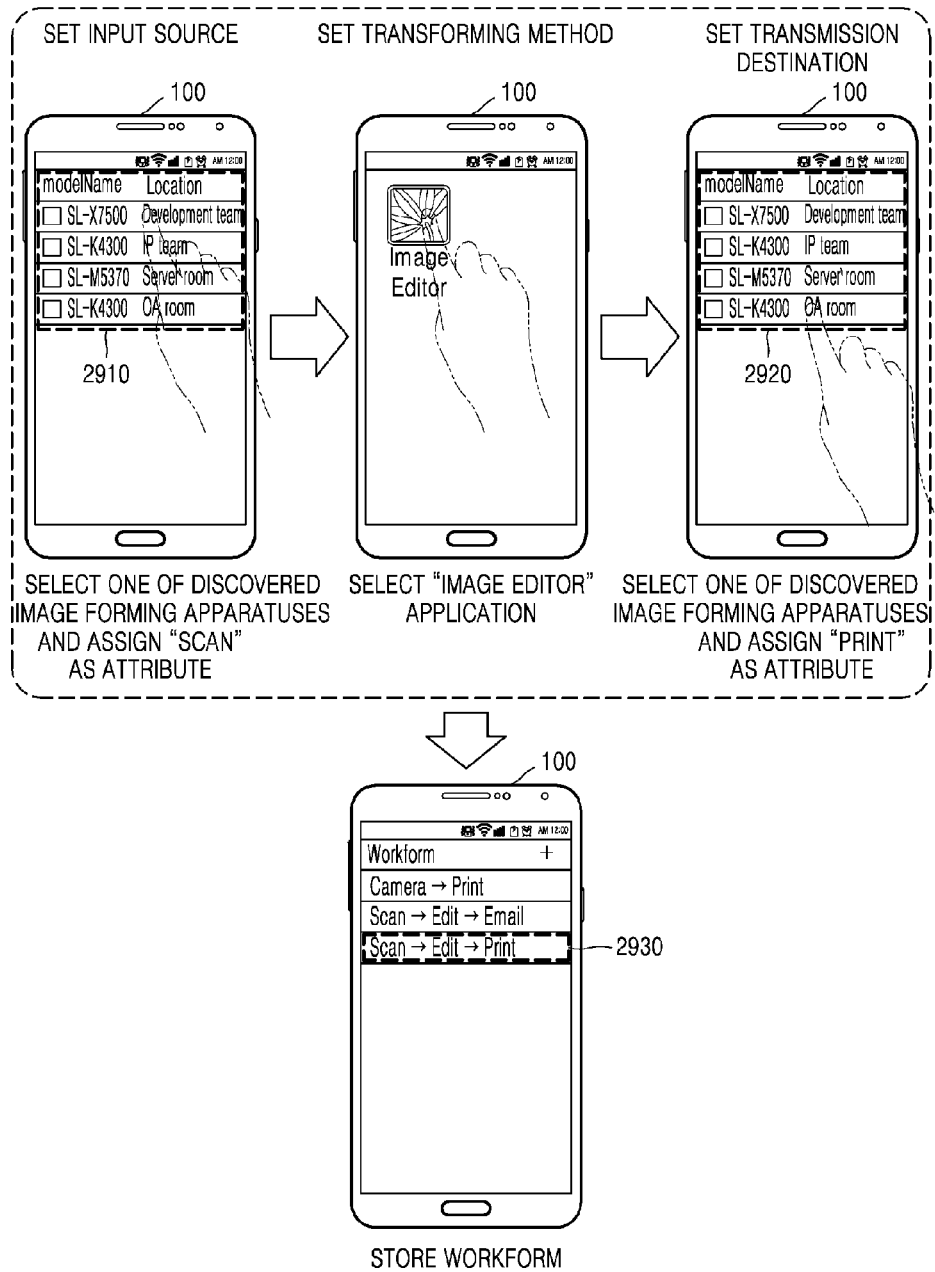
FIG. 29 is a diagram of a process of generating a workform in which an image scanned by an image forming apparatus is edited by a mobile device, and the edited image is printed by another image forming apparatus, according to an exemplary embodiment.

FIG. 29 is a diagram of a process of generating a workform 2930 in which an image scanned by an image forming apparatus (similar to the image forming apparatus 200 of FIG. 1) is edited by a mobile device 100 (similar to the mobile device 100 of FIG. 1), and the edited image is printed by another image forming apparatus, according to an exemplary embodiment.

Referring to FIG. 29, first, a user selects an image forming apparatus as an input source for receiving a job target, i.e., a scan image. In detail, the mobile device 100 may discover image forming apparatuses, and display a list 2910 of the discovered image forming apparatuses on a screen as shown in FIG. 29. The user selects an image forming apparatus from the list 2910, and set the image forming apparatus as an input source by assigning an attribute of the image forming apparatus to "scan".

At this time, the user may set and store scan options in the workform 2930. The mobile device 100 may obtain capability of an image forming apparatus during a discovery process, and display scan options settable based on the capability on the screen. The user may set the displayed scan options to desired values.

When the image forming apparatus is selected, the mobile device 100 attempts to pair up with the image forming apparatus. The mobile device 100 may pair up with the image forming apparatus set as the input source while generating the workform 2930 so as to communicate with the image forming apparatus, and when an event is generated, i.e., when the workform 2930 is executed and the image forming apparatus performs scanning, the mobile device 100 receives a scan image from the image forming apparatus set as the input source.

Alternatively, the mobile device 100 may not pair up with the image forming apparatus set as the input source while generating the workform 2930, but may pair up with the image forming apparatus while the workform 2930 is executed and a job is performed.

Discovering and pairing up of an image forming apparatus have been described above. Also, a process of pairing up while setting a workform will be described again later with reference to FIG. 33.

Then, the user sets a transforming method to transform the scan image. In the current embodiment, the user sets an "image editor" application providing an editing function as a transforming method. In other words, while the workform 2930 is executed, the user may edit the scan image received from the image forming apparatus by using the "image editor" application installed in the mobile device 100.

Lastly, a transmission destination to which the edited scan image is to be transmitted is set. In the current embodiment, an image forming apparatus that is to print the edited scan image is set as a transmission destination. In order to set the transmission destination, the mobile device 100 discovers image forming apparatus, and display a list 2920 of the discovered image forming apparatuses on the screen as shown in FIG. 29. The list 2920 may display model names and locations of the discovered image forming apparatuses. The user may select an image forming apparatus from the list 2920, and set the image forming apparatus as a transmission destination by assigning an attribute of the image forming apparatus to "print".

In the current embodiment, the image forming apparatus set as the transmission destination is different from the image forming apparatus set as the input source. Referring to FIG. 29, an image forming apparatus located at a "development team" is set as an input source, and an image forming apparatus located at an "OA room" is set as a transmission destination. The current embodiment may be useful when an image forming apparatus supports a scanning function but does not support a color printing function, whereas another image forming apparatus supports a color printing function but does not support a scanning function.

Here, the user may set and store print options in the workform 2930. A method of setting print options while setting an image forming apparatus as a transmission destination has been described above with reference to FIG. 21.

Meanwhile, when the image forming apparatus is set as the transmission destination, the mobile device 100 attempts to pair up with the image forming apparatus. The mobile device 100 pairs up with the image forming apparatus set as the transmission destination while generating the workform 2930 to communicate with the image forming apparatus at anytime, and when an event is generated, i.e., when the workform 2930 is executed and the mobile device 100 completes editing of the scan image, requests the image forming apparatus to print the edited scan image by transmitting the edited scan image.

Alternatively, the mobile device 100 may not pair up with the image forming apparatus set as the transmission destination while generating the workform 2930, but may pair up with the image forming apparatus when the workform 2930 is executed and a job is performed.

Discovering and pairing up of an image forming apparatus have been described above. Also, a process of pairing up while setting a workform will be described again later with reference to FIG. 33.

When the input source, the transforming method, and the transmission destination are set as above, the workform 2930 is generated and stored. A name of the workform 2930 may be determined such that details and orders of jobs defined in the workform 2930 are distinguishable, for example, "Scan=>Edit=>Print".

Figure 30:
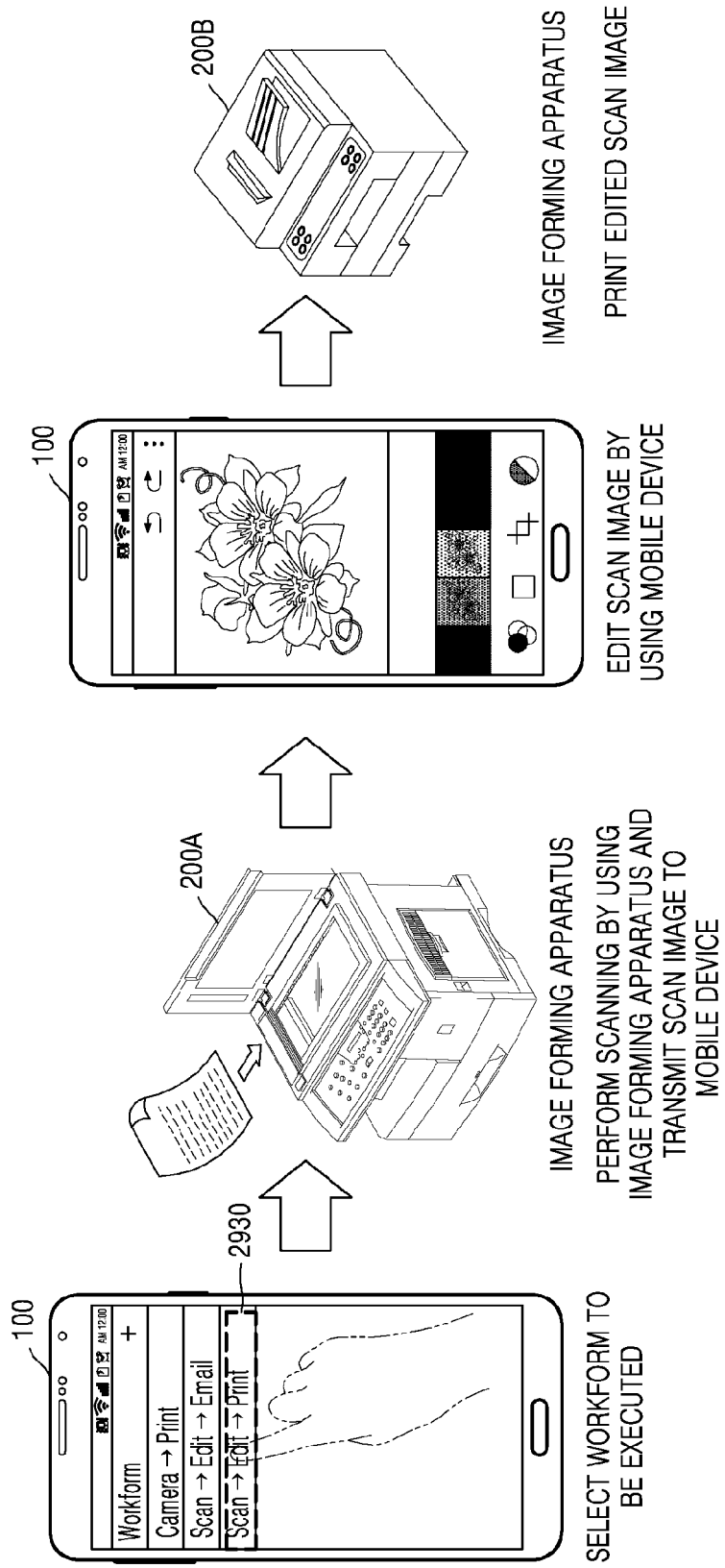
FIG. 30 is a diagram of a process of executing a workform in which an image scanned by an image forming apparatus is edited by a mobile device, and the edited image is printed by another image forming apparatus, according to an exemplary embodiment.

FIG. 30 is a diagram of a process of executing the workform 2930 in which an image scanned by the image forming apparatus 200A (similar to the image forming apparatus 200 of FIG. 1) is edited by the mobile device 100 (similar to the mobile device 100 of FIG. 1), and the edited image is printed by the image forming apparatus 200B (similar to the image forming apparatus 200 of FIG. 1), according to an exemplary embodiment.

Referring to FIG. 30, when a user selects and executes the workform 2930 of "Scan=>Edit=>Print" from a workform list displayed on a screen of the mobile device 100, the mobile device 100 may notify the user about the image forming apparatus 200A set as an input source and display a message guiding the user to perform scanning.

When the user performs scanning by using the image forming apparatus 200A according to the message, the image forming apparatus 200 transmits a scan image to the mobile device 100. Here, the mobile device 100 may pre-transmit a command to the image forming apparatus 200A requesting to transmit the scan image to the mobile device 100 after scanning, and accordingly, the image forming apparatus 200A may transmit the scan image to the mobile device 100 after the scanning.

Upon receiving the scan image from the image forming apparatus 200A, the mobile device 100 automatically executes an "image editor" application as defined in the workform 2930. When the "image editor" application is executed, the user may edit the scan image by using the mobile device 100.

After the user edits the scan image, the mobile device 100 transmits the edited scan image to the image forming apparatus 200B set as a transmission destination in the workform 2930 to request the image forming apparatus 200B to print the edited scan image. At this time, the mobile device 100 may also transmit print options pre-set and stored in the workform 2930 to the image forming apparatus 200B, and as described above with reference to FIG. 29, the print options may be pre-set by the user while generating the workform 2930.

The image forming apparatus 200B prints the edited scan image according to the print options, thereby completing the executing of the workform 2930.

Figure 31:
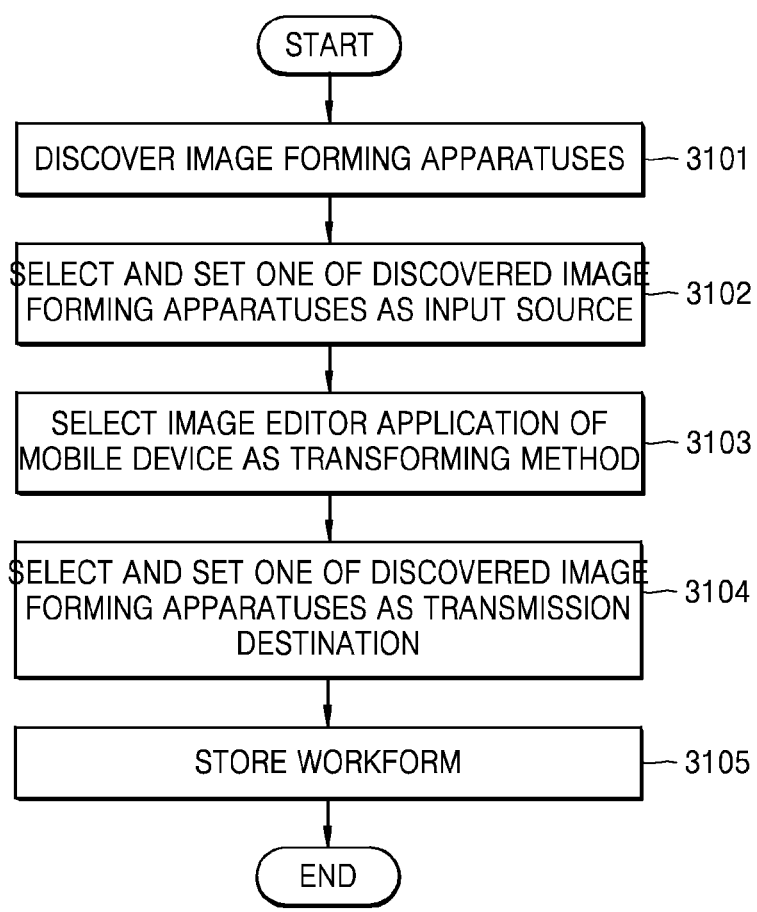
FIG. 31 is a flowchart of a process of generating a workform in which an image scanned by an image forming apparatus is edited by a mobile device, and the edited image is printed by another image forming apparatus, according to an exemplary embodiment.

FIG. 31 is a flowchart of a process of generating a workform in which an image scanned by an image forming apparatus (similar to the image forming apparatus 200 of FIG. 1) is edited by a mobile device (similar to the mobile device 100 of FIG. 1), and the edited image is printed by another image forming apparatus (similar to the image forming apparatus 200 of FIG. 1), according to an exemplary embodiment.

Referring to FIG. 31, when a user is to select an image forming apparatus as an input source, the mobile device discovers image forming apparatuses and displays a list of the discovered image forming apparatuses on a screen, in operation 3101.

In operation 3102, the user selects and set one of the discovered image forming apparatuses as an input source, and assigns "scan" as an attribute. Here, the user may set and store scan options in the workform. When the user sets the image forming apparatus as the input source, the mobile device attempts to pair up with the image forming apparatus set as the input source. A pairing process has been described in detail above.

In operation 3103, the user selects an "image editor" application installed in the mobile device as a transforming method. In other words, the user may edit a scan image through the "image editor" application of the mobile device while executing the workform.

In operation 3104, the user may select and set one of the image forming apparatuses discovered in operation 3101 as a transmission destination, and assign "print" as an attribute. Here, the image forming apparatus set as the transmission destination may be different from that set as the input source in operation 3102. Also, the user may set and store print options in the workform. When the transmission destination is set, the mobile device attempts to pair up with the image forming apparatus set as the transmission destination. A pairing process has been described in detail above.

In operation 3105, the mobile device generates and stores the workform according to the input source, the transforming method, and the transmission destination. Here, a name of the workform may be determined such that details and orders of jobs defined in the workform are distinguishable.

Figure 32:
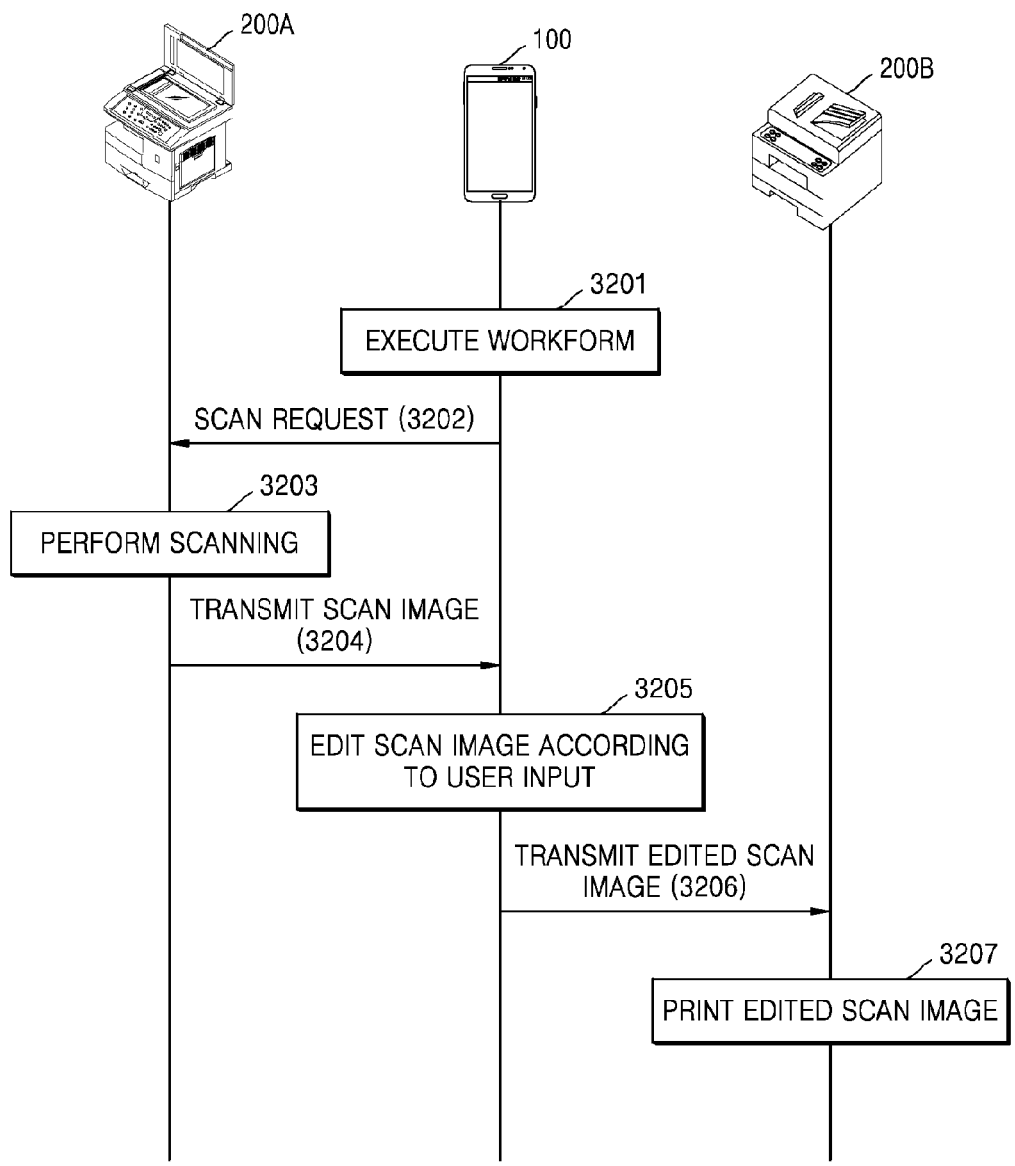
FIG. 32 is a diagram of a process of executing a workform in which an image scanned by an image forming apparatus is edited by a mobile device, and the edited image is printed by another image forming apparatus, according to an exemplary embodiment.

FIG. 32 is a diagram of a process of executing a workform in which an image scanned by the image forming apparatus 200A (similar to the image forming apparatus 200 of FIG. 1) is edited by the mobile device 100 (similar to the mobile device 100 of FIG. 1), and the edited image is printed by the image forming apparatus 200B (similar to the image forming apparatus 200 of FIG. 1), according to an exemplary embodiment.

Referring to FIG. 32, the workform stored in the mobile device 100 is executed in operation 3201. Here, the workform defines an order of performing jobs such that an image scanned by the image forming apparatus 200A is edited by the mobile device 100, and the edited image is printed by the image forming apparatus 200B.

In operation 3202, the mobile device 100 transmits a scan request to the image forming apparatus 200A that is set as an input source. Here, the mobile device 100 may display a guide message guiding a user to perform scanning by using the image forming apparatus 200A, on a screen. Also, the mobile device 100 may transmit scan options stored in the workform together with the scan request. As described above with reference to FIG. 29, the scan options may be pre-set by the user while setting the image forming apparatus 200A as the input source while generating the workform.

In operation 3203, the image forming apparatus 200A obtains a scan image by performing scanning. Here, the image forming apparatus 200A may perform the scanning according to the scan options received together with the scan request in operation 3202.

In operation 3204, the image forming apparatus 200A transmits the scan image to the mobile device 100. Here, the image forming apparatus 200A and the mobile device 100 may be connected to each other via a pairing process while generating the workform, or may be paired up after the workform is executed in operation 3201.

Upon receiving the scan image from the image forming apparatus 200A, the mobile device 100 executes an "image editor" application as define din the workform, and edits the scan image according to a user input in operation 3205.

After the scan image is edited, the mobile device 100 transmits the edited scan image to the image forming apparatus 200B that is set as a transmission destination, in operation 3206. Here, the mobile device 100 may transmit print options that are pre-set to the image forming apparatus 200B, together with the edited scan image. As described above with reference to FIG. 29, the print options may be pre-set by the user while setting the image forming apparatus 200B as the transmission destination while generating the workform. The image forming apparatus 200B and the mobile device 100 may be connected to each other via a pairing process while generating the workform, or may be paired up after the workform is executed in operation 3201.

In operation 3207, the image forming apparatus 200$b$ prints the edited scan image according to the print options, thereby completing the workform.

As described above, when an image forming apparatus is selected as an input source or a transmission destination, a mobile device may be connected to the image forming apparatus via a pairing process. The pairing process while generating a workform will now be described in detail with reference to FIG. 33.

Figure 33:
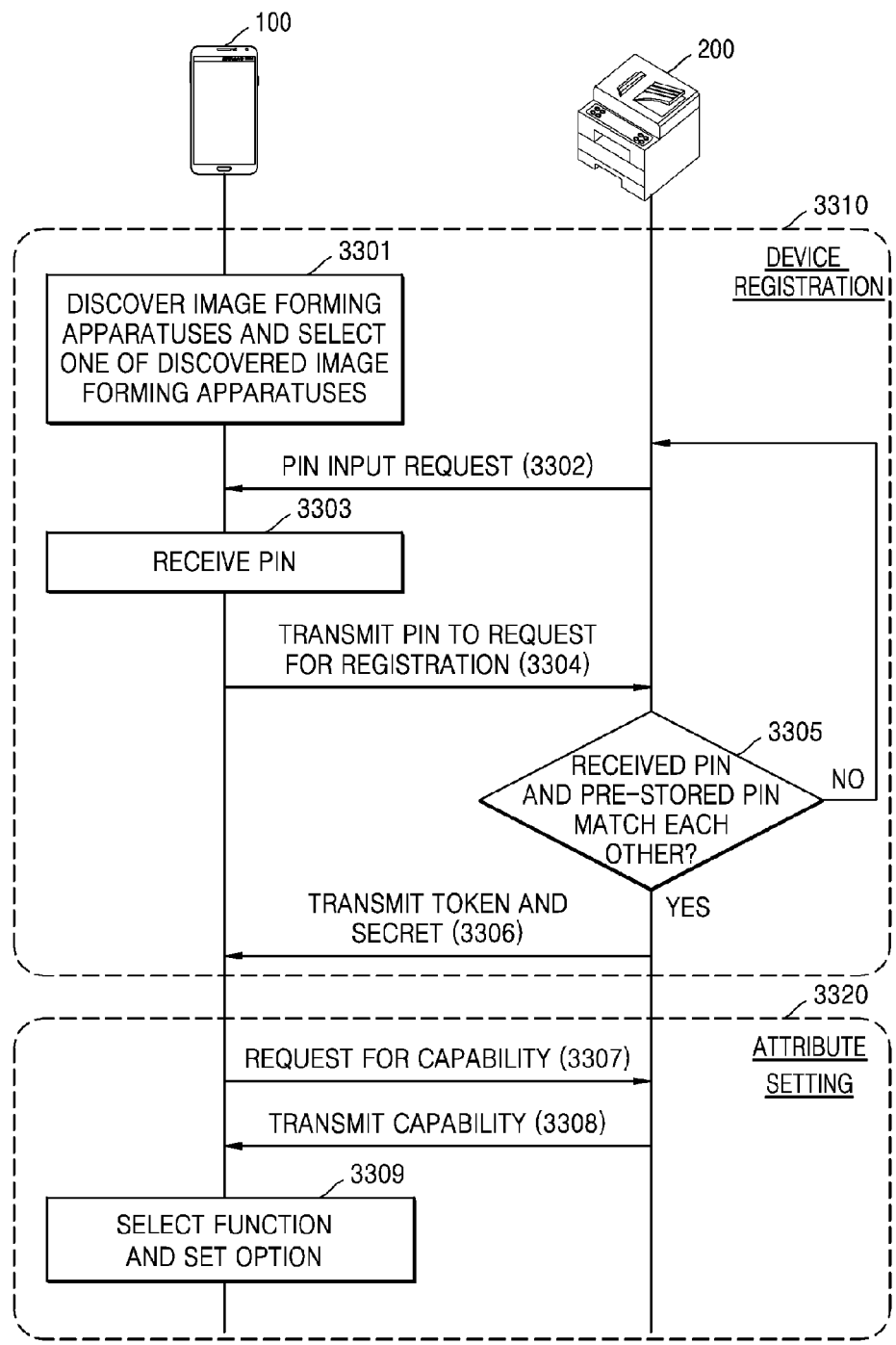
FIG. 33 is a diagram of detailed processes of a mobile device and an image forming apparatus performing pairing while a workform is generated, according to an exemplary embodiment.

FIG. 33 is a diagram of detailed processes of a mobile device 100 (similar to the mobile device 100 of FIG. 1) and an image forming apparatus 200 (similar to the image forming apparatus 200 of FIG. 1) performing pairing while a workform is generated, according to an exemplary embodiment.

When a user is to select an image forming apparatus as an input source or a transmission destination, the mobile device 100 discovers image forming apparatuses, and the user selects one of the discovered image forming apparatuses, for example, the image forming apparatus 200, in operation 3301.

When the image forming apparatus 200 is selected, the image forming apparatus 200 transmits a PIN input request to the mobile device 100 in operation 3302.

In operation 3303, the mobile device 100 displays a screen for receiving a PIN, and receives the PIN from the user.

In operation 3304, the mobile device 100 transmits the PIN to the image forming apparatus 200 to request for registration.

In operation 3305, the image forming apparatus 200 determines whether the received PIN matches a pre-stored PIN. When the received PIN and the pre-stored PIN do not match, operation 3302 is performed for another PIN, and when the received PIN and the pre-stored PIN match, credential information, such as a token and a secret, is transmitted to the mobile device 100 in operation 3306. The mobile device 100 may access the image forming apparatus 200 later by using the token and the secret received in operation 3306.

Operations 3301 through 3306 correspond to a device registration operation 3310, and after the device registration operation 3310, an attribute setting operation 3320 is performed. The attribute setting operation 3320 includes operations 3307 through 3309.

In operation 3307, the mobile device 100 requests the image forming apparatus 200 for capability, and in operation 3308, the image forming apparatus 200 transmits the capability to the mobile device 100. Here, the capability may contain information about functions performable by the image forming apparatus 200, about a status of the image forming apparatus 200, and about options settable by the image forming apparatus 200.

In operation 3309, the mobile device 100 may display selectable functions and settable options on the screen, and select a function and set an option based on a user input. For example, when the image forming apparatus 200 is to be used as an input source for obtaining a scan image, the user may assign "scan" as an attribute and set scan options. Alternatively, when the image forming apparatus 200 is to be used as a transmission destination for printing, the user may assign "print" as an attribute and set print options.

Meanwhile, as described above, the mobile device 100 and the image forming apparatus 200 may pair up while the workform is performed, instead of when the workform is generated.

Figure 34:
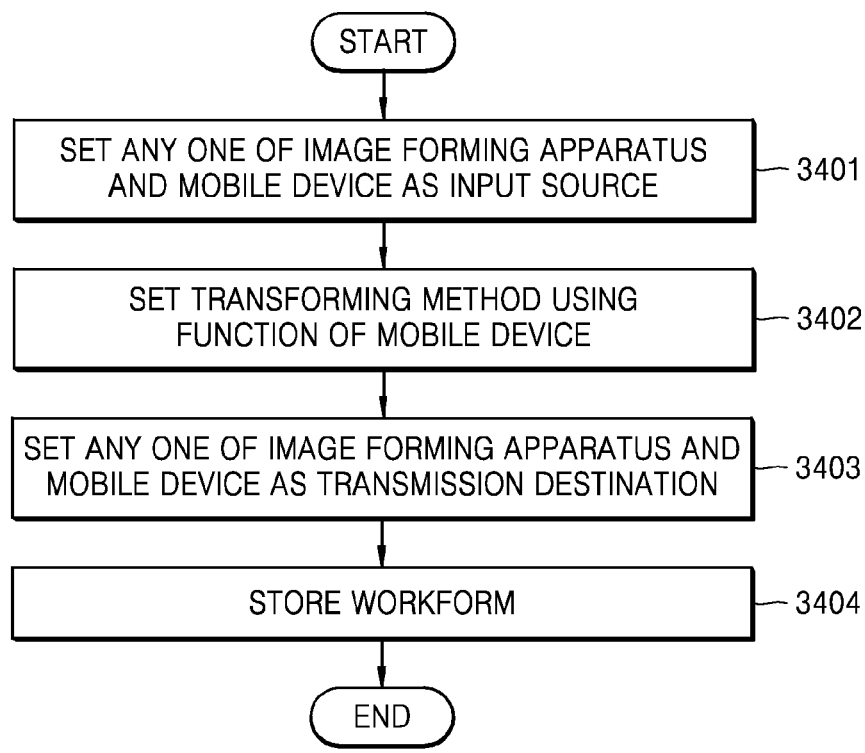
FIG. 34 is a flowchart of a method of generating a workform, according to an exemplary embodiment.

FIG. 34 is a flowchart of a method of generating a workform, according to an exemplary embodiment.

Referring to FIG. 34, a user executes an application supporting a workform using a BYOD service by using a mobile device (similar to the mobile device 100 of FIG. 1), and sets any one of an image forming apparatus (similar to the image forming apparatus 200 of FIG. 1) and the mobile device as an input source in operation 3401. In other words, the user selects any one of the image forming apparatus and the mobile device as an input source for receiving a job target, and sets a function for obtaining the job target.

In operation 3402, the user sets a transforming method using a function of the mobile device by using the mobile device. In other words, a method of transforming the job target received from the input source is set.

In operation 3403, the user sets any one of the image forming apparatus and the mobile device as a transmission destination. In other words, any one of the image forming apparatus and the mobile device is selected as a destination of the job target that is transformed by the transforming method set in operation 3402, and information for transmission, for example, an email address, is set.

In operation 3404, the mobile device stores a workform defining the input source, the transforming method, and the transmission destination, which are set above.

Meanwhile, when the user requests the image forming apparatus to perform a job but the image forming apparatus is already performing another job, the user may have to wait until the other job is finished. Accordingly, one or more exemplary embodiments provide a method of reserving a job by using a BYOD service.

Figure 35:
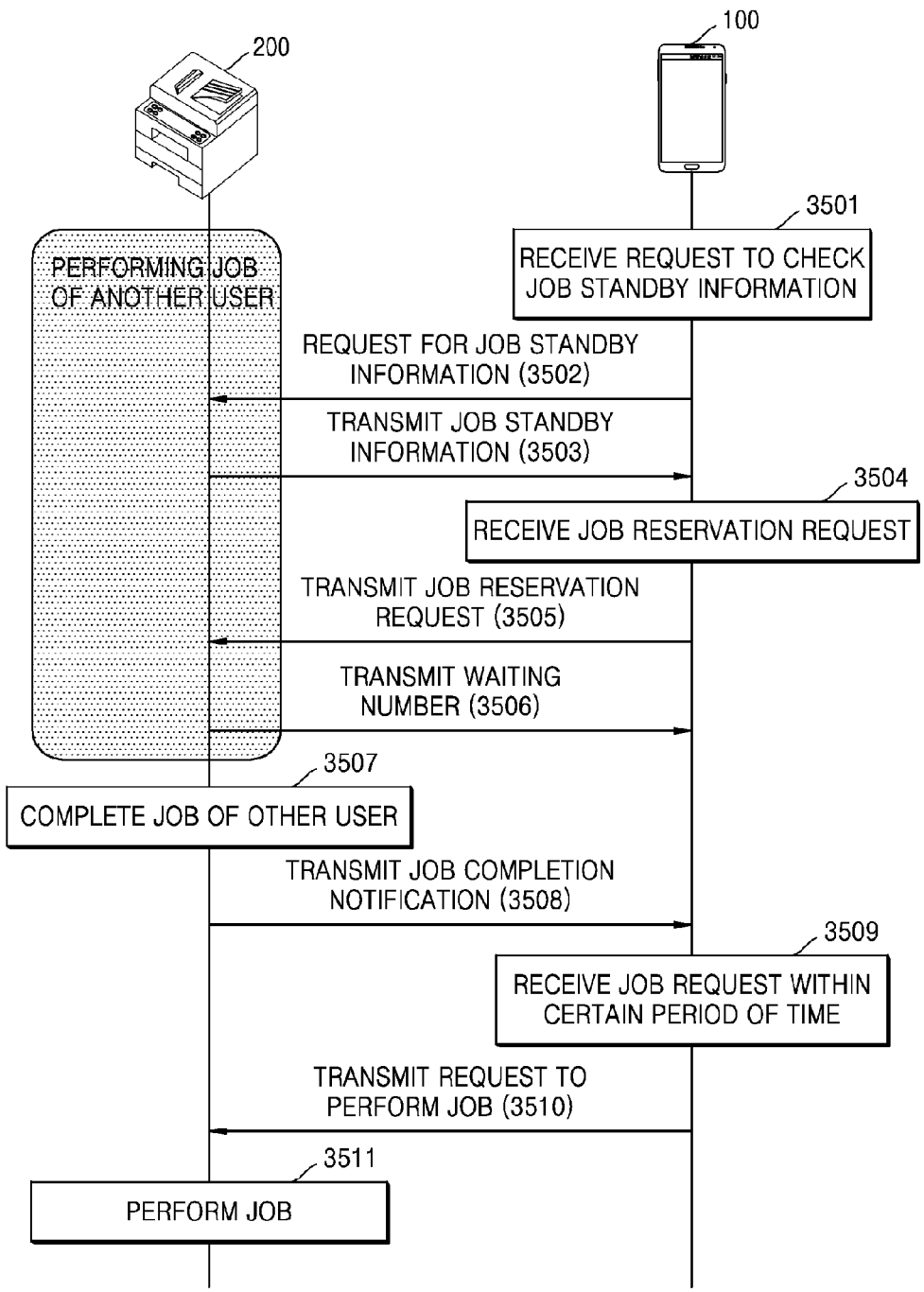
FIGS. 35 through 37 are diagrams for describing a method of reserving a job by using a BYOD service, according to an exemplary embodiment.
Figure 36:
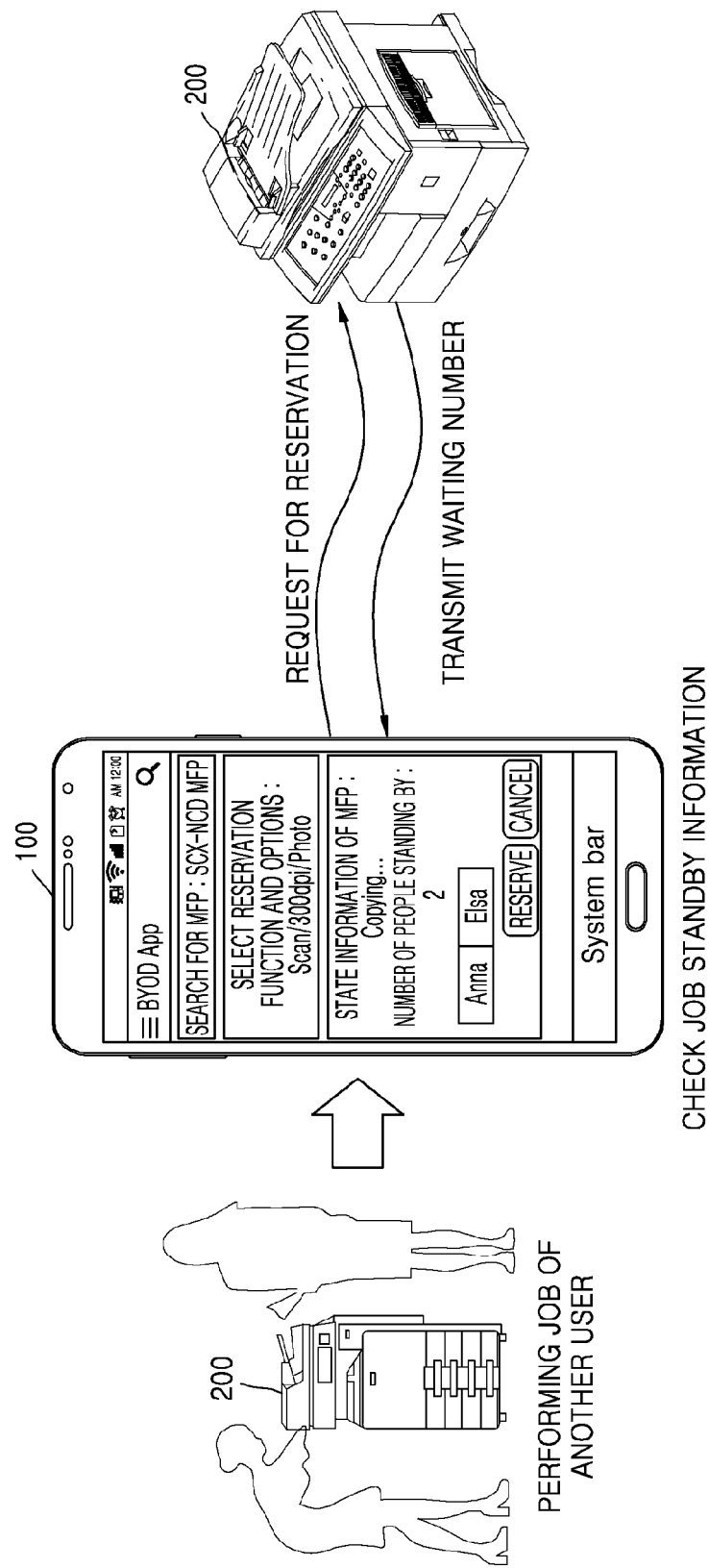
Figure 37:
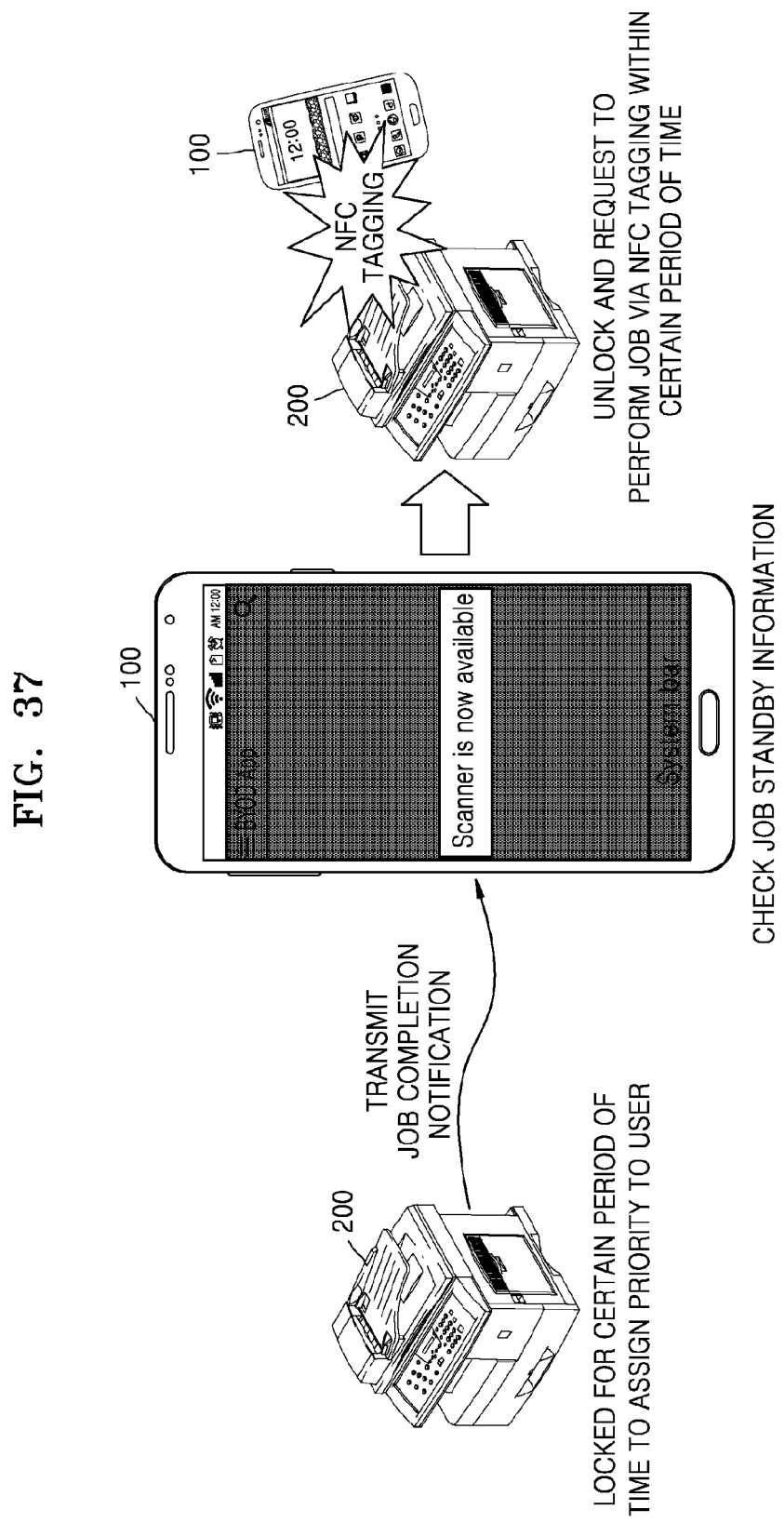

FIGS. 35 through 37 are diagrams for describing a method of reserving a job by using a BYOD service, according to an exemplary embodiment.

Referring to FIG. 35, in operation 3501, a mobile device 100 (similar to the mobile device 100 of FIG. 1) receives a request to check job standby information from a user. In other words, the user may request the mobile device 100 to check whether the user has to standby for a new job since an image forming apparatus 200 (similar to the image forming apparatus 200 of FIG. 1) is performing a current job.

In operation 3502, the mobile device 100 requests the image forming apparatus 200 for the job standby information, and in operation 3503, the image forming apparatus 200 transmits the job standby information to the mobile device 100. At this time, when the image forming apparatus 200 is performing the current job requested by another user, the image forming apparatus 200 may transmit the job standby information containing current status information of the image forming apparatus 200 and a number of people who requested job reservations to the mobile device 100.

Upon receiving a job reservation request from the user in operation 3504, the mobile device 100 transmits the job reservation request to the image forming apparatus 200 in operation 3505.

Upon receiving the job reservation request, the image forming apparatus 200 transmits a waiting number to the mobile device 100 in operation 3506.

When the image forming apparatus 200 completes the current job of the other user in operation 3507, the image forming apparatus 200 transmits a job completion notification to the mobile device 100 in operation 3508. Accordingly, a screen of the mobile device 100 displays a notification that the current job of the other user is completed.

Priority is given to a user who reserved a job for a certain period of time from a point of time when the mobile device 100 receives the job completion notification. Accordingly, during the certain period of time, the image forming apparatus 200 stands by even when another user transmits a job request, instead of the user who reserved a job. However, if the user who reserved a job does not transmit a job request for the certain period of time, the priority disappears.

When the mobile device 100 receives a job request from the user within the certain period of time from the point of time when the job completion notification is received in operation 3509, the mobile device 100 transmits a request to perform a job to the image forming apparatus 200 in operation 3501, and the image forming apparatus 200 performs the job in operation 3511.

FIGS. 36 and 37 illustrate in detail processes of performing the method of reserving a job by using a BYOD service.

Referring to FIG. 36, when am image forming apparatus 200 (similar to the image forming apparatus 200 of FIG. 1) is performing a job of another user, a user may check job standby information through a mobile device 100 (similar to the mobile device 100 of FIG. 1). Here, as shown in FIG. 36, the job standby information may contain information that the image forming apparatus 200 is performing a copy job and information that there are two other users who reserved jobs.

When the user selects "reserve" from a screen displayed on the mobile device 100, the mobile device 100 transmits a reservation request to the image forming apparatus 200, and in response, the image forming apparatus 200 transmits a waiting list to the mobile device 100.

Referring to FIG. 37, the image forming apparatus 200 transmits a notification to the mobile device 100 when the job of the other user is completed. A notification that the image forming apparatus 200 is currently available, such as "scanner is now available", may be displayed on the screen of the mobile device 100.

When the notification is transmitted to the mobile device 100, the image forming apparatus 200 is locked for a certain period of time after a point of time when the notification is transmitted, and priority is assigned to the user. If the user requests the image forming apparatus 200 to perform a job within the certain period of time by NFC-tagging the mobile device 100 to the image forming apparatus 200, the image forming apparatus 200 is unlocked and performs the job.

As described above, in a BYOD environment, the user may manipulate the image forming apparatus 200 by using the mobile device 100 via a BYOD service. At this time, various product types of image forming apparatuses may be connected to the mobile device 100. The image forming apparatuses connected to the mobile device 100 may have different UIs based on product types and model types. However, as described above, the mobile device 100 and the image forming apparatuses commonly perform a UP communication to support the BYOD service, regardless of the product types and model types of the image forming apparatuses. Accordingly, the user may control the image forming apparatuses performing the UP communication in the same method by using the UI provided by a BYOD application installed in the mobile device 100, regardless of different UIs of the image forming apparatuses.

Furthermore, a function that is not supported by the image forming apparatuses connected to the mobile device 100 but is supported by the mobile device 100 may be expanded by using resources of the mobile device 100, and thus a workflow that is not solely processable by the image forming apparatus may be processed. Hereinafter, a method of processing a workflow in which a function supported by the image forming apparatus 200 and a function supported by the mobile device 100 are combined, and the mobile device 100 performing the method will be described in detail.

Figure 38:
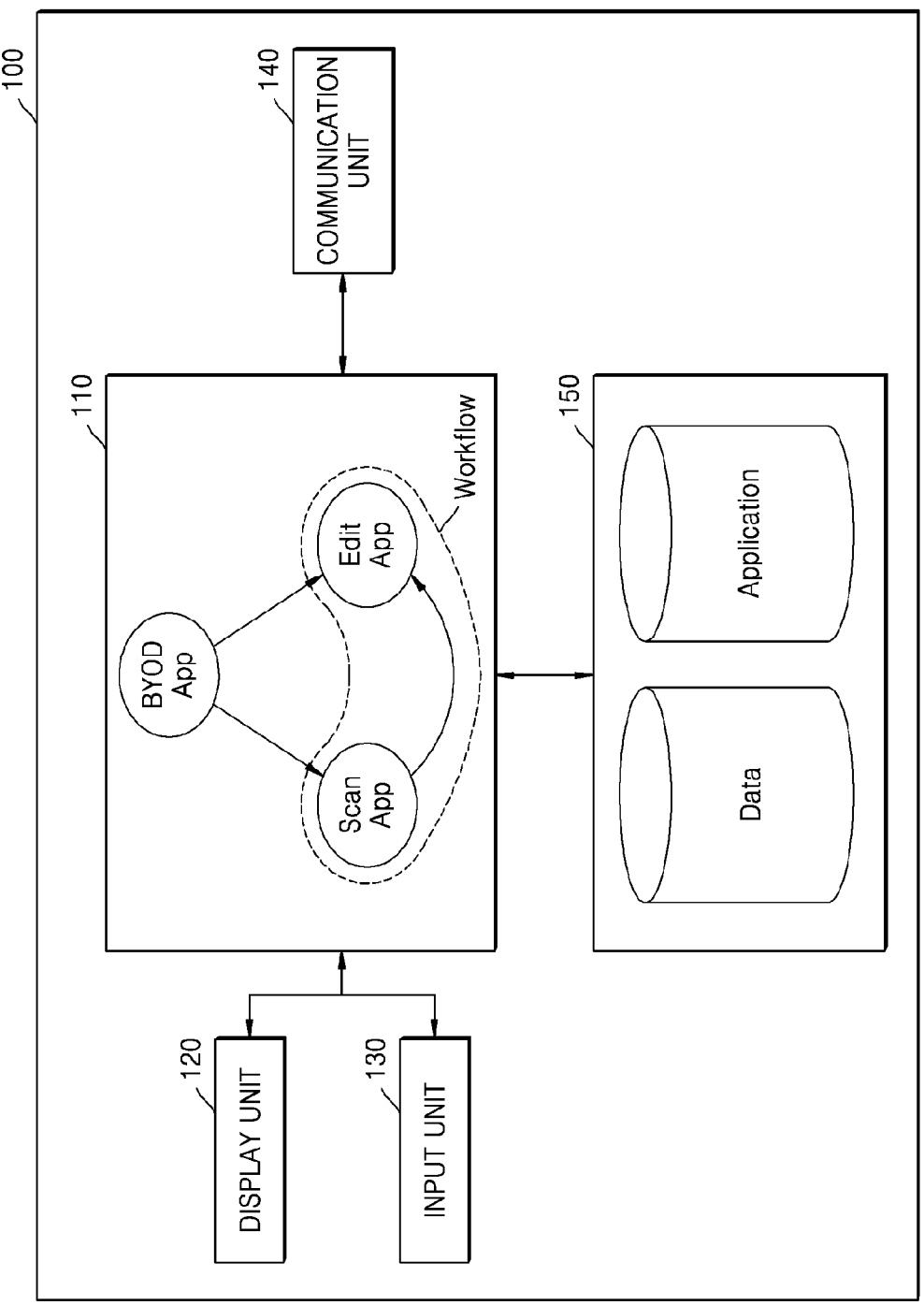
FIG. 38 is a diagram of a structure of a mobile device that processes a workflow, according to an exemplary embodiment.

FIG. 38 is a diagram of a structure of the mobile device 100 (e.g., of FIG. 1) that processes a workflow, according to an exemplary embodiment. It would be obvious to one of ordinary skill in the art that the mobile device 100 may further include general-purpose components other than those shown in FIG. 38.

Referring to FIG. 38, the mobile device 100 may include a controller 110 (similar to the controller 110 of FIG. 3A), a display unit 120 (similar to the controller 110 of FIG. 3A), an input unit 130 (similar to the controller 110 of FIG. 3A), a communication unit 140 (similar to the controller 110 of FIG. 3A), and a storage unit 150 (similar to the controller 110 of FIG. 3A).

The controller 110 may include at least one of RAM, ROM, CPU, and GPU, which are not shown. The RAM, the ROM, the CPU, and the GPU may be connected to each other via a data bus.

The CPU may access the storage unit 150 and perform booting by using an operating system (OS) stored in the storage unit 150. Also, the CPU may perform various operations by using various programs, various contents, and various data stored in the storage unit 150.

The ROM may store a command set for system booting. For example, when power is supplied to the mobile device 100 as a turn-on command is input to the mobile device 100, the CPU may copy the OS stored in the storage unit 150 to the RAM according to a command stored in the ROM, and execute the OS to boot a system of the mobile device 100. When the booting is completed, the CPU may copy various programs stored in the storage unit 150 to the RAM, and perform various operations by executing the various programs copied to the RAM. When the booting is completed, the GPU may display a UI screen on a region of the display unit 120. In detail, the GPU may generate a screen including various objects, such as content, an icon, and a menu. The GPU may calculate attribute values, such as coordinate values, shapes, sizes, and colors, of the objects displayed on the screen, according to a layout of the screen. Then, the GPU may generate the screen in one of various layouts including the objects based on the calculated attribute values. The screen generated by the GPU may be provided to the display unit 120, and displayed on a region of the display unit 120.

The controller 110 may display a part of content stored in the storage unit 150 on the display unit 120. Alternatively, the controller 110 may perform a control operation corresponding to user manipulation that is input to the input unit 130.

The input unit 130 may receive various commands from a user. The input unit 130 may include at least one of a keypad (not shown), a touch panel (not shown), and a pen recognition panel (not shown).

The keypad may include various types of keys, such as a mechanical button and a wheel, which are formed on various regions of the mobile device 100, such as a front region, a side region, and a rear region of an outer body of the mobile device 100.

The touch panel may detect a touch input of the user, and output a touch event value corresponding to a touch signal. When the touch panel combines with a display panel to form a touch screen, the touch screen may be realized as any one of various types of touch sensors, such as an electrostatic type or a piezoelectric type. A touch event generated on the touch screen is generally generated by a finger of a person, but may alternatively be generated by a conductive object that applies a capacitance change.

The pen recognition panel may detect a proximity input or a touch input of a touch pen as the user uses the touch pen, and output a pen proximity event or a pen touch event.

The communication unit 140 may communicate with any type of external device according to any one of various communication methods. Also, as described above, the communication unit 140 may communicate with various product types or various model types of image forming apparatuses by using UP, such that the image forming apparatuses are controlled by using one BYOD application installed in the mobile device 100.

The storage unit 150 may store various types of programs and data required to operate the mobile device 100. In detail, the storage unit 150 may store control programs required for the controller 110 to control the mobile device 100, and data generated as the mobile device 100 operates. For example, the storage unit 150 may store information about image forming apparatuses connected to the mobile device 100, data received from the image forming apparatuses, workflows pre-defined by the user in the mobile device 100, and data about various UP commands corresponding to user inputs. Also, the storage unit 150 may store the BYOD application and functional applications corresponding to functions included in the workflows. For example, the storage unit 150 may store functional applications for executing functions supported by image forming apparatuses connected to the mobile device 100, and various types of applications executing functions of the mobile device 100.

When the user requests a BYOD service through the input unit 130 of the mobile device 100, the controller 110 may bring and execute the BYOD application from the storage unit 150. The controller 110 that executes the BYOD application may bring a workflow pre-determined by the user from the storage unit 150, display the workflow on the display unit 120, and enable the user to select the workflow through the input unit 130. At least one function supported by the image forming apparatus 200 and at least one function supported by the mobile device 100 are combined in the workflow. The function supported by the mobile device 100 included in the workflow may not be supported by the image forming apparatus 200. According to control of the controller 110, the communication unit 140 may connect the image forming apparatus 200 and the mobile device 100, which are used to process the workflow. The controller 110 may execute the functions included in the workflow based on an order of processing the functions included in the workflow. Here, the controller 110 may execute a function after another function from earlier in the order is completed.

For example, when the user who requested for the BYOD service selects a workflow in which a scanning function of the image forming apparatus 200 and an editing function of the mobile device 100 are combined in the stated order from the mobile device 100, the controller 110 executing the BYOD application may execute the workflow as pre-determined by the user, as shown in FIG. 38. Accordingly, in order to connect the image forming apparatus 200 having the scanning function to the mobile device 100, the communication unit 140 may perform the discovery process, the pairing process, and the event registration process described above. When the image forming apparatus 200 that is used to execute the workflow is connected via a UP communication and the scanning function is executed, the controller 110 may automatically execute the editing function based on the stated order stored in the workflow. The controller 110 controls the image forming apparatus 200 connected to the mobile device 100 so as to not only execute a function supported by the image forming apparatus 200, such as the scanning function, but also to execute a function of the mobile device 100, such as the editing function, by using resources of the mobile device 100, thereby processing the workflow requested by the user.

Figure 39:
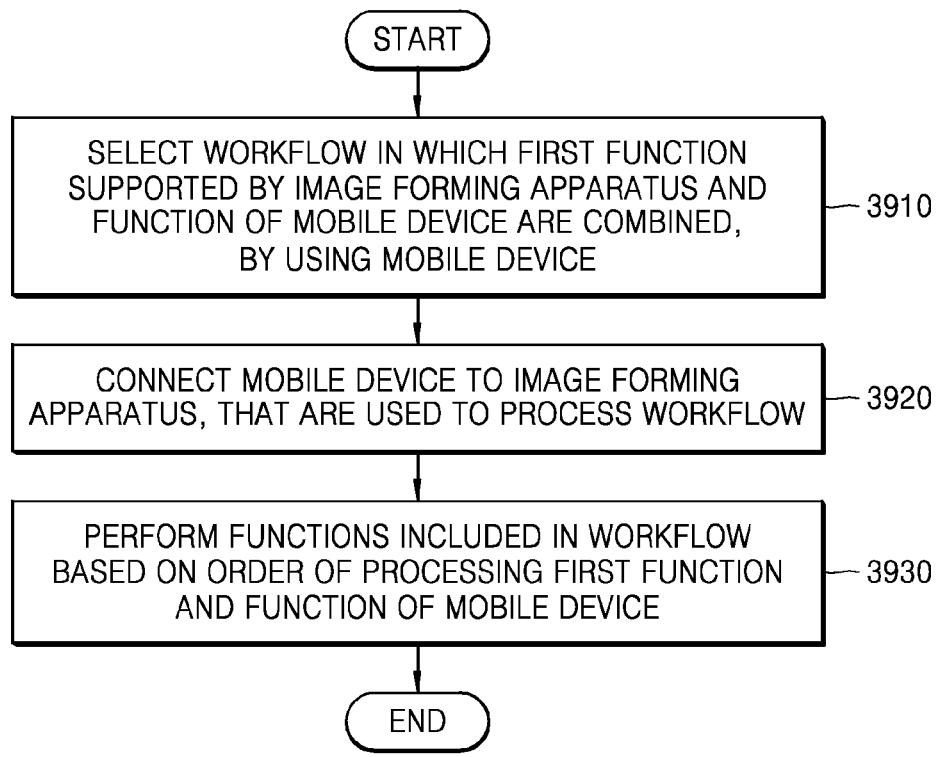
FIG. 39 is a flowchart of a method of processing a workflow, according to an exemplary embodiment.

FIG. 39 is a flowchart of a method of processing a workflow, according to an exemplary embodiment. Details about a mobile device 100 (e.g., of FIG. 1) that processes a workflow, which have been described above, may be applied to the method of FIG. 39, even if not explicitly mentioned.

In operation 3910, the mobile device 100 may receive an input of selecting a workflow in which a first function supported by an image forming apparatus 200 (e.g., of FIG. 1) and a function of the mobile device 100 are combined. In other words, a user of the mobile device 100 may select the workflow by using the mobile device 100. At this time, the mobile device 100 is executing a BYOD application according to a request of the user for a BYOD service, and receives the input of selecting the workflow according to execution of the BYOD application. The function of the mobile device 100 included in the workflow may not be supported by the image forming apparatus 200.

In operation 3920, the mobile device 100 may be connected to the image forming apparatus 200 that is used to process the workflow. The mobile device 100 may be connected to the image forming apparatus 200 by performing the discovery process, the pairing process, and the event registering process described above.

In operation 3930, the mobile device 100 executes the first function and the function based on an order of processing the first function and the function. The mobile device 100 may perform a function after another function in a previous order is completed, based on the order of processing the first function and the function.

For example, when an order of processing the first function is prior to an order of processing the function, the mobile device may receive a result of performing the first function from the image forming apparatus 200 in response to a command to perform the first function, and then perform the function based on the received result. At this time, in order to receive the result of performing the first function, the mobile device 100 may transmit the command to the image forming apparatus 200 based on capability information about the first function, which is provided from the image forming apparatus 200. Also, when the function is performed based on the result, the mobile device 100 may perform the function in connection with an application executable in the mobile device 100.

Hereinafter, a method of processing a workflow in which at least one function supported by the image forming apparatus 200 and at least one function supported by the mobile device are combined, and the mobile device 100 performing the method will be described in detail with reference to workflows.

Figure 40:
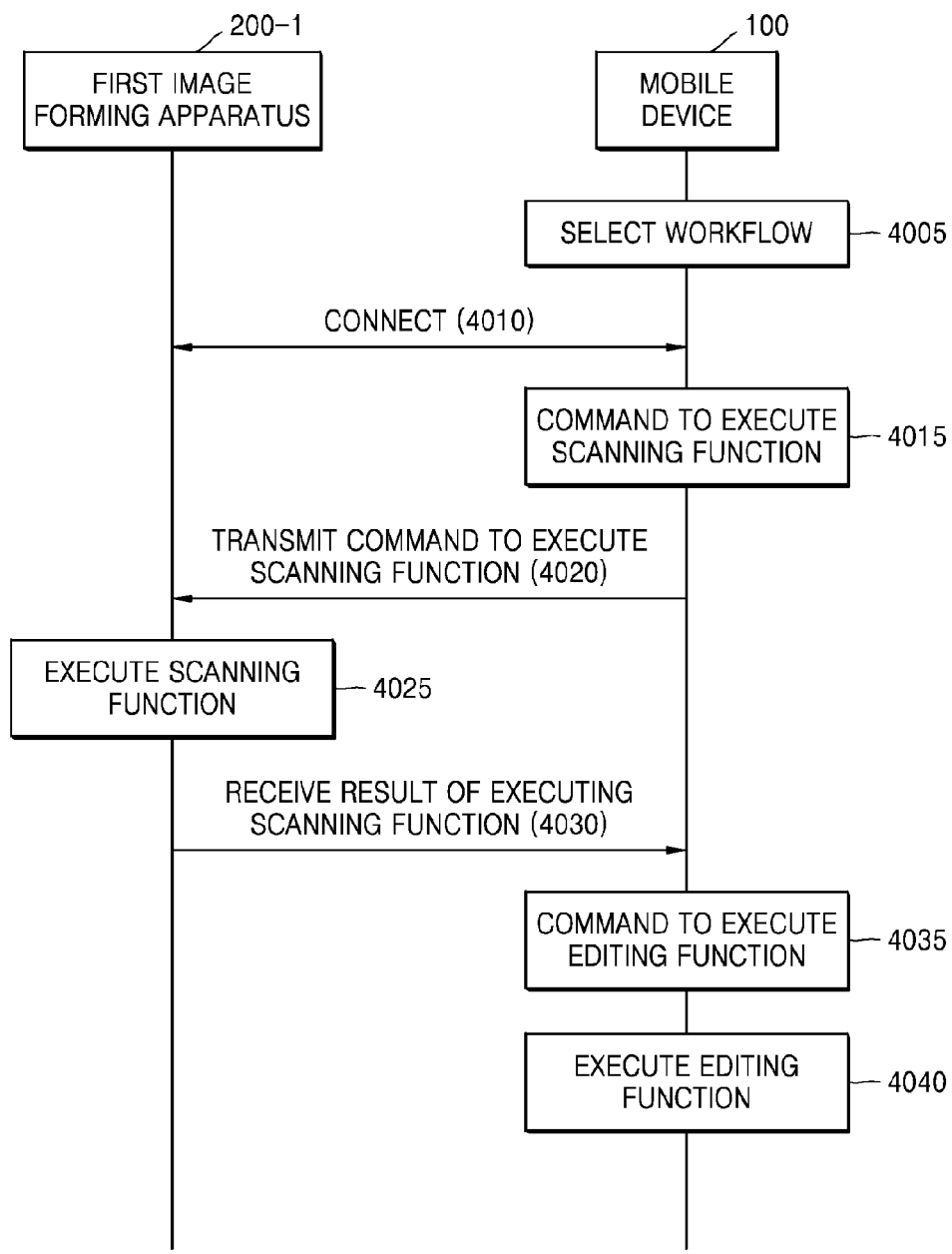
FIG. 40 is a diagram of operations of processing a workflow in which a scanning function of a first image forming apparatus and an editing function of a mobile device are combined, according to an exemplary embodiment.

FIG. 40 is a diagram of operations of processing a workflow in which a scanning function of a first image forming apparatus 200-1 (similar to the image forming apparatus 200 of FIG. 1) and an editing function of a mobile device 100 (similar to the mobile device 100 of FIG. 1) are combined, according to an exemplary embodiment. At least one image forming apparatus used to process the workflow may be connected to the mobile device 100, and for convenience of description, it is assumed that the first image forming apparatus 200-1 is connected to the mobile device 100.

When processing of the scanning function of the first image forming apparatus 200-1 is prior to processing of the editing function of the mobile device 100 in the order defined in the workflow, the workflow may be processed as follows.

In operation 4005, the mobile device 100 may execute a BYOD application according to a BYOD service request, and receive an input of selecting the workflow in which the scanning function of the first image forming apparatus 200-1 and the editing function of the mobile device 100 are combined, from a user.

In operation 4010, the mobile device 100 may be connected to the first image forming apparatus 200-1 that is used to process the workflow. In order to be connected to the first image forming apparatus 200-1 that is capable of executing the scanning function, the mobile device 100 may perform the discovery process, the pairing process, and the event registering process described above.

Figure 41:
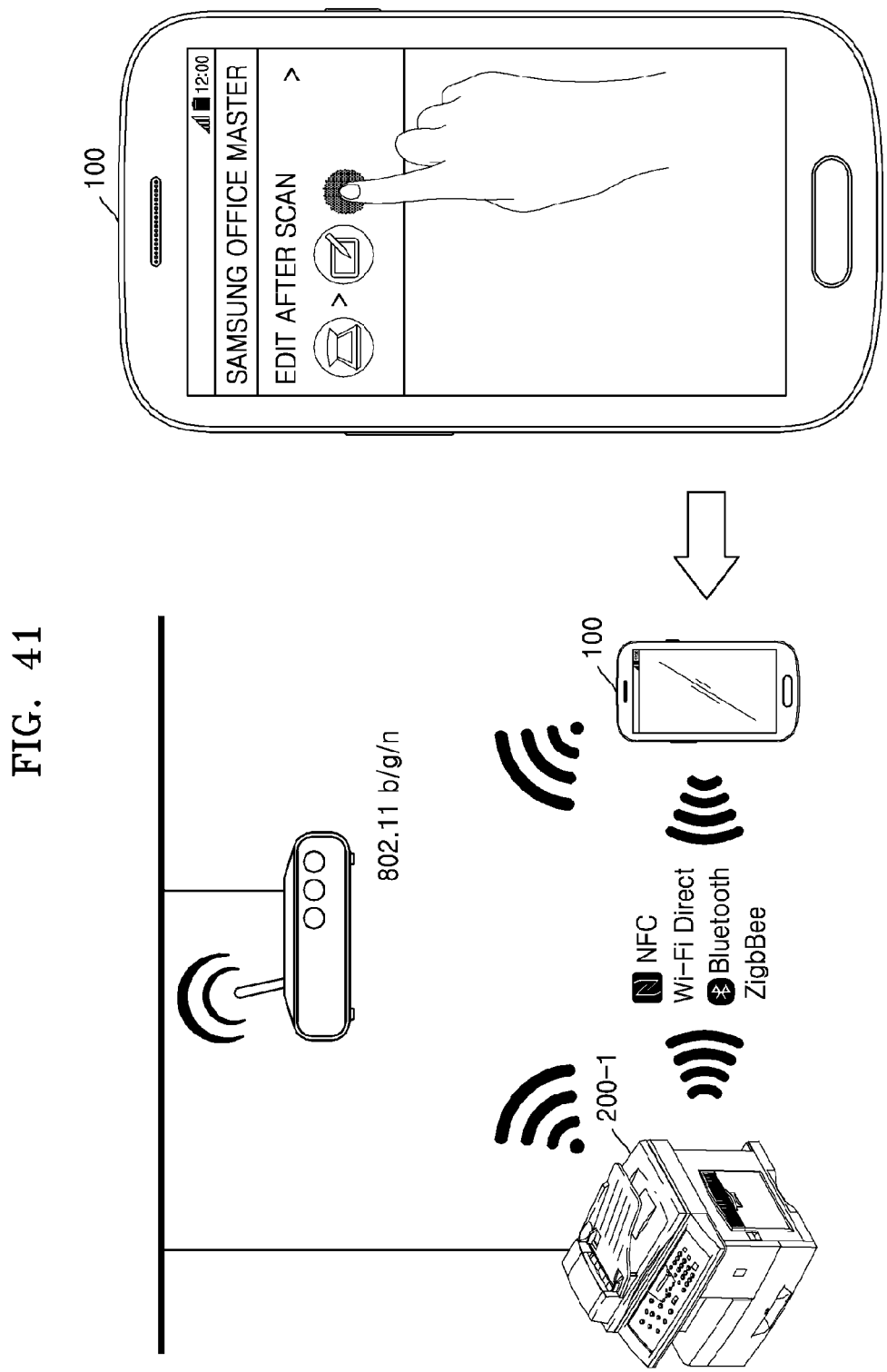
FIG. 41 is a diagram for describing connecting of a first image forming apparatus and a mobile device, which are used to process a workflow, as the mobile device selects the workflow.

FIG. 41 is a diagram for describing connecting of a first image forming apparatus 200-1 (similar to the image forming apparatus 200 of FIG. 1) and a mobile device 100 (similar to the mobile device 100 of FIG. 1), which are used to process a workflow, as the mobile device 100 selects the workflow.

When a user requests a BYOD service, the mobile device 100 executing a BYOD application may display a workflow in a pre-defined form. For example, as shown in FIG. 41, a workflow of "edit after scan" may be displayed. When there are a plurality of pre-defined workflows, a list of the pre-defined workflows may be displayed.

The user may view the list of pre-defined workflows displayed on the mobile device 100, and select one of the workflows. As shown in FIG. 41, the user may touch the workflow displayed on the mobile device 100 to select the workflow.

In order to process the workflow selected by the user, the mobile device 100 executing the BYOD application may be connected to the first image forming apparatus 200-1 executing a function included in the workflow. In order to be connected to the first image forming apparatus 200-1 capable of executing the scanning function, the mobile device 100 may perform the discovery process, the pairing process, and the event registering process described above. If the mobile device 100 and the first image forming apparatus 200-1 are connected for the first time, a registering process of registering each other is performed, and if not, the mobile device 100 and the first image forming apparatus 200-1 may be connected to each other without a separate registering process. Then, the mobile device 100 may collect information about the first image forming apparatus 200-1 to prepare to process the workflow.

Referring back to FIG. 40, in operation 4015, the mobile device 100 may receive a command to execute the scanning function of the first image forming apparatus 200-1, which has a priority, based on an order of processing jobs included in the workflow. In other words, the mobile device 100 executing the BYOD application may receive the command to execute the scanning function by executing a scan application installed in the mobile device 100 such that the scanning function is executed in the first image forming apparatus 200-1 by controlling the first image forming apparatus 200-1.

In operation 4020, the mobile device 100 may transmit the command to execute the scanning function to the first image forming apparatus 200-1. When the command to execute the scanning function is received by executing the scan application installed in the mobile device 100, a UP command corresponding to the command to execute the scanning function may be transmitted to the first image forming apparatus 200-1 according to a UP communication method such that the first image forming apparatus 200-1 supporting the scanning function is controlled by the mobile device 100 executing the BYOD application.

In operation 4025, the first image forming apparatus 200-1 may execute the scanning function. The first image forming apparatus 200-1 may check the UP command received from the mobile device 100, and execute a function corresponding to the UP command.

In operation 4030, the mobile device 100 may receive a result of executing the scanning function. In other words, the mobile device 100 may receive a scanned document obtained by the first image forming apparatus 200-1 according to a UP communication method.

Figure 42:
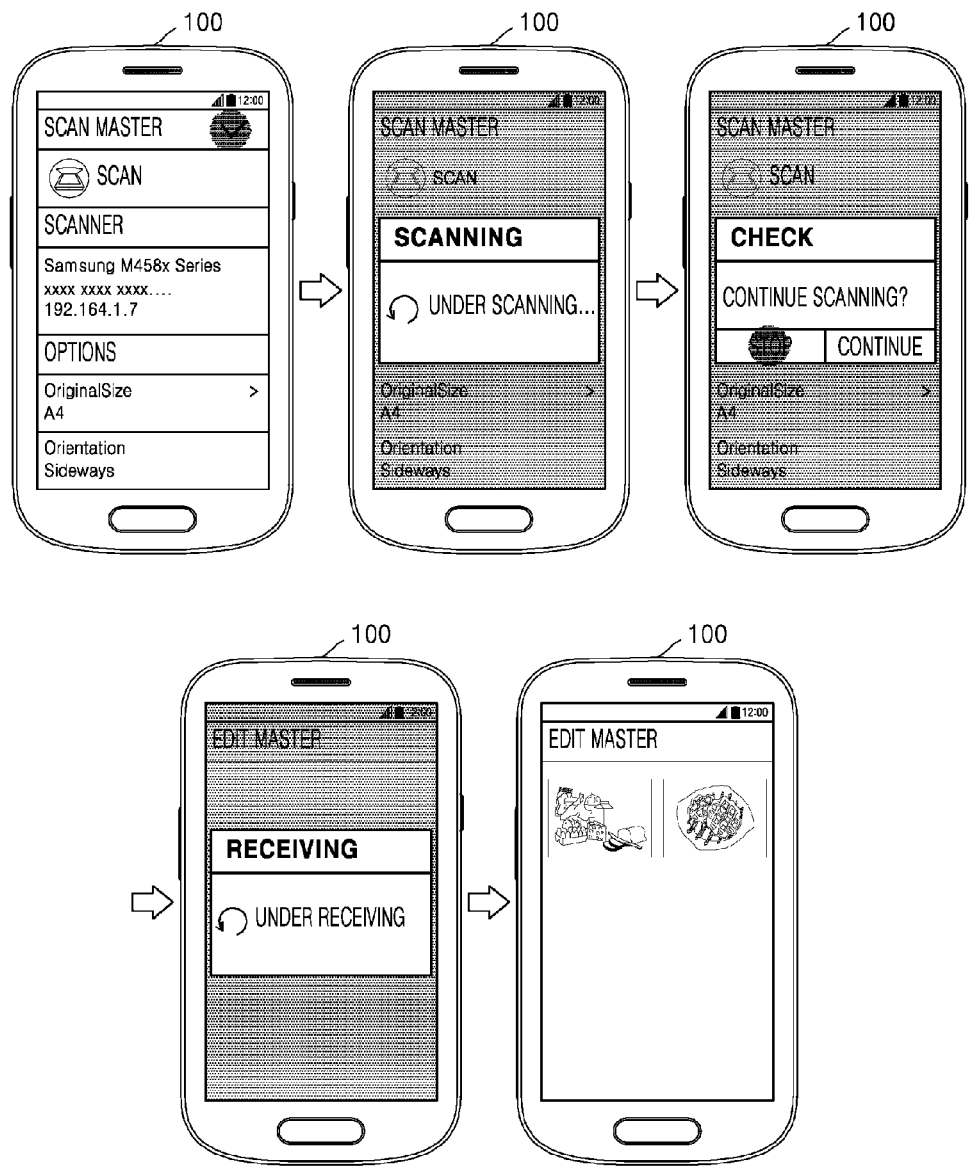
FIG. 42 is a diagram of a process of receiving a result of executing a scanning function of a first image forming apparatus after a mobile device executes the scanning function.

FIG. 42 is a diagram of a process of receiving the result of executing the scanning function of a first image forming apparatus 200-1 (similar to the image forming apparatus 200 of FIG. 1) after a mobile device 100 (similar to the mobile device 100 of FIG. 1) executes the scanning function.

In order to process the workflow of "edit after scan" selected by the user, the mobile device 100 executing the BYOD application may first execute the scanning function of the first image forming apparatus 200-1 based on the order of jobs included in the workflow.

Referring to FIG. 42, the mobile device 100 executing the BYOD application may execute the scan application installed in the mobile device 100 in order to control the first image forming apparatus 200-1 supporting the scanning function. The mobile device 100 may display a UI screen for receiving the command to execute the scanning function as an execution screen of the scan application, based on capability information regarding the scanning function provided from the first image forming apparatus 200-1. For example, the execution screen of the scan application may be configured by reflecting the capability information currently provided by the first image forming apparatus 200-1, such as a manuscript size, a manuscript direction, double-side scanning, and a color mode. The mobile device 100 may receive the command to execute the scanning function from the user who checked the execution screen of the scan application.

When the command to execute the scanning function is input to the mobile device 100, a UP command containing scan options set by the user, a storage location of a scanned document, and a file name, may be transmitted to the first image forming apparatus 200-1 executing the scanning function.

The first image forming apparatus 200-1 may execute the scanning function according to the UP command. The first image forming apparatus 200-1 may transmit a status of executing the scanning function to the mobile device 100 while executing the scanning function, according to a web socket method. For example, while the scanning function is executed by the first image forming apparatus 200-1, the mobile device 100 may display a pop-up screen indicating that scanning is being performed. When there are several pages to be scanned by the first image forming apparatus 200-1, the mobile device 100 may display a pop-up screen enquiring the user whether to scan a next page.

When the executing of the scanning function is completed in the first image forming apparatus 200-1, the mobile device 100 may receive the result of executing the scanning function. While receiving the scanned document from the first image forming apparatus 200-1, the mobile device 100 may display a pop-up screen indicating that the scanned document is being received.

After the scanned document is received from the first image forming apparatus 200-1, the mobile device 100 may determine that the scanning function included in the workflow of "edit after scan" is completed, and execute an edit application installed in the mobile device 100 in order to execute an editing function. An execution screen of the edit application, which is displayed on the mobile device 100, may automatically display the scanned document received from the first image forming apparatus 200-1, thereby preparing to execute the editing function.

Referring back to FIG. 40, in operation 4035, the mobile device 100 may receive a command to execute the editing function on the scanned document. In other words, the mobile device 100 executing the BYOD application may receive the command to execute the editing function by executing the edit application installed in the mobile device 100. The editing function of the mobile device 100 may not be supported by the first image forming apparatus 200-1. When the scanned document is received from the first image forming apparatus 200-1, the mobile device 100 may determine that the scanning function included in the workflow is completed, and receive the command to execute the editing function that is performed after the scanning function from the user.

In operation 4040, the mobile device 100 may execute the editing function on the scanned document received from the first image forming apparatus 200-1, according to the command to execute the editing function. Accordingly, the mobile device 100 may generate an edited document obtained by executing the editing function on the scanned document.

Figure 43:
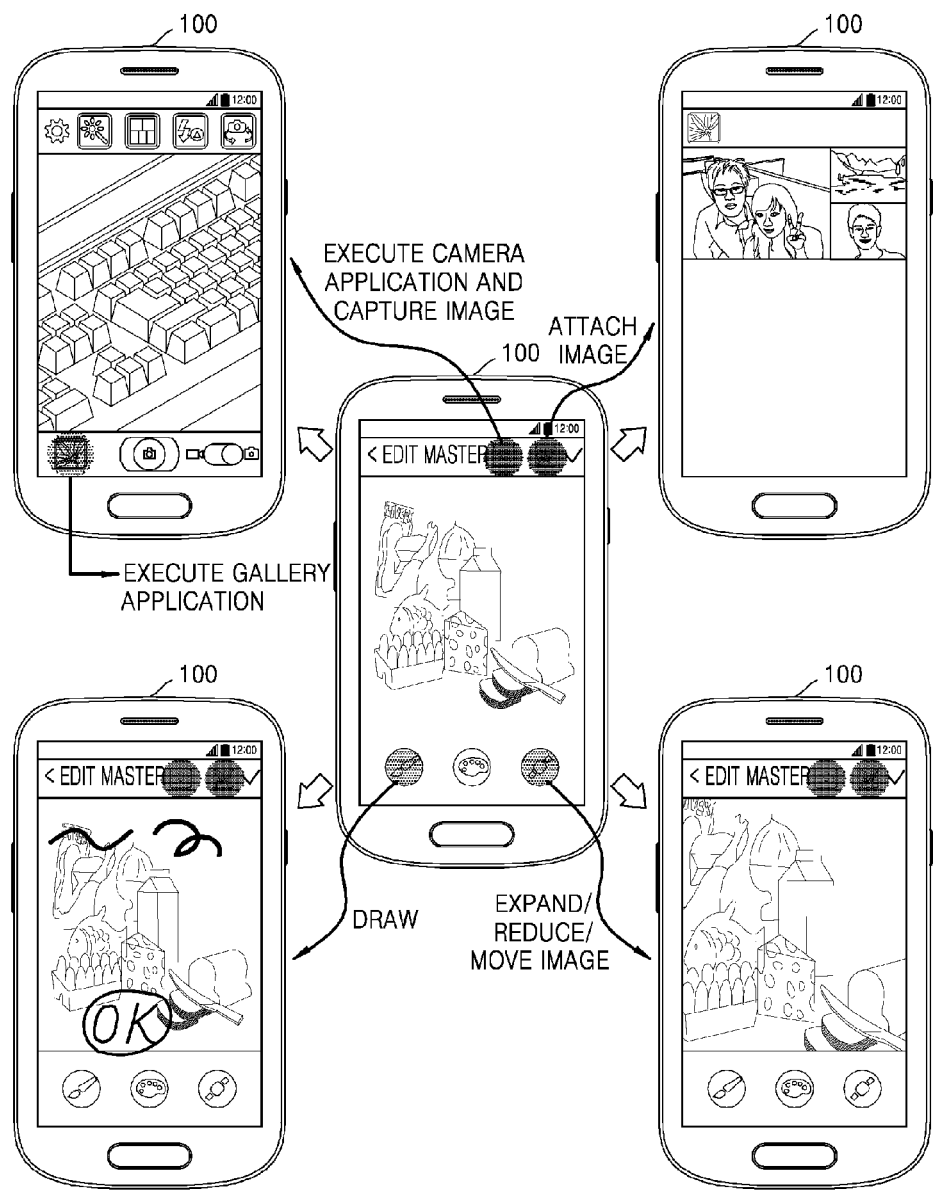
FIG. 43 is a diagram for describing executing of an editing function of a mobile device by using a resource of the mobile device.

FIG. 43 is a diagram for describing executing of the editing function of a mobile device 100 (similar to the mobile device 100 of FIG. 1) by using a resource of the mobile device 100.

As shown in FIG. 43, the user may edit the scanned document by using various edit tools displayed together with the scanned document, on the execution screen of the edit application of the mobile device 100. An application interworking with the edit tools included in the execution screen of the edit application may be an application embedded in the mobile device 100 or installed in the mobile device 100 by the user. For example, a camera tool included in the execution screen of the edit application may interwork with a camera application, a drawing tool may interwork with a drawing broad application, and an image attaching tool may interwork with a gallery application.

Figure 44:
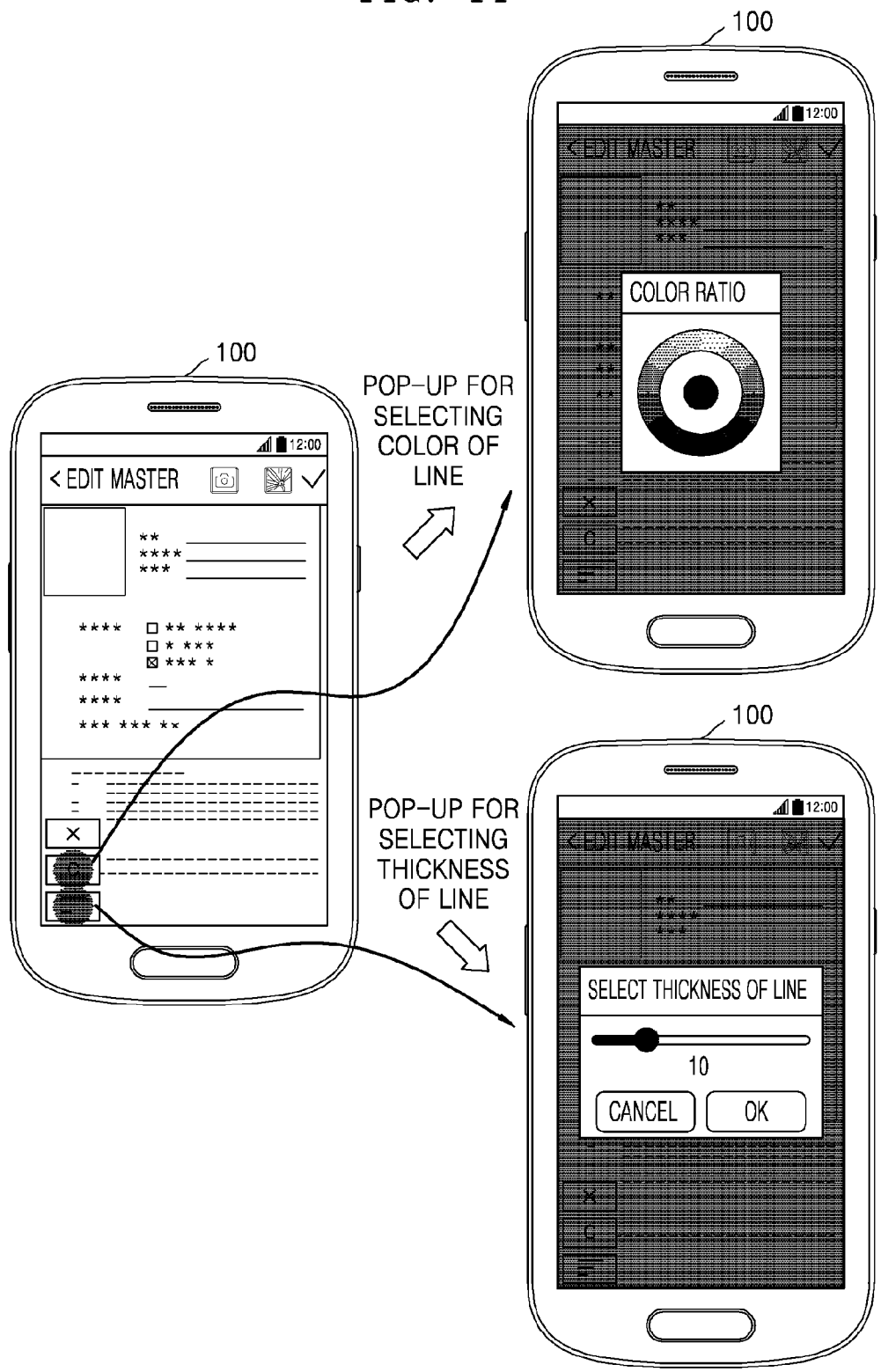
FIG. 44 is a diagram for describing a manipulation interface regarding drawing when an editing function of a mobile device is executed.

FIG. 44 is a diagram for describing a manipulation interface regarding drawing when the editing function of a mobile device 100 (similar to the mobile device 100 of FIG. 1) is executed.

When the drawing tool is selected from the execution screen of the edit application of FIG. 43, the manipulation interface regarding drawing may be displayed as shown in FIG. 44. The user may use the manipulation interface to draw a line or a shape on an image of a scanned document. The manipulation interface may display a pop-up screen for selecting a color of a line and a pop-up screen for selecting a thickness of a line. When the drawing tool is to be ended, an "X" button on the manipulation interface may be touched to end the drawing tool.

Figure 45:
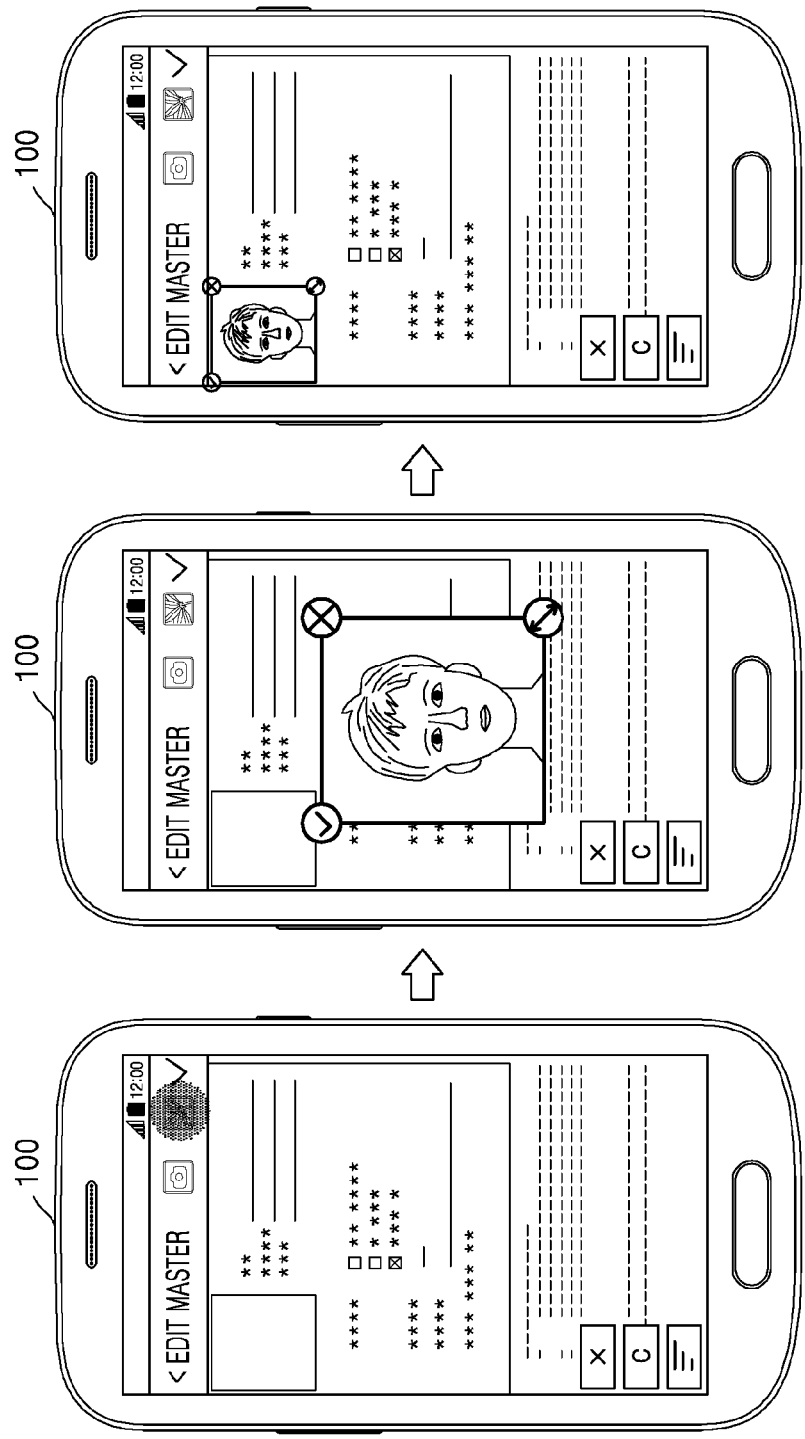
FIG. 45 is a diagram for describing a manipulation interface regarding attaching an image when an editing function of a mobile device is executed.

FIG. 45 is a diagram for describing a manipulation interface regarding attaching an image when the editing function of a mobile device 100 (similar to the mobile device 100 of FIG. 1) is executed.

When the image attaching tool is selected from the execution screen of the edit application, the gallery application interworking with the image attaching tool may be executed. The user may select one of images stored in the gallery application. When the image is selected, the manipulation interface regarding attaching an image may be displayed as shown in FIG. 44. The user may use the manipulation interface to attach the selected image to a scanned document. The manipulation interface may be displayed together with the selected image, at an edge of the selected image. For example, as shown in FIG. 45, a location of the image may be adjusted by lengthily pressing a location adjusting button at a right bottom of the image, and the image may be inserted to the adjusted location by pressing an OK button at a left top of the image. Alternatively, the image may be removed by pressing a remove button at the right top of the image. After the image is attached, the scanned document with the attached image may be stored.

A size or location of a document to be edited may be adjusted by using an image expanding/reducing/moving tool included in the execution screen of the edit application.

As a result, the workflow of "edit after scan" is unable to be processed by the first image forming apparatus 200-1 alone, but by using the edit application and various applications interworking with an edit tool, which correspond to resources of the mobile device 100, the workflow may be processed.

Figure 46:
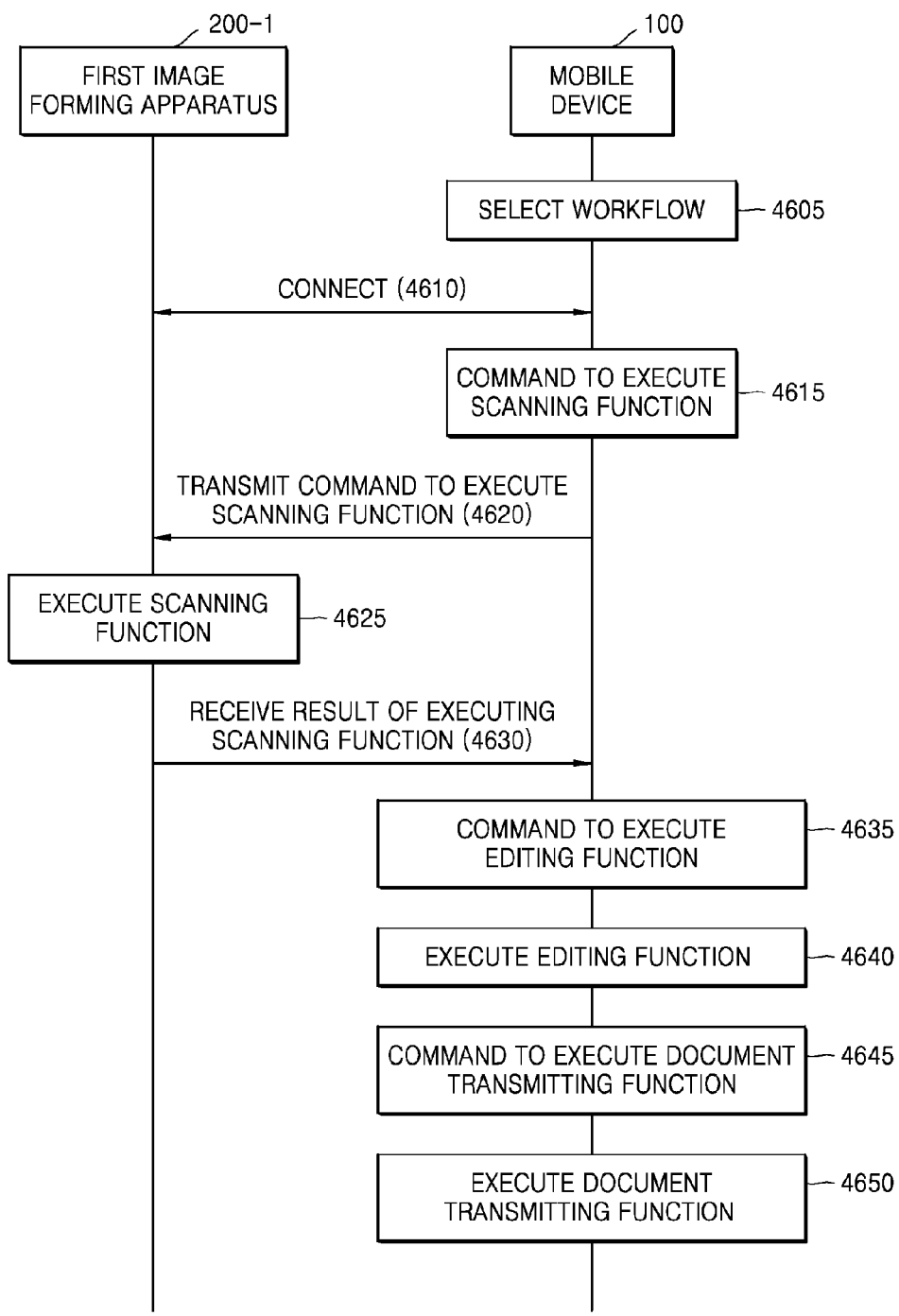
FIG. 46 is a diagram of processes of processing a workflow in which a scanning function of a first image forming apparatus, and an editing function and a document transmitting function of a mobile device are combined, according to an exemplary embodiment.

FIG. 46 is a diagram of processes of processing a workflow in which a scanning function of the first image forming apparatus 200-1 (similar to the image forming apparatus 200 of FIG. 1), and an editing function and a document transmitting function of a mobile device 100 (similar to the mobile device 100 of FIG. 1) are combined, according to an exemplary embodiment. Comparing the workflows of FIGS. 40 and 46, the workflow of FIG. 46 further includes the document transmitting function of the mobile device 100. Such a workflow of FIG. 46 may be named "edit and transmit after scan".

The mobile device 100 may support both the editing function and the document transmitting function that are not supported by the first image forming apparatus 200-1. When the scanning function of the first image forming apparatus 200-1 is performed first and the document transmitting function of the mobile device 100 is performed last, the workflow may be processed as follows.

Since operations 4605 through 4640 of FIG. 46 correspond to operations 4005 through 4040 of FIG. 40, details thereof are not provided again, and the processes from operation 4645 is described.

In operation 4645, the mobile device 100 may receive a command to execute the document transmitting function of the mobile device 100, which is performed last based on the order of performing jobs included in the workflow. In other words, the mobile device 100 executing the BYOD application may receive the command to execute the document transmitting function by executing a document transmitting application installed in the mobile device 100 such that the document transmitting function is executed. The mobile device 100 may receive the command to execute the document transmitting function on an edited document obtained by editing the scanned document using the editing function of the mobile device 100.

In operation 4650, the mobile device 100 may execute the document transmitting function by transmitting the edited document to an external device. In other words, the mobile device 100 may execute the document transmitting function on the edited document.

Figure 47:
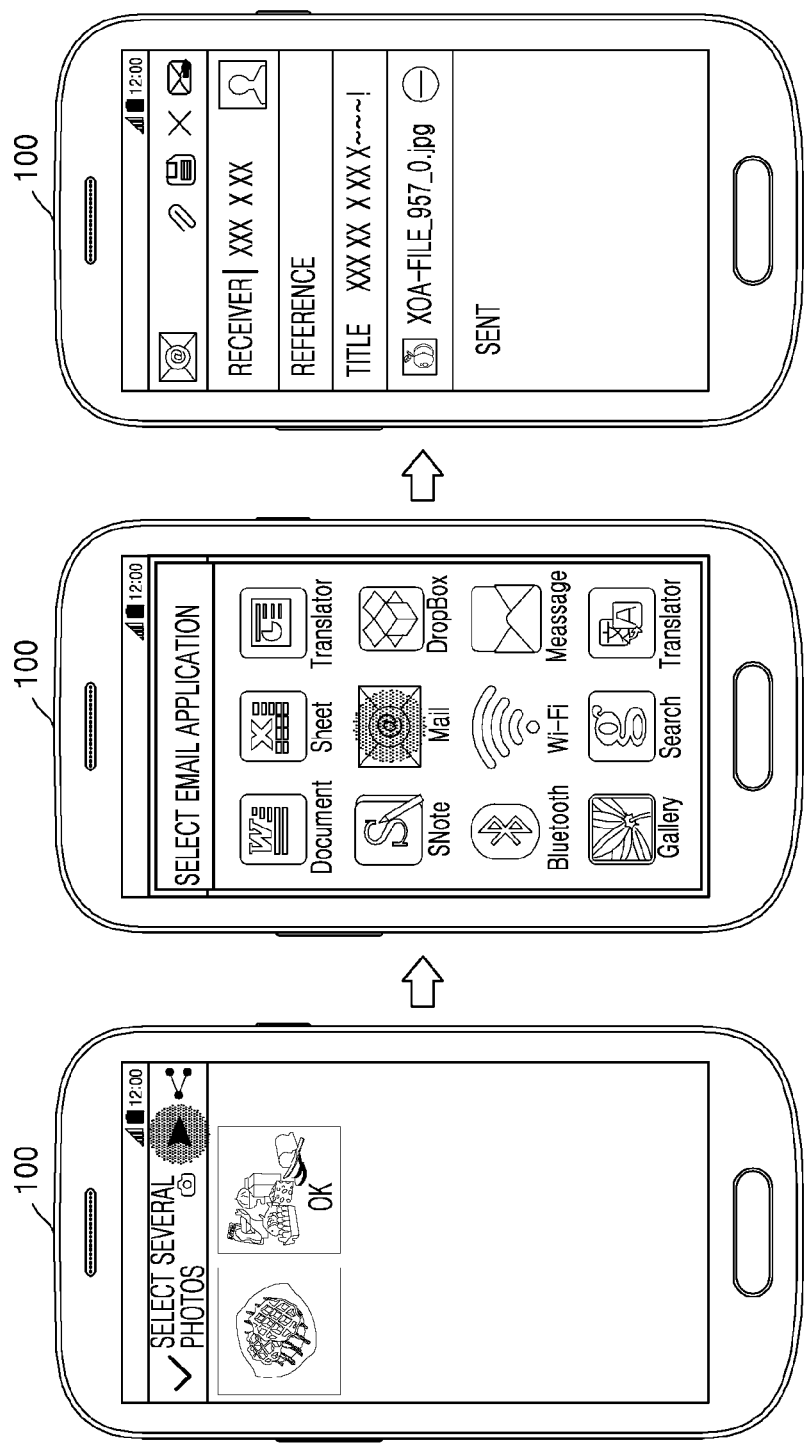
FIG. 47 is a diagram of a process of executing a document transmitting function of a mobile device regarding an edited document obtained by editing a scanned document.

FIG. 47 is a diagram of a process of executing a document transmitting function of a mobile device 100 (similar to the mobile device 100 of FIG. 1) regarding an edited document obtained by editing a scanned document.

The mobile device 100 executing a BYOD application may display a screen for selecting a document to be transmitted when document editing is ended, in order to process a workflow of "edit and transmit after scan" selected by a user. The user may check the edited document from the screen for selecting a document to be transmitted. When the user selects the edited document from the mobile device 100 and inputs a command to execute the document transmitting function, various applications installed in the mobile device 100 may be displayed. As shown in FIG. 47, the user may select an email application in order to transmit the edited document. The mobile device 100 may transmit the edited document by using the email application, and display a document transmittance status.

As a result, the workflow of "edit and transmit after scan" is unable to be solely processed by the first image forming apparatus 200-1, but may be processed by using an edit application and a document transmitting application, which correspond to resources of the mobile device 100.

Figure 48:
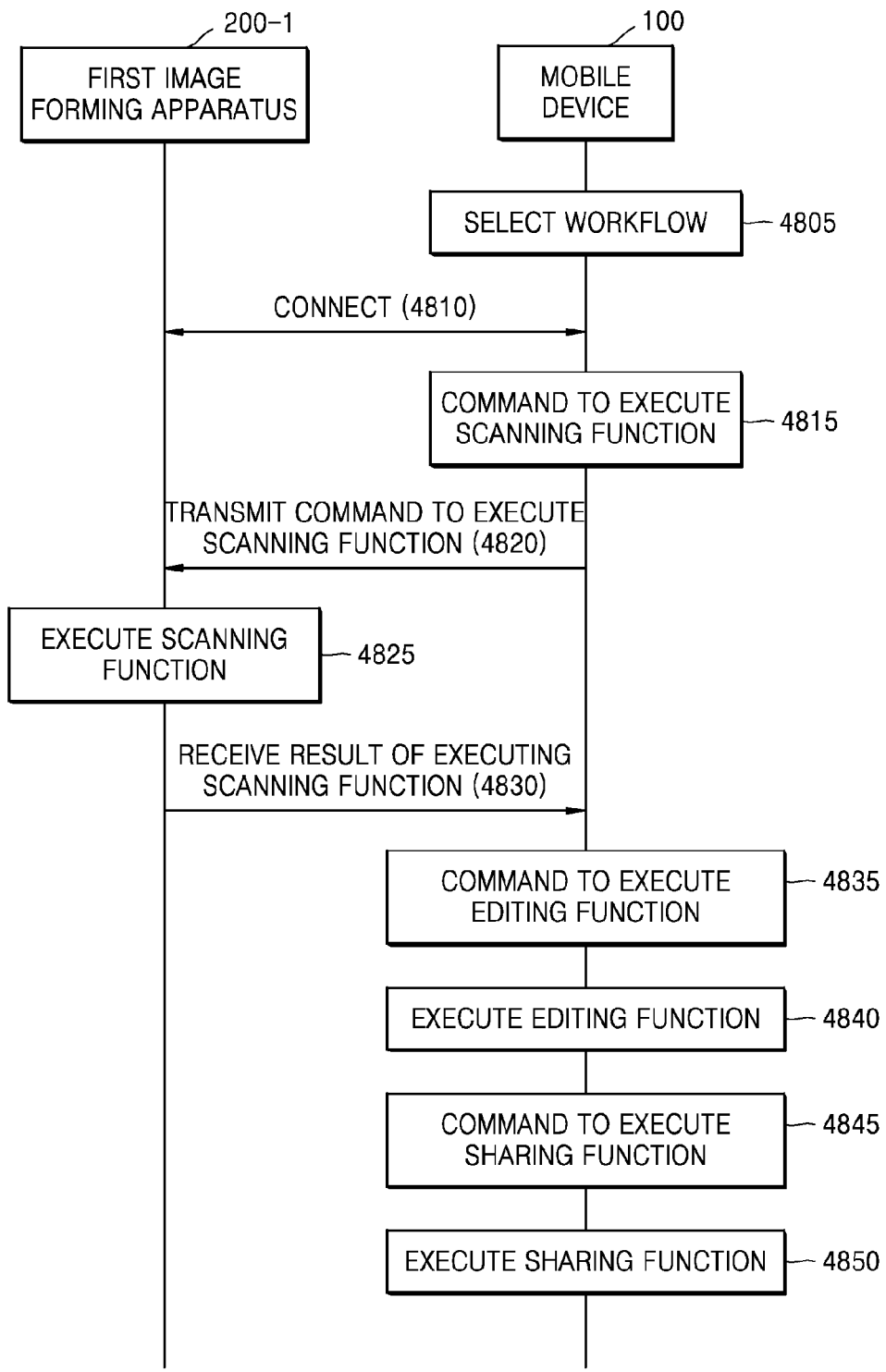
FIG. 48 is a diagram of processes of processing a workflow in which a scanning function of a first image forming apparatus, and an editing function and a sharing function of a mobile device are combined, according to an exemplary embodiment.

FIG. 48 is a diagram of processes of processing a workflow in which a scanning function of a first image forming apparatus 200-1 (similar to the image forming apparatus 200 of FIG. 1), and an editing function and a sharing function of a mobile device 100 (similar to the mobile device 100 of FIG. 1) are combined, according to an exemplary embodiment. Comparing the workflow of FIG. 48 with the workflow of FIG. 40, the workflow of FIG. 48 further includes the sharing function of the mobile device 100. Such a workflow may be named "edit and share after scan".

The mobile device 100 may support the editing function and the sharing function that are not supported by the first image forming apparatus 200-1. When the scanning function of the first image forming apparatus 200-1 is performed first and the sharing function of the mobile device 100 is performed last, the workflow may be processed as follows.

Since operations 4805 through 4840 of FIG. 48 correspond to operations 4005 through 4040 of FIG. 40, details thereof are not provided again, and the processes from operation 4845 will be described.

In operation 4845, the mobile device 100 may receive a command to execute the sharing function of the mobile device 100, which is performed last based on an order of processing functions included in the workflow. In other words, the mobile device 100 executing a BYOD application may receive the command to execute the sharing function by executing a sharing application installed in the mobile device 100, such that the sharing function is executed. The mobile device 100 may receive the command to execute the sharing function on an edited document that obtained by editing a scanned document by using the editing function of the mobile device 100.

In operation 4850, the mobile device 100 may execute the sharing function to share the edited document obtained by editing the scanned document by using the editing function. In other words, the mobile device 100 may execute the sharing function on the edited document.

Figure 49:
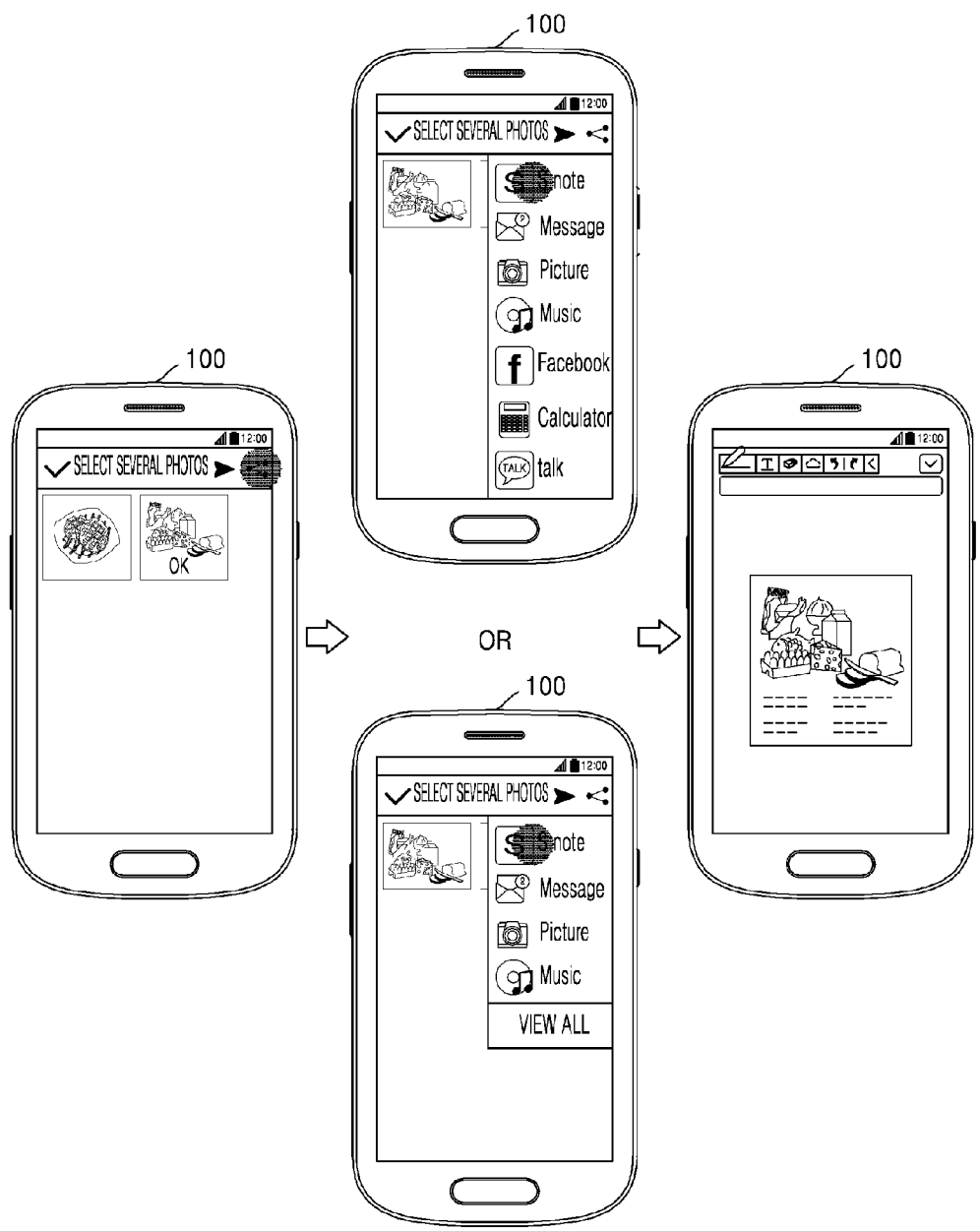
FIG. 49 is a diagram of a process of executing a sharing function of a mobile device regarding an edited document obtained by editing a scanned document.

FIG. 49 is a diagram of a process of executing a sharing function of a mobile device 100 (similar to the mobile device 100 of FIG. 1) regarding an edited document obtained by editing a scanned document.

The mobile device 100 executing a BYOD application may display a screen for selecting a document to be shared when document editing is ended, in order to process a workflow of "edit and share after scan" selected by a user. The user may check the edited document from the screen for selecting a document to be shared. When the user selects the edited document from the mobile device 100 and inputs a command to execute the sharing function, various sharing applications installed in the mobile device 100 may be displayed. As shown in FIG. 49, the user may select an "S note application" for transmitting and sharing a document, in order to share the edited document. Alternatively, the user may select the "S note application" according to a short-cut function that separately displays recently used sharing applications. The mobile device 100 may share the edited document with an external device by using a sharing application.

As a result, the workflow of "edit and share after scan" is unable to be solely processed by the first image forming apparatus 200-1, but may be processed by using an editing application and a sharing application, which correspond to resources of the mobile device 100.

Figure 50:
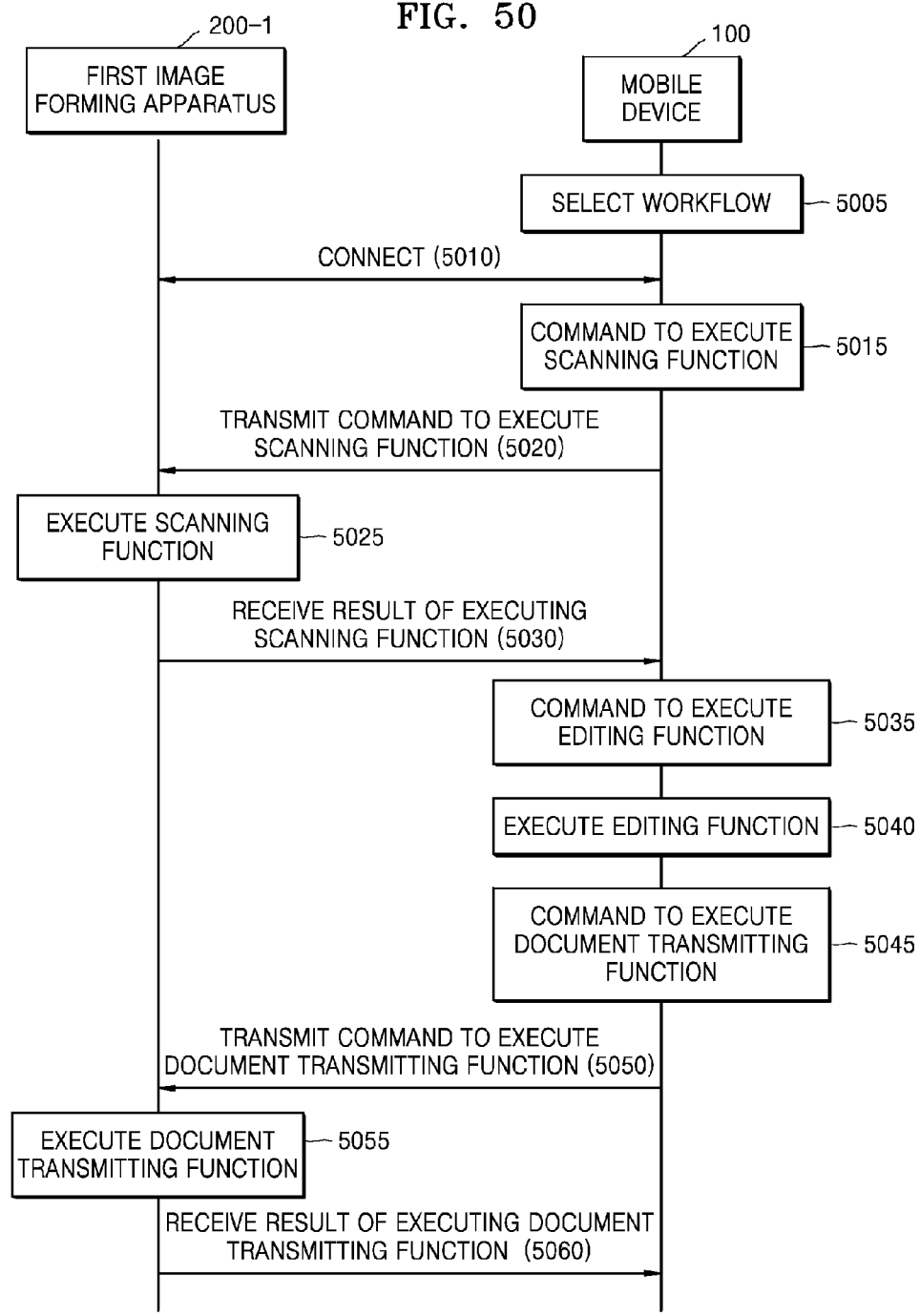
FIG. 50 is a diagram of processes of processing a workflow in which a scanning function of a first image forming apparatus, an editing function of a mobile device, and a document transmitting function of the first image forming apparatus are combined, according to an exemplary embodiment.

FIG. 50 is a diagram of processes of processing a workflow in which a scanning function of the first image forming apparatus 200-1 (similar to the image forming apparatus 200 of FIG. 1), an editing function of a mobile device 100 (similar to the mobile device 100 of FIG. 1), and a document transmitting function of the first image forming apparatus 200-1 are combined, according to an exemplary embodiment. Comparing the workflow of FIG. 50 with the workflow of FIG. 40, the workflow of FIG. 50 further includes the document transmitting function of the first image forming apparatus 200-1. Also, comparing the workflow of FIG. 50 with the workflow of FIG. 46, a subject that executes the document transmitting function is not the mobile device 100, but the first image forming apparatus 200-1. The workflow of FIG. 50 may be named "edit and proxy-transmit after scan".

The mobile device 100 may support the editing function that is not supported by the first image forming apparatus 200-1. When the scanning function of the first image forming apparatus 200-1 is performed first and the document transmitting function of the first image forming apparatus 200-1 is performed last, the workflow may be processed as follows.

Since operations 5005 through 5040 of FIG. 50 correspond to operations 4005 through 4040 of FIG. 40, details thereof are not provided again, and the processes from operation 5045 will be described.

In operation 5045, the mobile device 100 may receive a command to execute the document transmitting function of the first image forming apparatus 200-1, which is performed last, based on an order of processing functions included in the workflow. In other words, the mobile device 100 executing a BYOD application may receive the command the execute the document transmitting function by executing a document transmitting application installed in the mobile device 100, such that the document transmitting function is executed in the first image forming apparatus 200-1 by controlling the first image forming apparatus 200-1 supporting the document transmitting function. The mobile device 100 may receive the command to execute the document transmitting function of the first image forming apparatus 200-1 regarding an edited document obtained by editing a scanned document by using the editing function of the mobile device 100.

In operation 5050, the mobile device 100 may transmit the command to execute the document transmitting function to the first image forming apparatus 200-1. When the command to execute the document transmitting function is received by executing the document transmitting application installed in the mobile device 100, a UP command corresponding to the command to execute the document transmitting function may be transmitted to the first image forming apparatus 200-1 according to a UP communication method, such that the mobile device 100 executing the BYOD application controls the first image forming apparatus 200-1 supporting the document transmitting function.

In operation 5055, the first image forming apparatus 200-1 may execute the document transmitting function on the edited document. The first image forming apparatus 200-1 may check the UP command received from the mobile device 100, and execute a function of the first image forming apparatus 200-1, which corresponds to the UP command.

In operation 5060, the mobile device 100 may receive a result of executing the document transmitting function. For example, the mobile device 100 may receive a status of executing the document transmitting function on the edited document from the first image forming apparatus 200-1.

Figure 51:
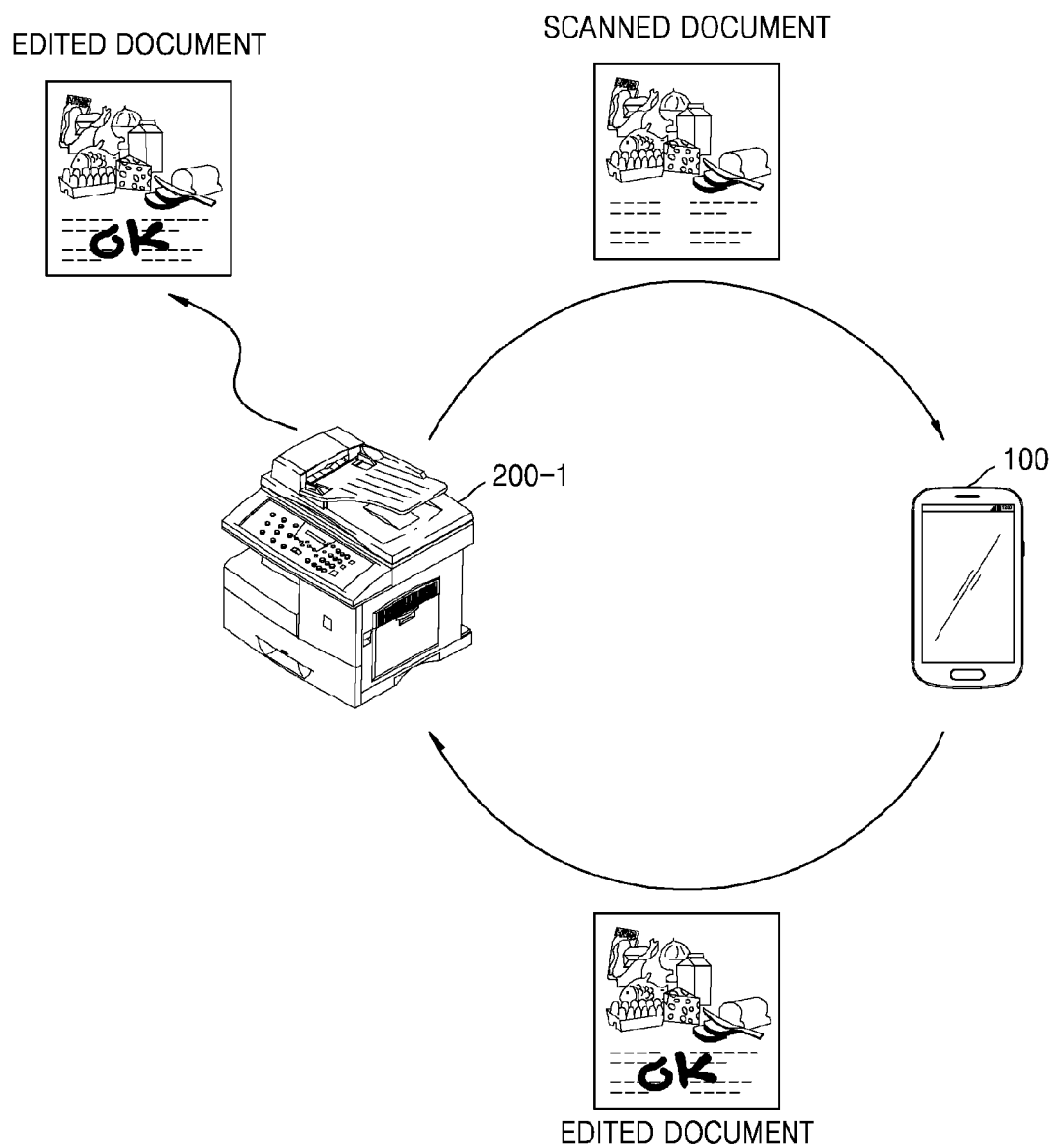
FIG. 51 is a diagram of a process of executing a document transmitting function of a first image forming apparatus regarding an edited document obtained by editing a scanned document.

FIG. 51 is a diagram of a process of executing a document transmitting function of a first image forming apparatus 200-1 (similar to the image forming apparatus 200 of FIG. 1) regarding an edited document obtained by editing a scanned document.

In order to process a workflow of "edit and proxy-transmit after scan" selected by a user, a mobile device 100 (similar to the mobile device 100 of FIG. 1) executing a BYOD application may display a screen for selecting a document to be transmitted when document editing is ended. The user may check the edited document from the screen for selecting a document to be transmitted. When the user selects the edited document from the mobile device 100 and inputs a command to execute the document transmitting function of the first image forming apparatus 200-1, the mobile device 100 executing the BYOD application may transmit a UP command corresponding to the command to execute the document transmitting function on the edited document to the first image forming apparatus 200-1 according to a UP communication method. The first image forming apparatus 200-1 may receive a destination of the edited document and the UP command together with the edited document from the mobile device 100, and transmit the edited document to the destination. According to such a workflow, when it is difficult for the mobile device 100 to transmit the edited document, the edited document may be transmitted by the first image forming apparatus 200-1 that supports the document transmitting function.

As a result, the workflow of "edit and proxy-transmit after scan" is unable to be solely performed by the first image forming apparatus 200-1, but may be processed by using an editing application corresponding to a resource of the mobile device 100.

Figure 52:
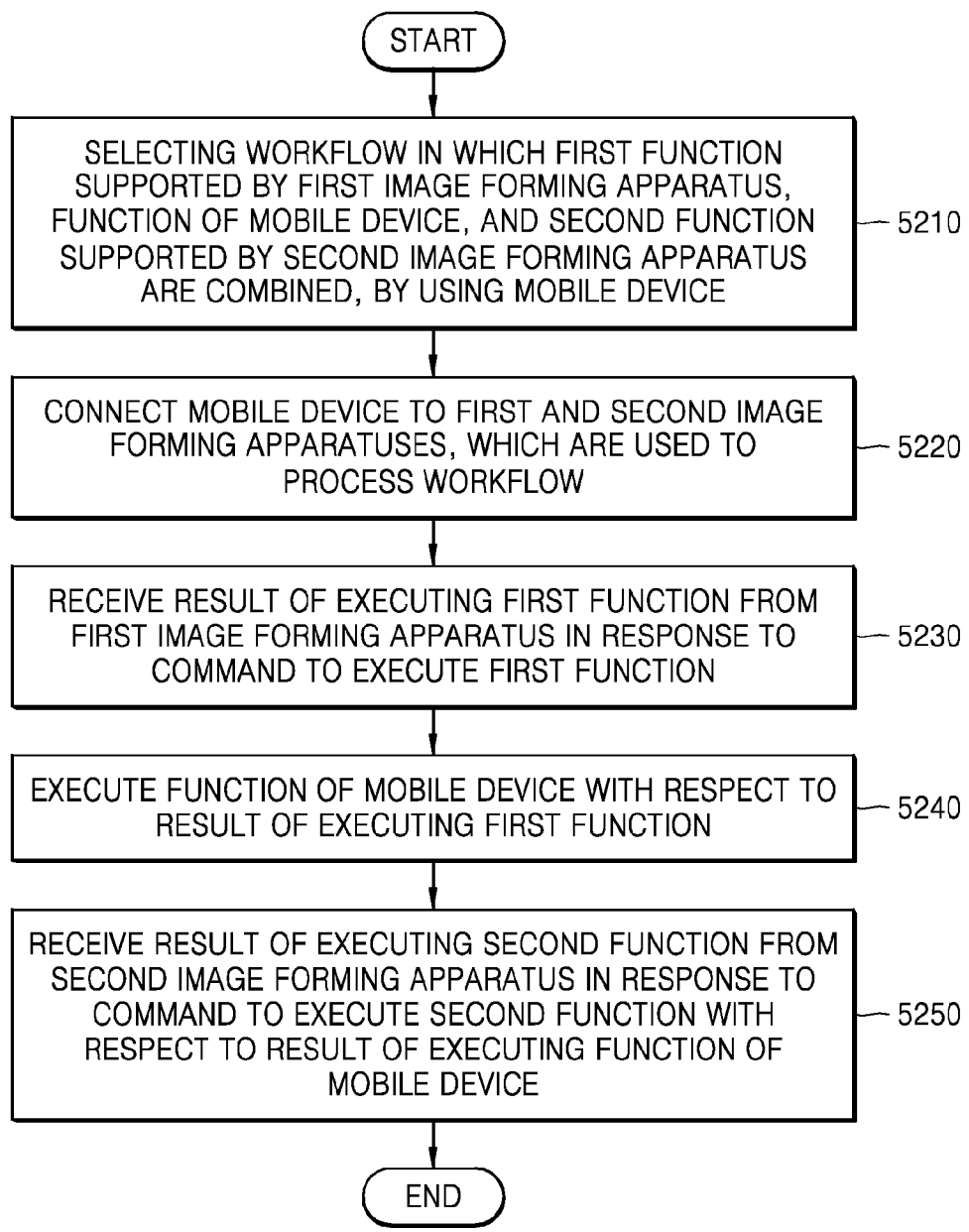
FIG. 52 is a flowchart of a method of processing a workflow, according to another exemplary embodiment.

FIG. 52 is a flowchart of a method of processing a workflow, according to another exemplary embodiment. Details about a mobile device 100 (similar to the mobile device 100 of FIG. 1) for processing the workflow described above may be applied to the method of FIG. 52, even if not explicitly mentioned. At least one image forming apparatus (similar to the image forming apparatus 200 of FIG. 1) that is used to process the workflow may be connected to the mobile device 100, and for convenience of description, it is assumed that the first image forming apparatus 200-1 and a second image forming apparatus 200-2 (similar to the image forming apparatus 200 of FIG. 1) are connected to the mobile device 100. The first image forming apparatus 200-1 may execute a first function included in a workflow, and the second image forming apparatus 200-2 may execute a second function included in the workflow.

In operation 5210, the mobile device 100 may receive an input of selecting a workflow in which the first function supported by the first image forming apparatus 200-1, a function of the mobile device 100, and the second function supported by the second image forming apparatus 200-2 are combined. In other words, a user of the mobile device 100 may select the workflow in which the first function supported by the first image forming apparatus 200-1, the function of the mobile device 100, and the second function supported by the second image forming apparatus 200-2 are combined. At this time, the mobile device 100 may execute a BYOD application according to a BYOD service request of the user, and receive the input of selecting the workflow according to the execution of the BYOD application. The function of the mobile device 100 included in the workflow may not be supported by the first and second image forming apparatuses 200-1 and 200-2.

In operation 5220, the mobile device 100 may be connected to the first and second image forming apparatuses 200-1 and 200-2, which are used to process the workflow. The mobile device 100 may be connected to the first and second image forming apparatuses 200-1 and 200-2 by performing a discovery process (similar to the discover process 650 of FIG. 6). A pairing process (similar to the pairing process 660 of FIG. 6), and an event registering process (similar to the event registering process 670 of FIG. 6), which are described above.

The mobile device 100 may execute functions included in the workflow based on an order of processing the functions, which is defined in the workflow, and when the first function supported by the first image forming apparatus 200-1 is performed first and the second function supported by the second image forming apparatus 200-2 is performed last, the workflow may be processed as follows.

In operation 5230, in response to a command to execute the first function, the mobile device 100 may receive a result of executing the first function from the first image forming apparatus 200-1. In order to receive the result of executing the first function, the mobile device 100 may transmit the command to execute the first function to the first image forming apparatus 200-1 based on capability information about the first function, which is provided by the first image forming apparatus 200-1.

In operation 5240, the mobile device 100 may execute the function of the mobile device 100 with respect to the result of executing the first function. Here, when the mobile device 100 is executing the function of the mobile device 100 with respect to the result of executing the first function, the function of the mobile device 100 may be executed by interworking with an application executable in the mobile device 100.

In operation 5250, in response to a command to execute a second function with respect to a result of executing the function of the mobile device 100, the mobile device 100 may receive a result of executing the second function from the second image forming apparatus 200-2.

Hereinafter, a method of processing a workflow in which at least one function supported by the first image forming apparatus 200-1, at least one function supported by the mobile device 100, and at least one function supported by the second image forming apparatus 200-2 are combined, and the mobile device 100 executing the workflow will now be described with respect to examples of the workflow.

Figure 53:
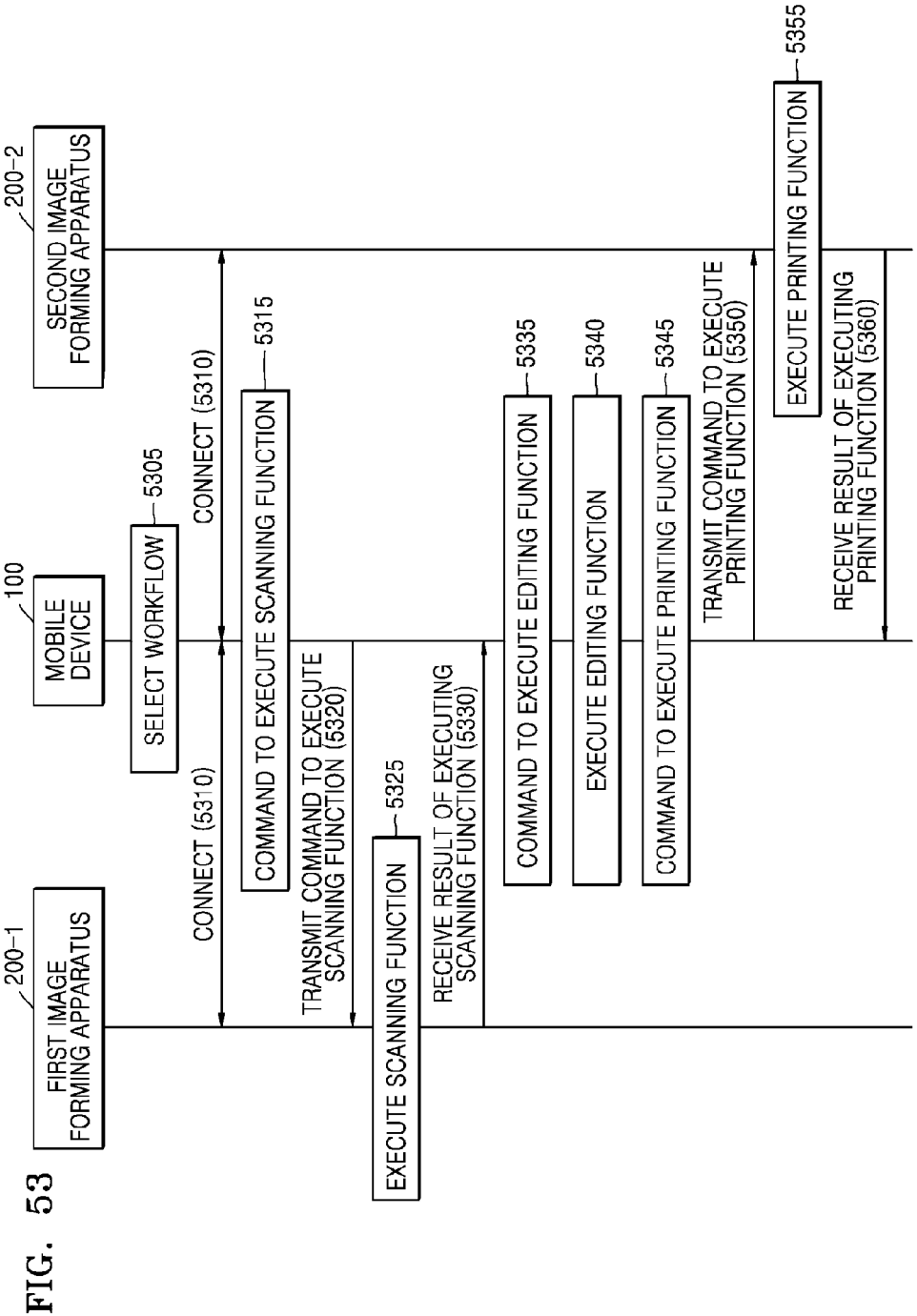
FIG. 53 is a diagram of processes of processing a workflow in which a scanning function of a first image forming apparatus, an editing function of a mobile device, and a printing function of a second image forming apparatus are combined, according to an exemplary embodiment.

FIG. 53 is a diagram of processes of processing a workflow in which a scanning function of a first image forming apparatus 200-1 (similar to the image forming apparatus 200 of FIG. 1), an editing function of a mobile device 100 (similar to the mobile device 100 of FIG. 1), and a printing function of a second image forming apparatus 200-2 (similar to the image forming apparatus 200 of FIG. 1) are combined, according to an exemplary embodiment. Such a workflow may be named "edit and print after scan"

The mobile device 100 may support the editing function that is not supported by the first image forming apparatus 200-1, and the second image forming apparatus 200-2 may support the printing function that is not supported by the first image forming apparatus 200-1. When the scanning function supported by the first image forming apparatus 200-1 is processed first, and the printing function supported by the second image forming apparatus 200-2 is performed last, the workflow may be processed as follows.

In operation 5305, the mobile device 100 executes a BYOD application according to a BYOD service request, and receives an input of selecting the workflow, in which the scanning function of the first image forming apparatus 200-1, the editing function of the mobile device 100, and the printing function of the second image forming apparatus 200-2 are combined, from the user.

In operation 5310, the mobile device 100 may be connected to the first image forming apparatus 200-1 used to process the workflow, and connected to the second image forming apparatus 200-2. In order to be connected to the first image forming apparatus 200-1 capable of executing the scanning function and the second image forming apparatus 200-2 capable of executing the printing function, the mobile device 100 may perform a discovery process (similar to the discovery process 650 of FIG. 6), a pairing process (similar to the pairing process 660 of FIG. 6), and an event registering process (similar to the event registering process 670 of FIG. 6), which are described above.

Figure 54:
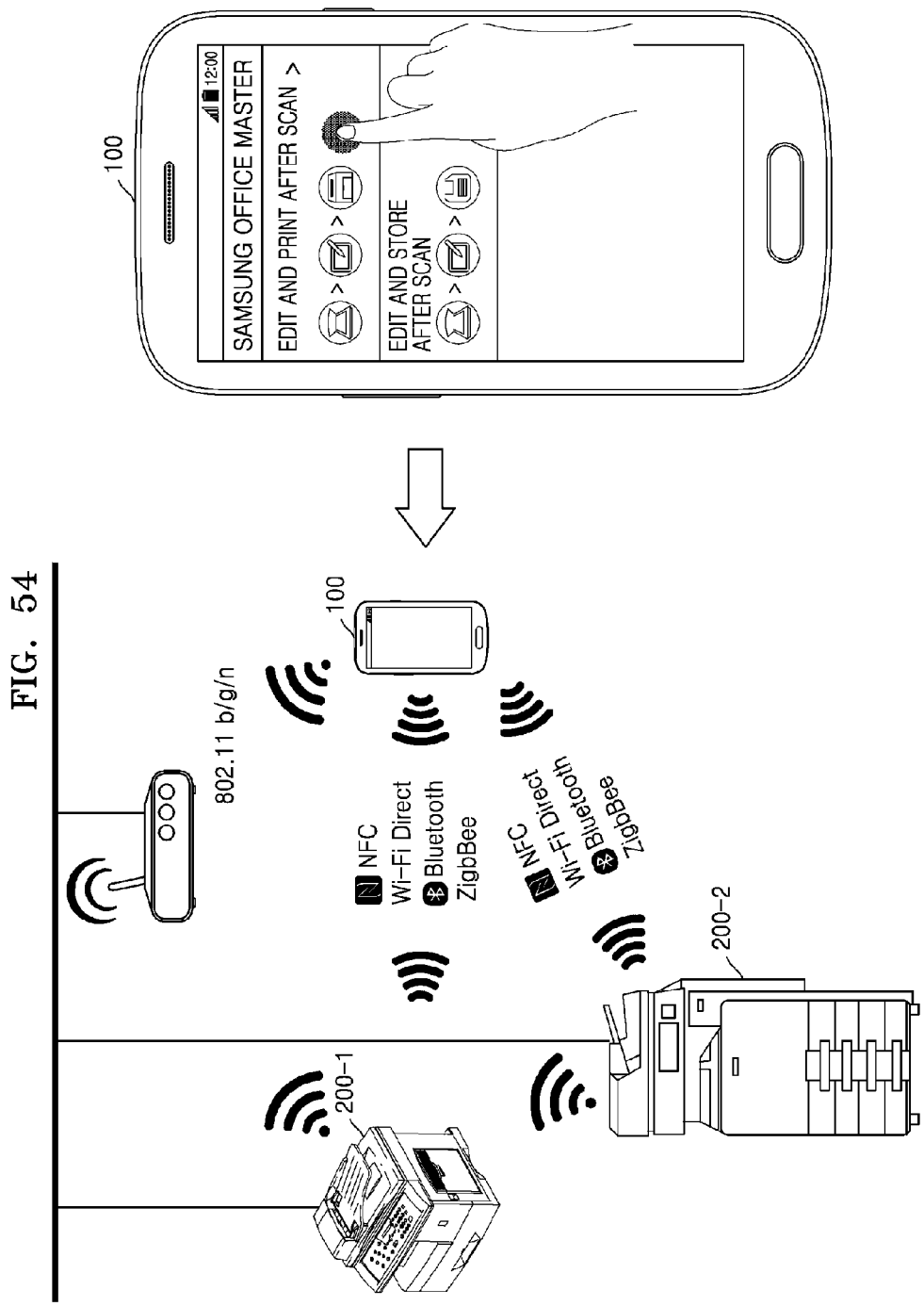
FIG. 54 is a diagram for describing connecting of a first image forming apparatus and a second image forming apparatus, which are used to process a workflow, to a mobile device, as the mobile device selects the workflow.

FIG. 54 is a diagram for describing connecting of a first image forming apparatus 200-1 (similar to the image forming apparatus 200 of FIG. 1) and a second image forming apparatus 200-2 (similar to the image forming apparatus 200 of FIG. 1), which are used to process a workflow, to a mobile device 100 (similar to the mobile device 100 of FIG. 1), as the mobile device 100 selects the workflow.

According to a BYOD service request of a user, a workflow in a pre-defined form may be displayed on the mobile device 100 executing a BYOD application. For example, as shown in FIG. 54, a list of workflows, such as "edit and print after scan" and "edit and store after scan" may be displayed.

The user may check the list of workflows displayed on the mobile device 100, and select a desired workflow. As shown in FIG. 41, the user may select the workflow of "edit and print after scan" from the mobile device 100.

In order to process the workflow selected by the user, the mobile device 100 executing the BYOD application may be connected to the first image forming apparatus 200-1 executing the scanning function and the second image forming apparatus 200-2 executing the printing function, which are included in the workflow. In order to be connected to the first and second image forming apparatuses 200-1 and 200-2, the mobile device 100 may perform a discovery process (similar to the discovery process 650 of FIG. 6), a pairing process (similar to the pairing process 660 of FIG. 6), and an event registering process (similar to the event registering process 670 of FIG. 6), which are described above. The mobile device 100 may collect information about the first and second image forming apparatuses 200-1 and 200-2 to prepare to process the workflow.

Referring back to FIG. 53, in operation 5315, the mobile device 100 may receive a command to execute the scanning function of the first image forming apparatus 200-1, which is performed first, based on an order of processing functions included in the workflow. In other words, the mobile device 100 executing the BYOD application may receive the command to execute the scanning function by executing a scanning application installed in the mobile device 100 such that the scanning function is performed by the first image forming apparatus 200-1 by controlling the first image forming apparatus 200-1 supporting the scanning function.

In operation 5320, the mobile device 100 may transmit the command to execute the scanning function to the first image forming apparatus 200-1. When the command to execute the scanning function is received by executing the scanning application installed in the mobile device 100, a UP command corresponding to the command to execute the scanning function may be transmitted to the first image forming apparatus 200-1 according to a UP communication method such that the first image forming apparatus 200-1 supporting the scanning function is controlled by the mobile device 100 executing the BYOD application.

In operation 5325, the first image forming apparatus 200-1 may execute the scanning function. The first image forming apparatus 200-1 may check the UP command received from the mobile device 100, and execute the scanning function corresponding to the UP command.

In operation 5330, the mobile device 100 may receive a result of executing the scanning function. In other words, the mobile device 100 may receive a scanned document obtained by the first image forming apparatus 200-1 according to a UP communication method.

In operation 5335, the mobile device 100 may receive a command to execute the editing function of the mobile device 100 on the scanned document. In other words, the mobile device 100 executing the BYOD application may receive the command to execute the editing function by executing an editing application installed in the mobile device 100. The editing function of the mobile device 100 may not be supported by the first image forming apparatus 200-1. When the scanned document is received from the first image forming apparatus 200-1, the mobile device 100 may determine that executing of the scanning function included in the workflow is completed, and thus receive the command to execute the editing function that is performed next from the user.

In operation 5340, the mobile device 100 may execute the editing function on the scanned document received from the first image forming apparatus 200-1. Accordingly, the mobile device 100 may generate an edited document obtained by executing the editing function on the scanned document.

In operation 5345, the mobile device 100 may receive a command to execute the printing function of the second image forming apparatus 200-2, which is executed last based on the order of processing the functions included in the workflow. In other words, the mobile device 100 executing the BYOD application may receive the command to execute the printing function by executing a printing application installed in the mobile device 100 such that the printing function is executed by the second image forming apparatus 200-2 by controlling the second image forming apparatus 200-2 supporting the printing function. The mobile device 100 may receive the command to execute the printing function of the second image forming apparatus 200-2 with respect to the edited document obtained by editing the scanned document by using the editing function of the mobile device 100.

In operation 5350, the mobile device 100 may transmit the command to execute the printing function to the second image forming apparatus 200-2. When the command to execute the printing function is received by executing the printing application installed in the mobile device 100, a UP command corresponding to the command to execute the printing function may be transmitted to the second image forming apparatus 200-2 according to a UP communication method such that the second image forming apparatus 200-2 supporting the printing function is controlled by the mobile device 100 executing the BYOD application.

In operation 5355, the second image forming apparatus 200-2 may execute the printing function on the edited document. The printing function supported by the second image forming apparatus 200-1 may not be supported by the first image forming apparatus 200-1 and the mobile device 100. The second image forming apparatus 200-2 may check the UP command received from the mobile device 100 to execute the printing function corresponding to the UP command.

In operation 5360, the mobile device 100 may receive a result of executing the printing function. For example, the mobile device 100 may receive a status of executing the printing function on the edited document from the second image forming apparatus 200-2.

Figure 55:
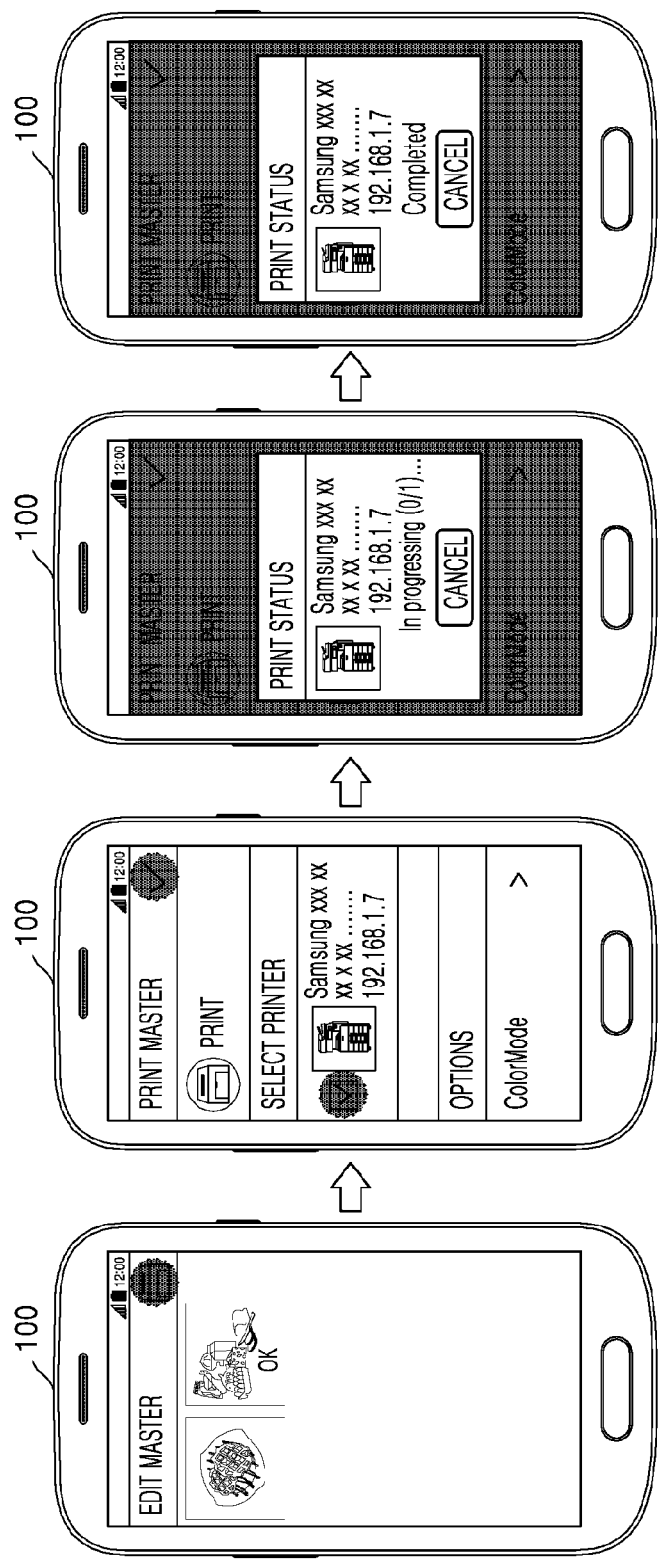
FIG. 55 is a diagram of a process of executing a printing function of a second image forming apparatus regarding an edited document obtained by editing a scanned document.

FIG. 55 is a diagram of a process of executing a printing function of a second image forming apparatus 200-2 (similar to the image forming apparatus 200 of FIG. 1) regarding an edited document obtained by editing a scanned document.

In order to process a workflow of "edit and print after scan" selected by a user, a mobile device 100 (similar to the mobile device 100 of FIG. 1) executing a BYOD application may display a screen of selecting a document to be printed after document editing is ended. The user may check the edited document from the screen of selecting a document to be printed. The user may select the edited document from the mobile device 100, execute a printing application for controlling the second image forming apparatus 200-2, and input a command to execute the printing function of the second image forming apparatus 200-2. Accordingly, the mobile device 100 executing the BYOD application may transmit a UP command corresponding to the command to execute the printing function to the second image forming apparatus 200-2 according to a UP communication method. The second image forming apparatus 200-2 may execute the printing function on the edited document received from the mobile device 100. Accordingly, the mobile device 100 may receive a status of executing the printing function executed by the second image forming apparatus 200-2.

As a result, the workflow of "edit and print after scan" is unable to be solely performed by the first or second image forming apparatus 200-1 or 200-2, but may be processed by using an editing application corresponding to a resource of the mobile device 100.

As described above, according to one or more exemplary embodiments, a workform defining an order of performing jobs using a BYOD service may be generated and stored, and the workform may be executed later such that the jobs are performed in the defined order, thereby increasing user convenience.

The one or more exemplary embodiments described above may be written as computer programs and may be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. A method of processing a workflow with a mobile device and a first image forming apparatus, the method comprising:
   executing, by the mobile device, a Bring Your Own Device (BYOD) application installed on the mobile device to provide a BYOD service that allows a user to control functions of the first image forming apparatus remotely from the mobile device;
   discovering, via the BYOD application, at least one image forming apparatus that supports the BYOD service and displaying a list that identifies at least one image forming apparatus that supports the BYOD service, the displayed list including the first image forming apparatus;
   receiving, from the first image forming apparatus during the discovering, capability information of the first image forming apparatus;
   generating, via the BYOD application, a workflow in which a first function supported by the first image forming apparatus and a function of the mobile device are combined, generating the workflow further including setting options regarding the first function supported by the first image forming apparatus according to the capability information received from the first image forming apparatus;
   selecting, via the BYOD application, the workflow;
   connecting, via the BYOD application, the first image forming apparatus and the mobile device, which are used to process the workflow; and
   executing, via the BYOD application, functions included in the workflow based on an order of processing the first function and the function of the mobile device, the order being defined in the workflow.

2. The method of claim 1, wherein the executing of the functions included in the workflow comprises sequentially executing the functions based on the order.

3. The method of claim 1, wherein the executing of the functions included in the workflow comprises:
   receiving a result of executing the first function from the first image forming apparatus in response to a command to execute the first function; and
   executing the function of the mobile device with respect to the result of executing the first function.

4. The method of claim 3, wherein the receiving of the result of executing the first function comprises:
   transmitting the command to execute the first function to the first image forming apparatus based on the capability information of the first image forming apparatus; and
   receiving the result of executing the first function from the first image forming apparatus.

5. The method of claim 3, wherein the executing of the function of the mobile device comprises executing the function of the mobile device with respect to the result of executing the first function by interlocking with an application executable in the mobile device.

6. The method of claim 3, wherein, when a second function supported by a second image forming apparatus is further combined with functions included in the workflow and the connecting further comprises connecting the second image forming apparatus to the mobile device, the executing of functions included in the workflow further comprises receiving a result of executing the second function from the second image forming apparatus in response to a command to execute the second function on a result of executing the function of the mobile device.

7. The method of claim 1, wherein, when the first function is a scanning function for scanning a document, and the function of the mobile device is an editing function for editing a document, the executing of the functions included in the workflow comprises:
   receiving a scanned document from the first image forming apparatus in response to a command to execute the scan function; and
   executing the editing function with respect to the scanned document.

8. The method of claim 7, wherein, when a document transmitting function of the mobile device is further combined with the functions included in the workflow, the executing of the functions included in the workflow further comprises executing the document transmitting function for transmitting an edited document, which is obtained by editing the scanned document by using the editing function, to an external device.

9. The method of claim 7, wherein, when a sharing function of the mobile device is further combined with the functions included in the workflow, the executing of the functions included in the workflow further comprises executing the sharing function for sharing an edited document, which is obtained by editing the scanned document by using the editing function, with an external device.

10. The method of claim 7, wherein, when a document transmitting function of the first image forming apparatus is further combined with the functions included in the workflow, the executing of the functions included in the workflow further comprises receiving a status of executing the document transmitting function from the first image forming apparatus in response to a command to execute the document transmitting function on an edited document obtained by editing the scanned document by using the editing function.

11. The method of claim 7, wherein, when a printing function supported by a second image forming apparatus is further combined with the functions included in the workflow and the connecting further comprises connecting the second image forming apparatus to the mobile device, the executing of the functions included in the workflow further comprises receiving a status of executing the printing function from the second image forming apparatus in response to a command to execute the printing function on an edited document obtained by editing the scanned document by using the editing function.

12. The method of claim 1, further comprising:
when the BYOD application is not installed on the first image forming apparatus, receiving credential information from the first image forming apparatus used for identifying the BYOD application installed on the mobile device;
receiving information about an authority of the BYOD application which indicates a valid command for controlling the first image forming apparatus; and
performing a pairing operation with the first image forming apparatus to connect the mobile device with the first image forming apparatus.

13. The method of claim 1, further comprising:
receiving state information of the first image forming apparatus indicating the first image forming apparatus is performing a function for at least one other user and receiving standby information indicating the at least one other user has reserved use of the first image forming apparatus;
receiving a selection of a reserve function and transmitting a reservation request to the first image forming apparatus; and
receiving a notification indicating the first image forming apparatus is available upon completion of the function for the at least one other user.

14. A non-transitory computer-readable recording medium having recorded thereon a program, which when executed by a computer, performs the method of claim 1.

15. A mobile device for processing a workflow, the mobile device comprising:
an inputter to receive an input to generate and define a workflow using a Bring Your Own Device (BYOD) application installed on the mobile device, in which a first function supported by a first image forming apparatus and a function of the mobile device are combined, and to receive an input to select the workflow;
a display screen to display the workflow;
communication hardware to connect the first image forming apparatus and the mobile device, which are used to process the workflow; and
a controller to:
execute the BYOD application that allows a user to control functions of the first image forming apparatus remotely from the mobile device,
control the communication hardware to perform a discovery process, via the BYOD application, of at least one image forming apparatus that supports the BYOD service,
control the display screen to display a list that identifies at least one image forming apparatus that supports the BYOD service, the displayed list including the first image forming apparatus, and
execute, via the BYOD application, functions included in the workflow based on an order of processing the first function and the function of the mobile device, the order being defined in the workflow,
wherein
the communication hardware is to receive, from the first image forming apparatus during the discovery process, capability information of the first image forming apparatus, and
the inputter is further to receive an input to set options regarding the first function supported by the first image forming apparatus according to the capability information received by the communication hardware from the first image forming apparatus, to generate and define the workflow.

16. The mobile device of claim 15, wherein the controller is further to sequentially execute the functions included in the workflow based on the order.

17. The mobile device of claim 15, wherein the controller is further to receive a result of executing the first function from the first image forming apparatus in response to a command to execute the first function, and to execute the function of the mobile device with respect to the result of executing the first function.

18. The mobile device of claim 17, wherein the controller is further to transmit the command to execute the first function to the first image forming apparatus based on the capability information of the first image forming apparatus, and to receive the result of executing the first function from the first image forming apparatus.

19. The mobile device of claim 17, wherein the controller is further to execute the function of the mobile device with respect to the result of executing the first function by interworking with an application executable in the mobile device.

20. The mobile device of claim 17, wherein, when a second function supported by a second image forming apparatus is further combined with the functions included in the workflow and the communication hardware is further to connect the second image forming apparatus to the mobile device, and the controller is configured to receive a result of executing the second function from the second image forming apparatus in response to a command to execute the second function with respect to a result of executing the function of the mobile device.

* * * * *